United States Patent [19]
Kinugasa et al.

[11] Patent Number: 5,964,088
[45] Date of Patent: Oct. 12, 1999

[54] DEVICE FOR PURIFYING EXHAUST GAS OF ENGINE

[75] Inventors: Yukio Kinugasa, Susono; Takaaki Itou, Misima; Koichi Hoshi, Susono; Naoto Suzuki, Susono; Koichi Takeuchi, Susono; Takehisa Yaegashi, Misima; Kouhei Igarashi, Susono, all of Japan

[73] Assignee: Toyota Jidosha Kabushiki Kaisha, Aichi, Japan

[21] Appl. No.: 08/822,555

[22] Filed: Mar. 19, 1997

[30] Foreign Application Priority Data

Mar. 22, 1996 [JP] Japan ..................................... 8-066806
Jul. 23, 1996 [JP] Japan ..................................... 8-193498

[51] Int. Cl.$^6$ ..................................................... F01N 3/00
[52] U.S. Cl. ................................ 60/286; 60/303; 60/285
[58] Field of Search ............................... 60/286, 285, 300, 60/303, 698

[56] References Cited

U.S. PATENT DOCUMENTS

| | | |
|---|---|---|
| 4,395,875 | 8/1983 | Virk . |
| 5,207,058 | 5/1993 | Sasaki et al. . |
| 5,410,873 | 5/1995 | Tashiro . |
| 5,461,857 | 10/1995 | Itou et al. . |
| 5,473,887 | 12/1995 | Takeshima et al. . |
| 5,479,775 | 1/1996 | Kraemer et al. . |
| 5,551,231 | 9/1996 | Tanaka et al. . |
| 5,657,625 | 8/1997 | Koga et al. ................................ 60/285 |
| 5,661,971 | 9/1997 | Waschatz et al. . |
| 5,740,669 | 4/1998 | Kinugasa et al. . |
| 5,746,052 | 5/1998 | Kinugasa et al. . |
| 5,758,493 | 6/1998 | Asik et al. ................................ 60/274 |
| 5,778,667 | 7/1998 | Kinugasa et al. ......................... 60/274 |
| 5,782,087 | 7/1998 | Kinugasa et al. . |
| 5,783,160 | 7/1998 | Kinugasa et al. . |
| 5,826,425 | 10/1998 | Sebastiano et al. . |

FOREIGN PATENT DOCUMENTS

| | | |
|---|---|---|
| 0510498 | 10/1992 | European Pat. Off. . |
| 0701858 | 3/1996 | European Pat. Off. . |
| 4365920 | 12/1992 | Japan . |
| 5131118 | 5/1993 | Japan . |
| 6108827 | 4/1994 | Japan . |
| 6330741 | 11/1994 | Japan . |
| 84522 | 1/1996 | Japan . |
| 1453456 | 10/1976 | United Kingdom . |
| 9307363 | 4/1994 | WIPO . |

OTHER PUBLICATIONS

Patent Abstracts of Japan, vol. 096, No. 005, May 31, 1996 & JP 08 004522 A (Hitachi, LTD., Others), Jan. 9, 1996.
Patent Abstracts of Japan, vol. 017, No. 240 (M–1409), May 14, 1993 & JP 04 365920 A (Toyota Central Res & Dev Lab), Dec. 17, 1992.
Database WPI, Section Ch, Week 9711, Derwent Publications Ltd., London, CB; Class E36, AN 97–116490 XP002032100 & JP 09 004 441 A (Mitsubishi Motor Corp), Jan. 7, 1997.

*Primary Examiner*—Edward K. Look
*Assistant Examiner*—Binh Tran
*Attorney, Agent, or Firm*—Kenyon & Kenyon

[57] ABSTRACT

A device for purifying the exhaust gas of an engine having a plurality of cylinders divided into first and second cylinder groups, the first and the second cylinder groups being connected to first and second exhaust passage, respectively, and performing a lean operation, comprises an $NH_3$ synthesizing catalyst arranged in the first exhaust passage, and an exhaust gas purifying catalyst arranged in an interconnecting passage, which interconnects the first passage downstream of the $NH_3$ synthesizing catalyst and the second exhaust passage, for purifying the inflowing $NO_X$ and $NH_3$. An additional engine performing a rich operation is provided and the exhaust gas thereof is fed to the first exhaust gas passage upstream of the $NH_3$ synthesizing catalyst to make the exhaust gas air-fuel ratio of the exhaust gas flowing into the $NH_3$ synthesizing catalyst rich, to thereby synthesize $NH_3$ therein. An amount of $NH_3$ or $NO_X$ flowing into the exhaust gas purifying catalyst is obtained, and the additional engine is controlled in accordance with the obtained $NH_3$ or $NO_X$ amount to control the amount of the reducing agent flowing to the exhaust gas purifying catalyst.

43 Claims, 44 Drawing Sheets

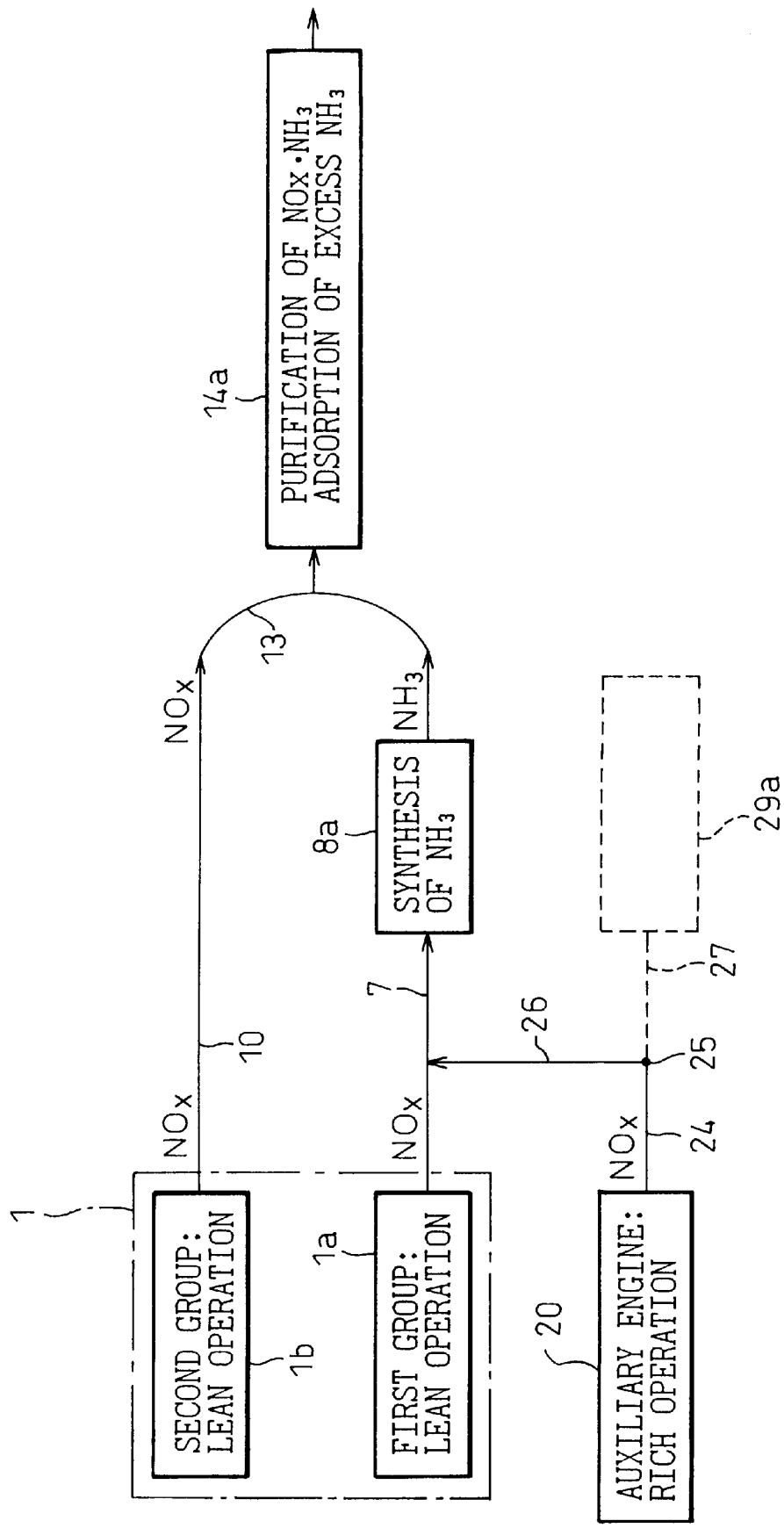

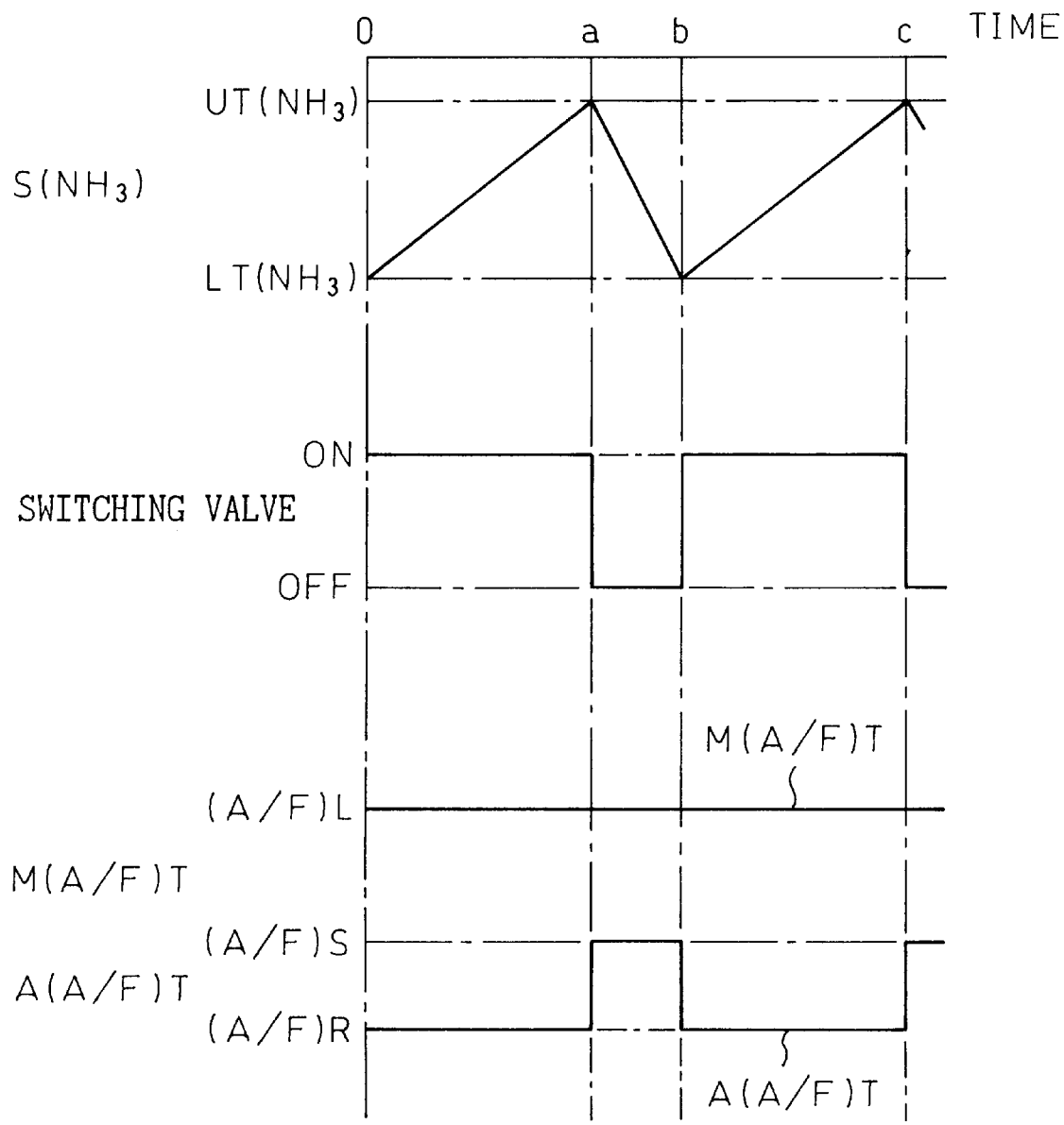

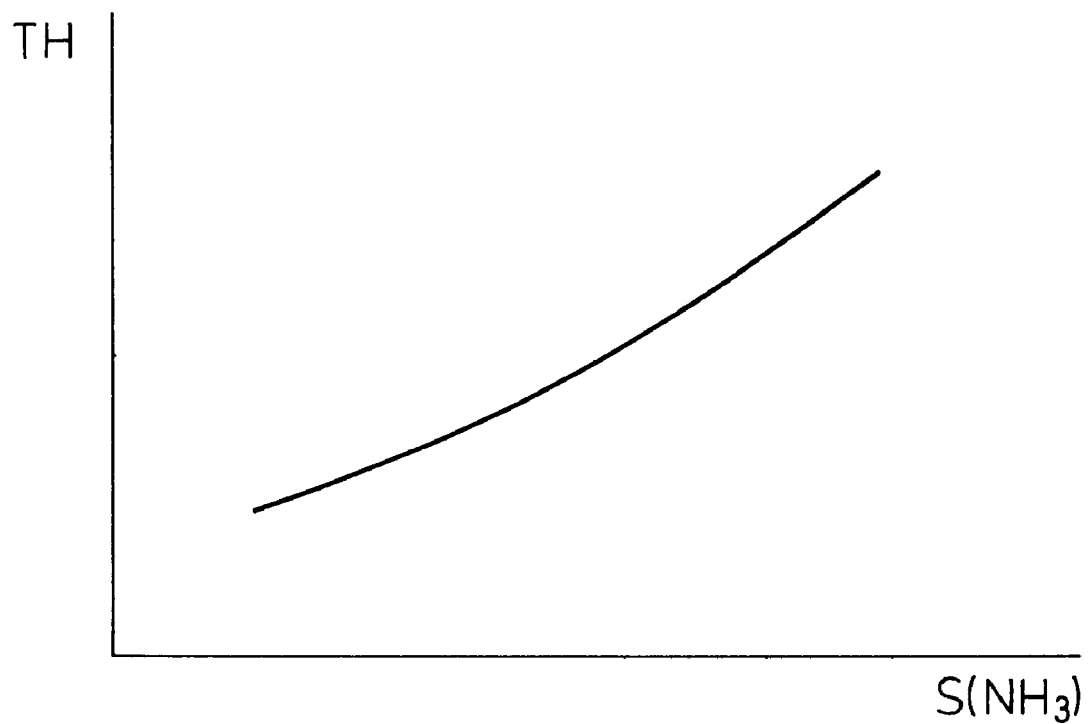

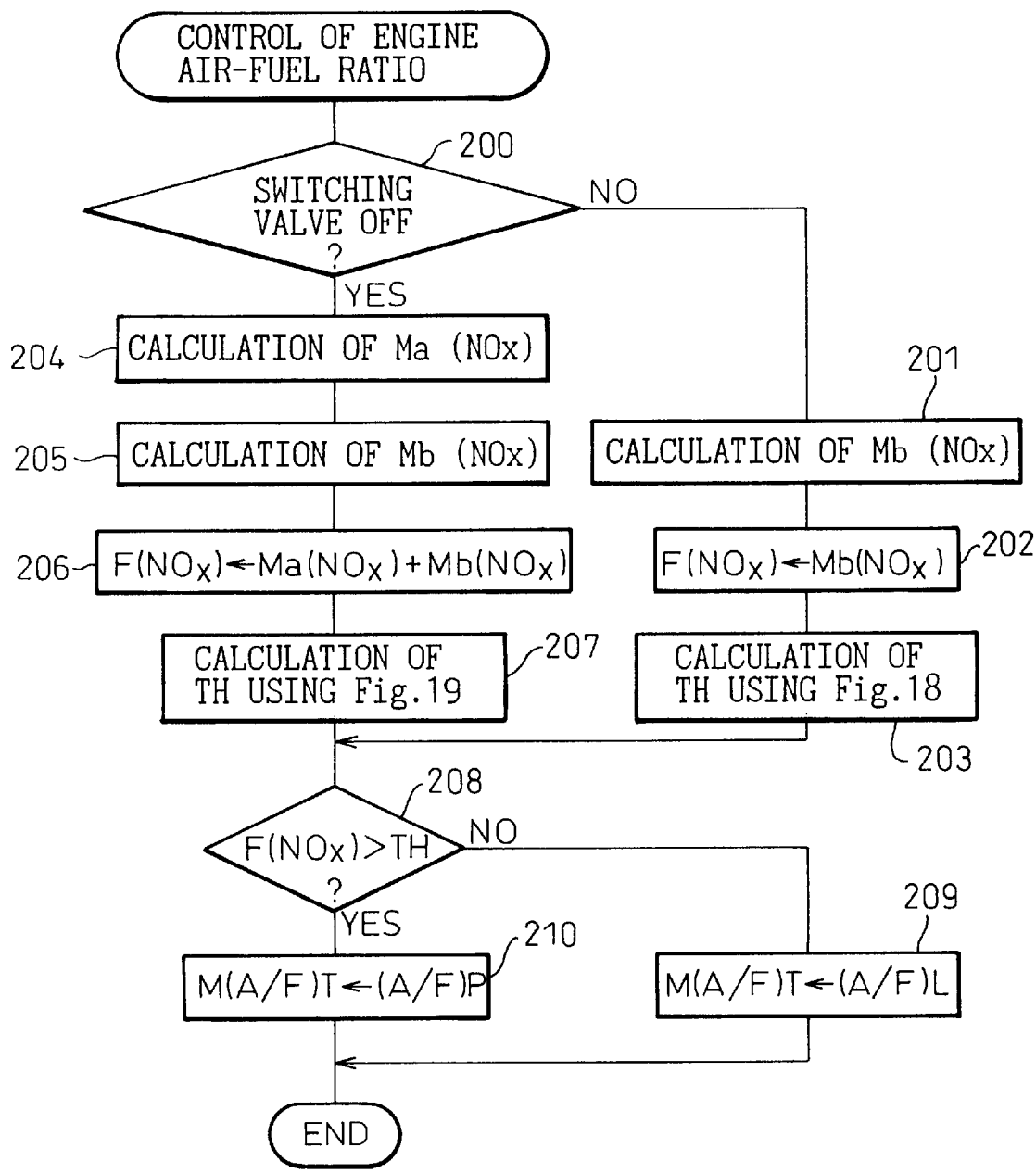

DEVICE FOR PURIFYING EXHAUST GAS OF ENGINE

BACKGROUND OF THE INVENTION

1. Field of the Invention

Technical Field of the Invention

The present invention relates to a device for purifying an exhaust gas of an engine.

2. Description of the Related Art

If an air-fuel ratio of an air-fuel mixture in a combustion chamber of each cylinder is referred to as an engine air-fuel ratio, there is known an exhaust gas purifying device for an internal combustion engine with multi-cylinders, in which a three-way (TW) catalyst is arranged in the exhaust gas passage, and the engine air-fuel ratio is controlled to be stoichiometric or rich with respect to the stoichiometric air-fuel ratio. If the engine air-fuel ratio is made lean with respect to the stoichiometric air-fuel ratio, the TW catalyst does not purify nitrogen oxides $NO_X$ in the exhaust gas sufficiently, and the $NO_X$ is emitted to the ambient air. Accordingly, the exhaust gas purifying device mentioned above makes the engine air-fuel ratio to be stoichiometric or rich, to thereby purify $NO_X$, in the TW catalyst, as much as possible.

On the other hand, it is desirable to make the engine air-fuel ratio as lean as possible, to make a fuel consumption rate lower. However, if the engine air-fuel ratio is made lean, the above-mentioned exhaust gas purifying device cannot purify $NO_X$ sufficiently. To solve this problem, if a ratio of the total amount of air fed into the intake passage, the combustion chamber, and the exhaust passage upstream of a certain position in the exhaust passage to the total amount of fuel fed into the intake passage, the combustion chamber, and the exhaust passage upstream of the above-mentioned position is referred to as an exhaust gas air-fuel ratio of the exhaust gas flowing through the certain position, Japanese Unexamined Patent Publication No. 4-365920 discloses an exhaust gas purifying device for an internal combustion engine with multi-cylinders, the cylinders being divided into first and second cylinder groups, the first and second cylinder groups being respectively connected to first and second exhaust passage. In the device, the TW catalyst is arranged in the first exhaust passage, the TW catalyst synthesizing $NH_3$ from $NO_X$ in the inflowing exhaust gas when the exhaust gas air-fuel ratio of the inflowing exhaust gas is rich, and an exhaust gas purifying catalyst for purifying the inflowing $NO_X$ and the inflowing $NH_3$ is arranged in an interconnecting passage interconnecting the first exhaust passage downstream of the TW catalyst and the second exhaust passage. The first cylinder group performs a rich operation in which the engine air-fuel ratio is made rich, and the second cylinder group performs a lean operation in which the engine air-fuel ratio is made lean. In the device, the fuel consumption rate is reduced by increasing the number of the cylinders in which the lean operation is to be performed, while $NO_X$ synthesized in the cylinders in which the lean operation is performed is purified in the exhaust gas purifying catalyst as much as possible, by using $NH_3$ which is synthesized by introducing the exhaust gas of the cylinders in which the rich operation is performed to the TW catalyst.

However, if the first cylinder group performs the rich operation and the second cylinder group performs the lean operation, as mentioned above, a fluctuation in the output torque will increase, because the first and second cylinder groups have a common output shaft. Especially, if the internal combustion engine is adapted for a vehicle such as an automobile, such an increased fluctuation may make the driver uncomfortable.

If the output torques of the first and second cylinder groups are made substantially same, the torque fluctuation can be reduced. However, to make the output torque of the first cylinder group in which the rich operation is performed is made to be substantially the same as that of the second cylinder group in which the lean operation is performed, it is necessary to perform a complicated control on, for example, the fuel injection amount or the ignition timing, in each cylinder group.

In order to solve the above problems, the Japanese Unexamined Patent Publication No. 8-4522 discloses an exhaust gas purifying device for an internal combustion engine, in which the first and the second cylinder groups perform the lean operation, and an additional internal combustion engine performing the rich operation is provided, and the exhaust gas of the additional engine is fed into the first exhaust passage upstream of the TW catalyst, to thereby make the exhaust gas air-fuel ratio of the exhaust gas flowing into the TW catalyst rich. In this device, the additional engine performs the rich operation to make the exhaust gas air-fuel ratio of the exhaust gas flowing into the TW catalyst rich. Thus, the fluctuation in the output torque in the first and the second cylinder groups is suppressed. Note that an output of the additional engine is used to, for example, drive an auxiliary machine such as an air-conditioner.

However, an amount of $NO_X$ flowing into the exhaust gas purifying catalyst depends on an operating condition of the multi-cylinder engine, and an amount of $NH_3$ flowing into the exhaust gas purifying catalyst depends on an operating condition of the additional engine. Therefore, when the operating condition of the multi-cylinder engine or of the additional engine changes, the $NH_3$ amount may become excessive to or be short with respect to the $NO_X$ amount flowing into the exhaust gas purifying catalyst. Namely, when the $NH_3$ amount becomes excessive to the $NO_X$ amount in the exhaust gas purifying catalyst, the $NH_3$ may be discharged from the exhaust gas purifying catalyst without being purified. When the $NH_3$ amount becomes short with respect to the $NO_X$ amount, the $NO_X$ may be discharged from the exhaust gas purifying catalyst without being purified.

SUMMARY OF THE INVENTION

An object of the present invention is to provide a device for purifying an exhaust gas of an engine capable of preventing the $NH_3$ amount from being excessive to or be in short with respect to the $NO_X$ amount in the exhaust purifying catalyst, while suppressing the fluctuation in the output torque.

According to the one aspect of the present invention, there is provided a device for purifying an exhaust gas of an engine having a plurality of cylinders divided into first and second cylinder groups, the first and the second cylinder groups being connected to first and second exhaust passage, respectively, and performing a lean operation, the device comprising: an $NH_3$ synthesizing catalyst arranged in the first exhaust passage, the $NH_3$ synthesizing catalyst synthesizing $NH_3$ from at least a part of the $NO_X$ in the inflowing exhaust gas when the exhaust gas air-fuel ratio of the inflowing exhaust gas is rich, and passing through $NO_X$ in the inflowing exhaust gas when the exhaust gas air-fuel ratio of the inflowing exhaust gas is lean; an interconnecting exhaust passage interconnecting the first passage downstream of the $NH_3$ synthesizing catalyst and the second exhaust passage; an exhaust gas purifying catalyst arranged in the interconnecting passage for purifying the inflowing $NO_X$ and $NH_3$; rich gas forming means, which is different from the engine, for supplying a reducing agent to the first exhaust gas passage upstream of the $NH_3$ synthesizing catalyst to make the exhaust gas air-fuel ratio of the exhaust gas flowing into the $NH_3$ synthesizing catalyst rich; and reducing agent amount control means for obtaining an amount of $NH_3$ or $NO_X$ flowing into the exhaust gas purifying catalyst, and controlling the rich gas forming means in accordance with the obtained $NH_3$ or $NO_X$ amount to control the amount of the reducing agent supplied into the first exhaust passage to control the amount of the reducing agent flowing to the exhaust gas purifying catalyst.

According to the another aspect of the present invention, there is provided a device for purifying an exhaust gas of an engine performing a lean operation, the device comprising: rich gas forming means, which is different from the engine, for forming the exhaust gas of which the exhaust gas air-fuel ratio is rich; an $NH_3$ synthesizing catalyst connected to the rich gas forming means, the $NH_3$ synthesizing catalyst synthesizing $NH_3$ from at least a part of $NO_X$ in the inflowing exhaust gas when the exhaust gas air-fuel ratio of the inflowing exhaust gas is rich, and passing through $NO_X$ in the inflowing exhaust gas when the exhaust gas air-fuel ratio of the inflowing exhaust gas is lean; an interconnecting exhaust passage interconnecting the exhaust gas of the engine and that discharged from the $NH_3$ synthesizing catalyst; an exhaust gas purifying catalyst arranged in the interconnecting passage for purifying the inflowing $NO_X$ and the inflowing $NH_3$; and reducing agent amount control means for obtaining an amount of $NH_3$ or $NO_X$ flowing into the exhaust gas purifying catalyst, and controlling the rich gas forming means in accordance with the obtained $NH_3$ or $NO_X$ amount to control the amount of the reducing agent supplied into the interconnecting passage upstream of the exhaust gas purifying catalyst.

The present invention may be more fully understood from the description of the preferred embodiments of the invention as set forth below, together with the accompanying drawings.

BRIEF DESCRIPTION OF THE DRAWINGS

In the drawings:

FIG. 3 schematically illustrates the exhaust gas purifying method of the exhaust gas purifying device shown in FIG. 1;

FIG. 7 is a time chart illustrating an amount of $NH_3$ adsorbed in the $NH_3$—AO catalyst, a condition of the switching valve, and target air-fuel ratios of the main and the auxiliary engines;

FIG. 19 is a diagram illustrating the threshold TH during the stoppage of the $NH_3$ synthesizing operation;

FIG. 20 is a flow chart for controlling the engine air-fuel ratio of the main engine according to another embodiment;

DESCRIPTION OF THE PREFERRED EMBODIMENTS

In general, nitrogen oxides $NO_X$ includes nitrogen monoxide NO, nitrogen dioxide $NO_2$, dinitrogen tetraoxide $N_2O_4$, dinitrogen monoxide $N_2O$, etc. The following explanations are made referring $NO_X$ mainly as nitrogen monoxide NO and/or nitrogen dioxide $NO_2$, but a device for purifying an exhaust gas according to the present invention can also purify the other nitrogen oxides.

Figure 1:
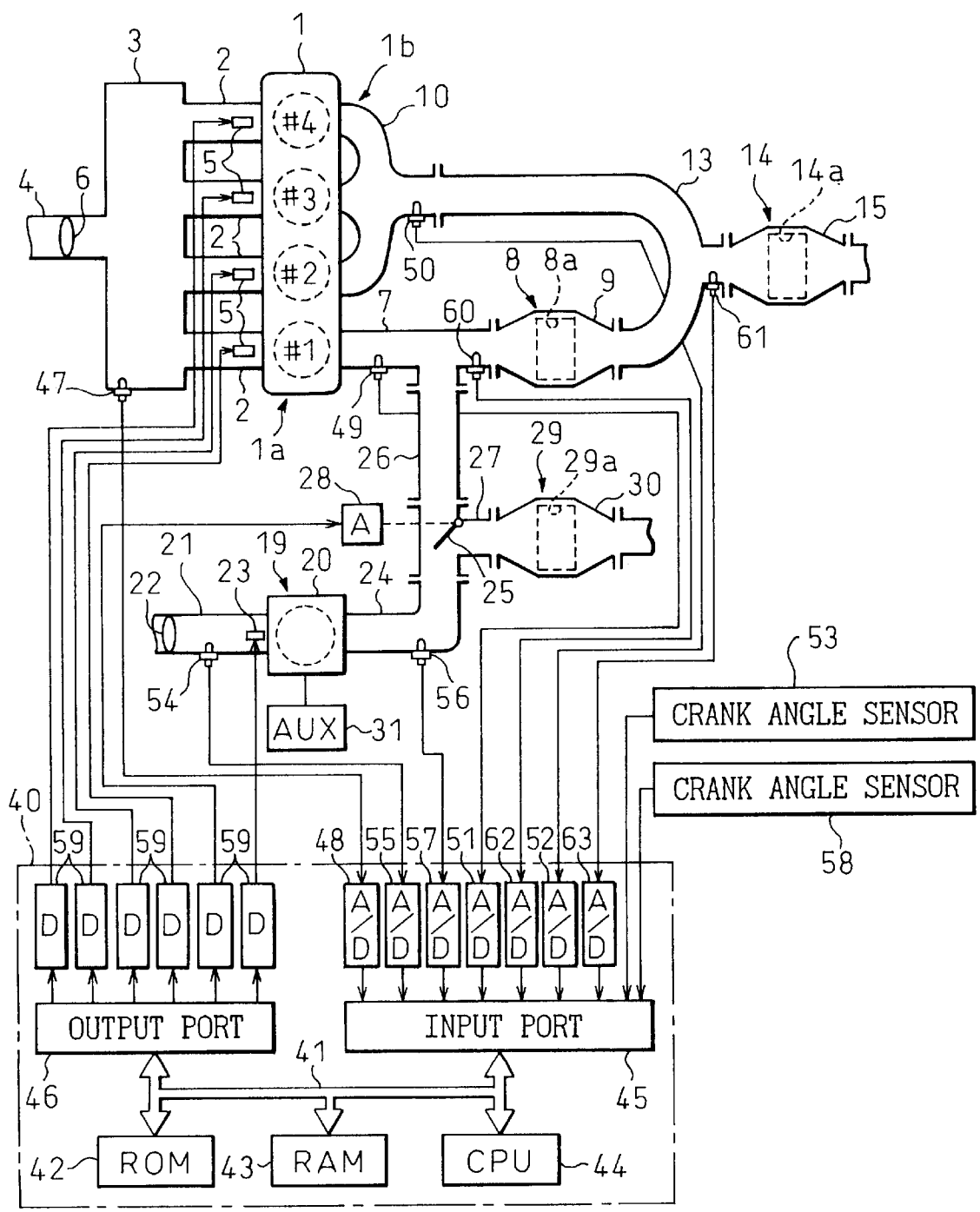
FIG. 1 is a general view of an engine.

FIG. 1 shows the case where the present invention is applied to an internal engine of the spark ignition type. However, the present invention may be applied to a diesel engine.

Referring to FIG. 1, an engine body 1 has four cylinders, i.e., a first cylinder #1, a second cylinder #2, a third cylinder #3, and a fourth cylinder #4. Each cylinder #1 to #4 is connected to a common surge tank 3, via a corresponding intake branch 2, and the surge tank 3 is connected to an air-cleaner (not shown) via an intake duct 4. In each intake branch 2, a fuel injector 5 is arranged to feed fuel to the corresponding cylinder. Further, a throttle valve 6 is arranged in the intake duct 4, an opening of which becomes larger as the depression of an acceleration pedal (not shown) becomes larger. Note that the fuel injectors 5 are controlled in accordance with the output signals output from an electronic control unit 40.

The first cylinder #1 is connected to a catalytic converter 9 housing an $NH_3$ synthesizing catalyst 8 therein, via an exhaust pipe 7. On the other hand, the second cylinder #2, the third cylinder #3 and the fourth cylinder #4 are connected to a common exhaust manifold 10. In the engine shown in FIG. 1, the first cylinder #1 composes the first cylinder group 1a. The second cylinder #2, the third cylinder #3 and the fourth cylinder #4 compose a second cylinder group 1b. Accordingly, exhaust gas discharged from the first cylinder group 1a is introduced to the $NH_3$ synthesizing catalyst 8. The converter 9 and the exhaust manifold 10 are connected to a catalytic converter 15 housing an exhaust purifying catalyst 14 therein, via a common interconnecting exhaust pipe 13.

Further referring to FIG. 1, in the exhaust pipe 7, there is provided a rich gas forming device 19 which feeds a reducing agent into the exhaust pipe 7 to make an exhaust gas air-fuel ratio (described later) of the exhaust gas flowing to the $NH_3$ synthesizing catalyst 8 rich. In this embodiment, the rich gas forming device 19 comprises an auxiliary internal combustion engine 20 having an output shaft different from that of the engine 1. In an intake duct 21 of this auxiliary engine 20, there are provided a throttle valve 22 and a fuel injector 23. In this embodiment, the auxiliary engine is a spark ignition type engine with a single cylinder. However, the auxiliary engine 20 may be composed of a multi-cylinder engine, or of a diesel engine.

An exhaust pipe 24 of the auxiliary engine 20 is selectively connected via a switching valve 25 to one of the exhaust gas introducing pipes 26 and 27. The switching valve 25 is driven by an electrical or a negative pressure type actuator 28. The introducing pipe 26 is connected to the exhaust pipe 7 of the first cylinder group 1a. Accordingly, when the switching valve 25 is turned ON and the exhaust pipe 24 is connected to the introducing pipe 26, exhaust gas of the auxiliary engine 20 is introduced into the exhaust pipe 7. The introducing pipe 27 is connected to a catalytic converter 30 housing an exhaust gas purifying catalyst for the auxiliary engine 29 therein. Therefore, when the switching valve 25 is turned OFF and the exhaust pipe 24 is connected to the introducing pipe 27, the exhaust gas of the auxiliary engine 20 is introduced into the exhaust gas purifying catalyst 29. Note that the fuel injector 23 and the actuator 28 are respectively controlled in accordance with an output signal output from the electronic control unit 40.

An output of the engine 1 is used for, for example, driving a vehicle. On the other hand, an output of the auxiliary engine 20 is used for driving an auxiliary machine 31. The engine 1 is referred to as a main engine, hereinafter. Examples of the usable auxiliary machines 31 are: a cooling unit for a refrigerated vehicle, a mixer used for a concrete mixer vehicle, an air-conditioner used for a bus, and a generator for generating electric power of an electric motor of a hybrid type vehicle having an electric motor in addition to an internal combustion engine. In this case, the degree of opening of the throttle valve 22 is controlled in accordance with an output required of the auxiliary machine 31. Alternatively, the auxiliary machine 31 may be composed of a cooling water pump, an oil pump, or an alternator.

The electronic control unit (ECU) 40 is composed of a digital computer, which includes a ROM (read only memory) 42, RAM (random-access memory) 43, CPU (microprocessor) 44, input port 45 and output port 46, and these units are connected to each other via a bidirectional bus 41. The surge tank 3 is provided with a pressure sensor 47 which generates an output voltage proportional to the pressure in the surge tank 3. The output voltage of this pressure sensor 47 is input into the input port 45 via an AD converter 48. In the CPU 44, an intake air amount of the main engine 1 is calculated in accordance with the output signal of the AD converter 48. In the exhaust pipe 7 upstream of the outlet of the introducing pipe 26, and in the collecting portion of the exhaust manifold 10, there are respectively provided air-fuel ratio sensors 49 and 50 which generate output voltages in accordance with the exhaust gas air-fuel ratios (described later) flowing through the respective positions. The output voltages of these air-fuel ratio sensors 49 and 50 are input into the input port 45 via the corresponding AD converters 51 and 52. The crank angle sensor 53, which generates an output pulse whenever the crank shaft of the main engine 1 rotates by, for example, 30 degrees, is connected to the input port 45. In the CPU 44, an engine speed of the main engine 1 is calculated in accordance with this output pulse.

In the intake duct 21 downstream of the throttle valve 22 of the auxiliary engine 20, there is provided a pressure sensor 54 generating an output voltage proportional to the pressure in the intake duct 21. The output voltage of this pressure sensor 54 is input into the input port 45 via the AD converter 55. In the CPU 44, an intake air amount of the auxiliary engine 20 is calculated in accordance with the output signal of the AD converter 55. In the exhaust pipe 24, there is provided an air-fuel ratio sensor 56 generating an output voltage in accordance with the exhaust gas air-fuel ratio of the exhaust gas flowing at this position. The output voltage of this air-fuel ratio sensor 56 is input into the input port 45 via the AD converter 57. The crank angle sensor 58, which generates an output pulse whenever the crank shaft of the auxiliary engine 20 rotates by, for example, 30 degrees, is connected to the input port 45. In the CPU 44, an engine speed of the auxiliary engine 20 is calculated in accordance with this output pulse.

In the exhaust pipe 7 downstream of the outlet of the introducing pipe 26, and in the interconnecting portion of the interconnecting pipe 13, there are respectively provided temperature sensors 60 and 61 which respectively generate output voltages proportional to the temperature of the exhaust gas flowing into the respective positions. The output voltages of these temperature sensors 60 and 61 are input into the input port 45 via the corresponding AD converters 62 and 63.

On the other hand, the output port 46 is respectively connected to each fuel injector 5 of the main engine 1, the fuel injector 23 of the auxiliary engine 20 and the actuator 28 via the corresponding drive circuits 59.

In the embodiment shown in FIG. 1, the $NH_3$ synthesizing catalyst 8 is comprised of a three-way (TW) catalyst 8a. The TW catalyst 8a is comprised of precious metals such as palladium Pd, platinum Pt, and rhodium Rh, carried on a wash-coat layer of, for example, alumina, formed on a surface of a substrate.

Figure 2A:
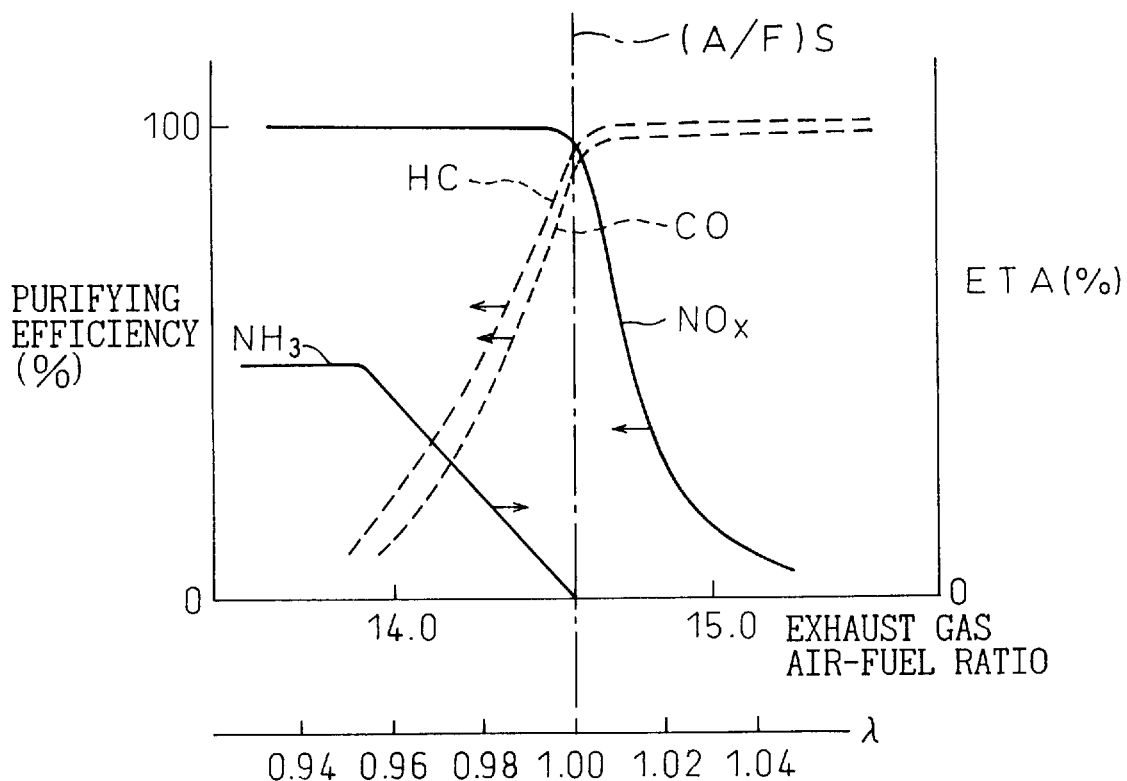
FIG. 2A is a diagram illustrating a characteristic of the TW catalyst.

FIG. 2(A) illustrates the purifying efficiency of the exhaust gas of the TW catalyst 8a. If a ratio of the total amount of air fed into the intake passage, the combustion chamber and the exhaust passage upstream of a certain position in the exhaust passage, to the total amount of fuel fed into the intake passage, the combustion chamber and the exhaust passage upstream of the above-mentioned position, is referred to as an exhaust gas air-fuel ratio of the exhaust gas flowing through the certain position, FIG. 2(A) shows that the TW catalyst 8a passes the inflowing $NO_X$ when the exhaust gas air-fuel ratio of the inflowing exhaust gas is lean with respect to the stoichiometric air-fuel ratio (A/F)S, which is about 14.6 and the air-excess ratio $\lambda=1.0$, and synthesizes $NH_3$ from the inflowing $NO_X$ when the exhaust gas air-fuel ratio of the inflowing exhaust gas is rich with respect to the stoichiometric air-fuel ratio (A/F)S. The $NH_3$ synthesizing function of the TW catalyst 8a is unclear, but it can be considered that some $NO_X$ in the exhaust gas of which the exhaust gas air-fuel ratio is rich is converted to $NH_3$ according to the following reactions (1) and (2), that is:

$$5H_2 + 2NO \rightarrow 2NH_3 + 2H_2O \quad (1)$$

$$7H_2 + 2NO_2 \rightarrow 2NH_3 + 4H_2O \quad (2)$$

On the contrary, it is considered that the other $NO_X$ is reduced to the nitrogen $N_2$ according to the following reactions (3) to (6), that is:

$$2CO + 2NO \rightarrow N_2 + 2CO_2 \quad (3)$$

$$2H_2 + 2NO \rightarrow N_2 + 2H_2O \quad (4)$$

$$4CO + 2NO_2 \rightarrow N_2 + 4CO_2 \quad (5)$$

$$4H_2 + 2NO_2 \rightarrow N_2 + 4H_2O \quad (6)$$

Accordingly, $NO_X$ flowing into the TW catalyst 8a is converted to either $NH_3$ or $N_2$ when the exhaust gas air-fuel ratio of the inflowing exhaust gas is rich, and thus $NO_X$ is prevented from being discharged from the TW catalyst 8a.

As shown in FIG. 2(A), an efficiency ETA of the $NH_3$ synthesizing from the inflowing $NO_X$ in the TW catalyst 8a becomes higher as the exhaust gas air-fuel ratio of the inflowing exhaust gas becomes lower or richer with respect to the stoichiometric air-fuel ratio, and is kept constant when the exhaust gas air-fuel ratio of the inflowing exhaust gas becomes even lower. In the example shown in FIG. 2(A), the $NH_3$ synthesizing efficiency ETA is kept constant when the exhaust gas air-fuel ratio of the inflowing exhaust gas equals or is smaller than about 13.8, where the air-excess ratio $\lambda$ is about 0.95.

Figure 2B:
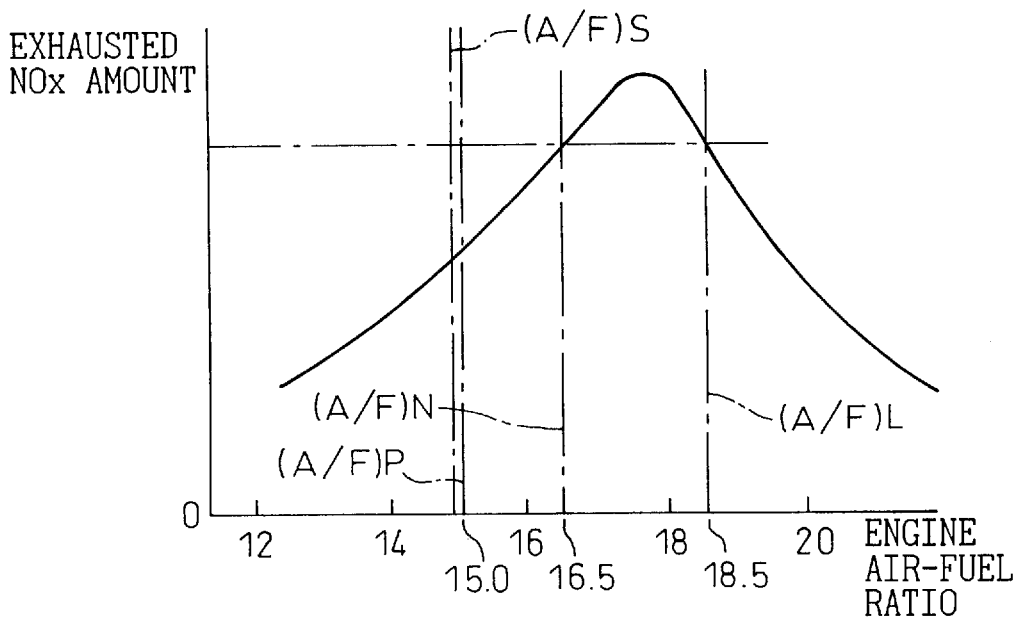
FIG. 2B is a diagram illustrating an amount of $NO_X$ discharged from a cylinder per unit time.

On the other hand, if an air-fuel ratio of an air-fuel mixture in a combustion chamber of each cylinder is referred to as an engine air-fuel ratio, the $NO_X$ amount exhausted from each cylinder per unit time depends on the engine air-fuel ratio, as shown in FIG. 2(B).

Note that, in the engine shown in FIG. 1, when the exhaust gas air-fuel ratio of the exhaust gas flowing in the TW catalyst 8a is rich it is desired to synthesize $NH_3$ as much as possible, and to purify unburned hydrocarbon HC and carbon monoxide CO as much as possible, because of the reasons described below. Accordingly, a three-way catalyst carrying palladium Pd of which the $NH_3$ synthesizing efficiency is high, or cerium Ce which has an oxygen adsorption function, is used as the TW catalyst 8a. Further, note that a TW catalyst carrying rhodium Rh suppresses the synthesis of $NH_3$ therein, and a three-way catalyst without rhodium Rh is desired to be used as the TW catalyst 8a.

The exhaust gas purifying catalyst 14 is for purifying both $NH_3$ and $NO_X$ in the inflowing exhaust gas simultaneously. The exhaust gas purifying catalyst 14 is not necessarily provided with an $NH_3$ adsorbing function, however, the exhaust gas purifying catalyst 14 of the present embodiment is composed of an $NH_3$ adsorbing and oxidizing ($NH_3$—AO) catalyst 14a having both the $NH_3$ adsorbing function and catalytic function. That is, the $NH_3$—AO catalyst 14a of the present embodiment forms both the exhaust gas purifying catalyst and an adsorbent for temporarily adsorbing $NH_3$ in the inflowing exhaust gas therein. The $NH_3$—AO catalyst 14a is comprised of a so-called zeolite denitration catalyst, such as zeolite carrying copper Cu thereon, zeolite carrying platinum Pt and copper Cu, and zeolite carrying iron Fe thereon, which is carried on a surface of a substrate. Alternatively, the $NH_3$—AO catalyst 14a may be comprised of a solid acid such as zeolite, silica, silica-alumina, and titania, carrying the transition metals such as iron Fe and copper Cu or precious metals such as platinum Pt, palladium Pd and rhodium Rh, or carrying at least two of them. Alternatively, the exhaust gas purifying catalyst 14 may be comprised of a catalyst containing at least a precious metal (referred to as a precious metal catalyst), or of the combination of the precious metal catalyst and the $NH_3$—AO catalyst.

The $NH_3$—AO catalyst 14a adsorbs $NH_3$ in the inflowing exhaust gas, and desorbs the adsorbed $NH_3$ when the $NH_3$ concentration in the inflowing exhaust gas becomes lower, or when the inflowing exhaust gas includes $NO_X$. At this time, if the $NH_3$—AO catalyst 14a is in the oxidizing atmosphere, that is, if the exhaust gas air-fuel ratio of the inflowing exhaust gas is lean, the $NH_3$—AO catalyst 14a oxidizes all the $NH_3$ desorbed therefrom. Also, if the inflowing exhaust gas includes both $NH_3$ and $NO_X$, the $NH_3$—AO catalyst 14a oxidizes $NH_3$ by $NO_X$. In these cases, the $NH_3$ oxidizing function has a portion which has been unclear, but it can be considered that the $NH_3$ oxidation occurs according to the following reactions (7) to (10), that is:

$$4NH_3 + 7O_2 \rightarrow 4NO_2 + 6H_2O \qquad (7)$$

$$4NH_3 + 5O_2 \rightarrow 4NO + 6H_2O \qquad (8)$$

$$8NH_3 + 6NO_2 \rightarrow 12H_2O + 7N_2 \qquad (9)$$

$$4NH_3 + 4NO + O_2 \rightarrow 6H_2O + 4N_2 \qquad (10)$$

The reactions (9) and (10), which are denitration, reduce both $NO_X$ produced in the oxidation reactions (7) and (8), and $NO_X$ in the exhaust gas flowing to the $NH_3$—AO catalyst 14a. Note that the exhaust gas purifying catalyst 14 and the $NH_3$ adsorbent may be separately provided, and the $NH_3$ adsorbent may be arranged upstream of the exhaust gas purifying catalyst 14.

In the main engine 1 shown in FIG. 1, the fuel injection time MTAU is calculated by the following equation:

$$MTAU = MTB \cdot ((A/F)S/M(A/F)T) \cdot MFAF$$

MTB represents a basic fuel injection time suitable for making the engine air-fuel ratio of each cylinder equal to the stoichiometric air-fuel ratio (A/F)S, and is calculated by the following equation:

$$MTB = (MQ/MN) \cdot K$$

where MQ represents an intake air amount of the main engine 1, MN represents the engine speed of the main engine 1, and K represents a constant. Accordingly, the basic fuel injection time MTB is a product of the intake air amount per unit engine speed, and the constant.

M(A/F)T represents a target value of the control of the engine air-fuel ratio of each cylinder of the main engine 1, i.e., a target air-fuel ratio. When the target air-fuel ratio M(A/F)T is made larger to make the engine air-fuel ratio lean with respect to the stoichiometric air-fuel ratio (A/F)S, the fuel injection time MTAU is made shorter and thereby the fuel amount to be injected is decreased. When the target air-fuel ratio (A/F)T is made smaller to make the engine air-fuel ratio rich with respect to the stoichiometric air-fuel ratio (A/F)S, the fuel injection time MTAU is made longer and thereby the fuel amount to be injected is increased. Note that, in this embodiment, the target air-fuel ratio M(A/F)T of the engine air-fuel ratio of each cylinder of the main engine 1 is made common to all cylinders of the first cylinder group 1a and the second cylinder group 1b. This reduces the torque fluctuation of the main engine 1.

MFAF represents a feedback correction coefficient for making the actual engine air-fuel ratio of each cylinder of the main engine 1 equal to the target air-fuel ratio M(A/F)T. When the fuel injection time MTAU of the first cylinder #1 which composes the first cylinder group 1a is calculated, this feedback correction coefficient MFAF is made to be MFAFA. When the fuel injection time MTAU of each of the second cylinder #2, the third cylinder #3 and the fourth cylinder #4, which compose the second cylinder group 1b, is calculated, this feedback correction coefficient MFAF is made to be MFAFB.

The feedback correction coefficient MFAFA is determined in accordance with the output signal of the air-fuel ratio sensor 49. The exhaust gas air-fuel ratio of the exhaust gas in the exhaust pipe 7 detected by the air-fuel ratio sensor 49 conforms to the engine air-fuel ratio of the first cylinder group 1a. When the exhaust gas air-fuel ratio detected by the air-fuel ratio sensor 49 is leaner than the target air-fuel ratio M(A/F)T, the feedback correction coefficient MFAFA is made larger and thereby the fuel amount to be injected is increased. When the exhaust gas air-fuel ratio detected by the air-fuel ratio sensor 49 is richer than the target air-fuel ratio M(A/F), the feedback correction coefficient MFAFA is made smaller and thereby the fuel amount to be injected is reduced. In this way, the engine air-fuel ratio of the first cylinder group 1a is made equal to the target air-fuel ratio M(A/F)T.

The exhaust gas air-fuel ratio of the exhaust gas in the exhaust gas manifold 10 conforms to the engine air-fuel ratio of the second cylinder group 1b. When the exhaust gas air-fuel ratio detected by the air-fuel ratio sensor 50 is leaner than the target air-fuel ratio M(A/F), the feedback correction coefficient MFAFB is made larger and thereby the fuel amount to be injected is increased. When the exhaust gas air-fuel ratio detected by the air-fuel ratio sensor 50 is richer than the target air-fuel ratio M(A/F), the feedback correction coefficient MFAFB is made smaller and thereby the fuel amount to be injected is reduced. In this way, the engine air-fuel ratio of the second cylinder group 1b is made equal to the target air-fuel ratio M(A/F)T.

On the other hand, in the auxiliary engine 20 shown in FIG. 1, the fuel injection time ATAU is calculated by the following equation:

$$ATAU = ATB \cdot ((A/F)S/A(A/F)T) \cdot AFAF$$

ATB represents a basic fuel injection time suitable for making the engine air-fuel ratio of the cylinder of the auxiliary engine 20 equal to the stoichiometric air-fuel ratio (A/F)S, and is calculated by the following equation:

$$ATB = (AQ/AN) \cdot K$$

where AQ represents an intake air amount of the auxiliary engine 20, and AN represents the engine speed of the auxiliary engine 20.

A(A/F)T represents a target air-fuel ratio of the engine air-fuel ratio in the auxiliary engine 20. AFAF represents a feedback correction coefficient for making the actual engine air-fuel ratio of the auxiliary engine 20 equal to the target air-fuel ratio A(A/F)T. The feedback correction coefficient AFAFA is determined in accordance with the output signal of the air-fuel ratio sensor 56. The exhaust gas air-fuel ratio of the exhaust gas in the exhaust manifold 10 detected by the air-fuel ratio sensor 56 conforms to the engine air-fuel ratio of the auxiliary engine 20. When the exhaust gas air-fuel ratio detected by the air-fuel ratio sensor 56 is leaner than the target air-fuel ratio A(A/F)T, the feedback correction coefficient AFAFA is made larger and thereby the fuel amount to be injected is increased. When the exhaust gas air-fuel ratio detected by the air-fuel ratio sensor 56 is richer than the target air-fuel ratio A(A/F), the feedback correction coefficient AFAFA is made smaller and thereby the fuel amount to be injected is reduced. In this way, the engine air-fuel ratio of the auxiliary engine 20 is made equal to the target air-fuel ratio A(A/F)T. Note that the feedback correction coefficients MFAFA, MFAFB and AFAF fluctuate around 1.0, respectively.

For each air-fuel ratio sensor 49, 50, 56, an air-fuel ratio sensor generating an output voltage which corresponds to the exhaust gas air-fuel ratio over a broader range of the exhaust gas air-fuel ratio may be used.

The main engine 1 usually performs a lean operation. That is, the target air-fuel ratio M(A/F)T of the main engine 1 is usually kept at a lean air-fuel ratio (A/F)L which is leaner than the stoichiometric air-fuel ratio (A/F)S. In this case, the lean air-fuel ratio (A/F)L may be arbitrarily determined, however, in this embodiment, the lean air-fuel ratio (A/F)L is determined to be a constant, such as 18.5, regardless of the operating condition of the main engine 1. When the main engine 1 performs the lean operation continuously, it is possible to reduce the fuel consumption rate of the main engine 1. Note that a stoichiometric operation, in which a target air-fuel ratio is made equal to the stoichiometric air-fuel ratio (A/F)S, may be performed in, for example, the accelerating operation of the engine to ensure a larger engine output.

If the exhaust gas exhausted when the main engine 1 performs the lean operation is directly introduced to the TW catalyst or the $NH_3$—AO catalyst, it is impossible to purify $NO_X$ in the exhaust gas sufficiently. Therefore, $NH_3$ is synthesized from $NO_X$ contained in the exhaust gas of the main engine 1 or the auxiliary engine 20, and $NO_X$ is reduced by thus synthesized $NH_3$. This is the basic concept of the exhaust gas purifying method of the present invention. Next, referring to FIGS. 3 and 6, the exhaust gas purifying method of the present embodiment will be explained in detail.

FIG. 3 is a schematic illustration of the basic exhaust gas purifying method of the present embodiment. Since the first cylinder group 1a performs the lean operation as described above, the exhaust gas air-fuel ratio of the exhaust gas discharged from the first cylinder group 1a is lean. If this exhaust gas is introduced to the TW catalyst 8a as it is, the TW catalyst 8a does not synthesize $NH_3$. Therefore, the auxiliary engine 20 is made to perform a rich operation in which the target air-fuel ratio is richer than the stoichiometric air-fuel ratio (A/F)S, to form the exhaust gas of which the exhaust gas air-fuel ratio is rich, and the switching valve 25 is turned ON, and the exhaust gas is fed to the exhaust pipe 7 via the switching valve 25 and the exhaust gas introducing pipe 26, to thereby make the exhaust gas air-fuel ratio of the exhaust gas flowing to the TW catalyst 8a rich. In other words, the reducing agent is formed by an exhaust gas discharged from the auxiliary engine 20 performing the rich operation, and the reducing agent is fed into the exhaust gas discharged from the first cylinder group 1a, to thereby make the exhaust gas air-fuel ratio of the exhaust gas flowing into the TW catalyst 8a is made rich.

When the exhaust gas air-fuel ratio of the exhaust gas flowing into the TW catalyst 8a is rich, $NH_3$ is synthesized from $NO_X$ in the inflowing exhaust gas by the reactions expressed by the aforementioned equations (1) and (2). The $NH_3$ then flows to the $NH_3$—AO catalyst 14a via the interconnecting pipe 13. On the other hand, $NO_X$ in the exhaust gas discharged from the second cylinder group 1b flows to the $NH_3$—AO catalyst 14a via the interconnecting pipe 13.

Accordingly, both the exhaust gas discharged from the TW catalyst 8a and that from the second cylinder group 1b flow to the $NH_3$—AO catalyst 14a. In this case, since the exhaust gas air-fuel ratio of the exhaust gas from the second cylinder group 1b is lean and an amount of the exhaust gas from the second cylinder group 1b is relatively large, the exhaust gas air-fuel ratio of the entire exhaust gas flowing to the $NH_3$—AO catalyst 14a is always maintained lean. Thus, at the $NH_3$—AO catalyst 14a, $NO_X$ and $NH_3$ in the exhaust gas flowing to the $NH_3$—AO catalyst 14a is purified by the reactions expressed by the aforementioned equations (7) through (10). Accordingly, it is possible to prevent $NO_X$ and $NH_3$ from being discharged into the ambient air. Note that the exhaust gas flowing into the $NH_3$—AO catalyst 14a contains unburned hydrocarbon HC, carbon monoxide CO, and hydrogen $H_2$. It is considered that the HC and CO, etc.

contained in the exhaust gas may act as a reducing agent as in the same manner as $NH_3$, and reduce some $NO_X$ at the $NH_3$—AO catalyst 14a. However, the reducing ability of $NH_3$ is stronger than that of HC and CO, etc. Accordingly, when $NH_3$ is used as a reducing agent, $NO_X$ is more sufficiently reduced.

The rich air-fuel ratio (A/F)R of the auxiliary engine 20 may be arbitrarily determined, as long as the exhaust gas air-fuel ratio of the exhaust gas flowing into the TW catalyst 8a is kept rich. However, in this embodiment, the rich air-fuel ratio (A/F)R is determined to make the exhaust gas air-fuel ratio of the exhaust gas flowing to the TW catalyst 8a at a predetermined rich air-fuel ratio (A/F)RR, for example, 13.8. Accordingly, $NH_3$ is synthesized more effectively, while the fuel consumption rate is reduced.

To keep the exhaust gas air-fuel ratio of the exhaust gas flowing to the TW catalyst 8a constant, an amount of the reducing agent to be fed to the exhaust gas of the first cylinder group 1a per unit time must increase as an amount of the exhaust gas discharged from the first cylinder group 1a per unit time increases. On the other hand, as the rich air-fuel ratio (A/F)R for the auxiliary engine 20 is made smaller or richer in this embodiment, the amount of the reducing agent fed from the auxiliary engine 20 to the exhaust gas of the first cylinder group 1a increases.

Figure 4A:
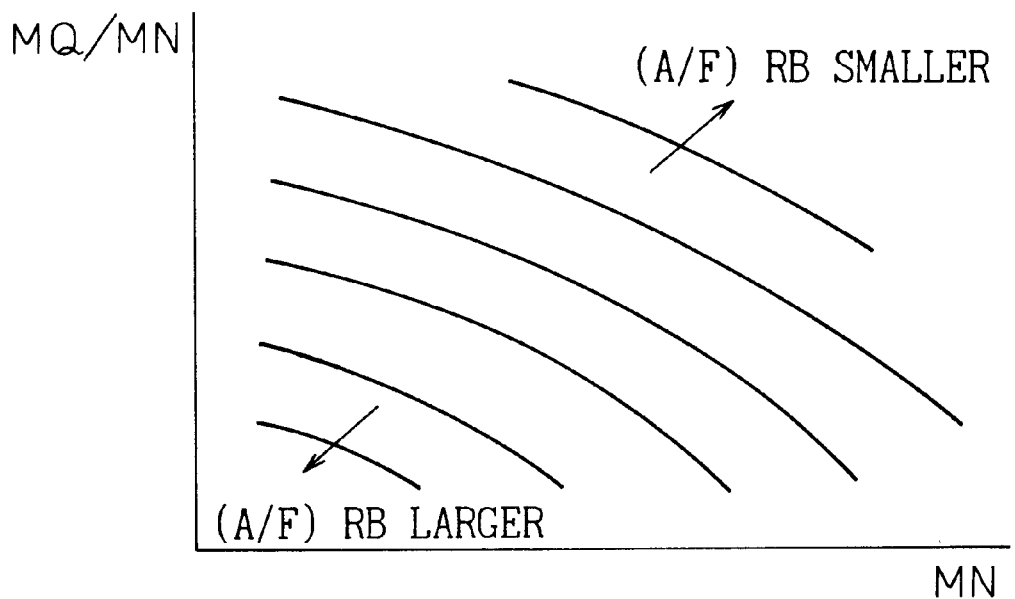
FIGS. 4A and 4B are diagrams illustrating a rich air-fuel ratio (A/F)RB.
Figure 4B:
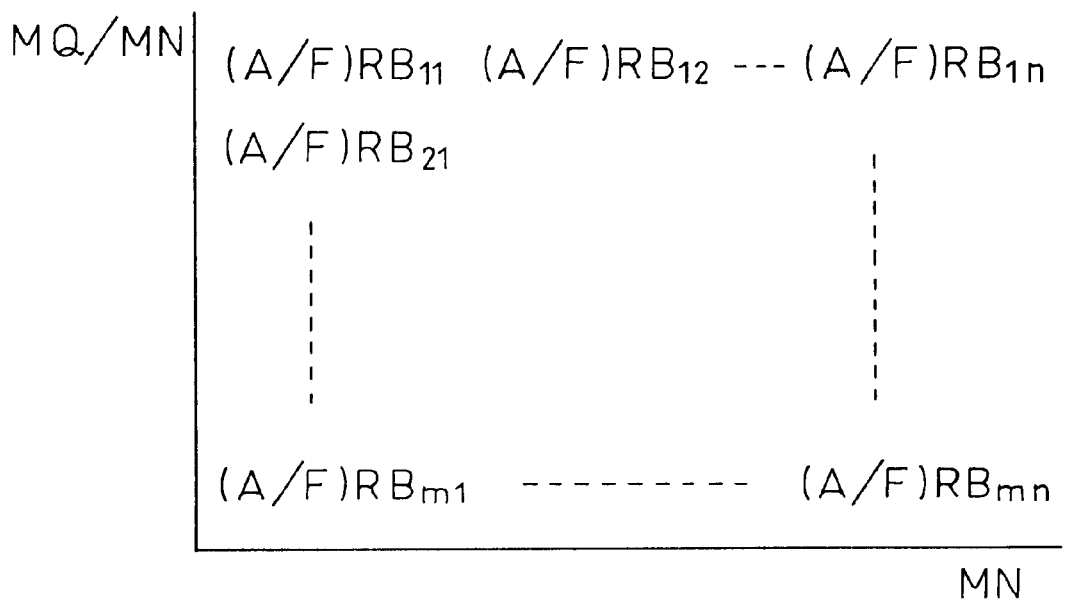

FIG. 4 illustrates the relationships, obtained by experiments, between the rich air-fuel ratio (A/F)RB of the auxiliary engine 20 suitable for keeping the exhaust gas air-fuel ratio of the exhaust gas flowing into the TW catalyst 8a at the rich air-fuel ratio (A/F)RR, and the engine load MQ/MN and the engine speed MN of the main engine 1, under the constant operating condition of the auxiliary engine 20, that is, the constant engine load AQ/AN and the constant engine speed AN. In FIG. 4(A), the curves show the identical rich air-fuel ratio (A/F)RB. As can be seen in FIG. 4(A), when the engine load MQ/MN of the main engine 1 becomes larger, an amount of the exhaust gas discharged from the first cylinder group 1a per unit time increases, and thus the rich air-fuel ratio (A/F)RB becomes smaller. When the engine speed MN of the main engine 1 increases, an amount of the exhaust gas discharged from the first cylinder group 1a per unit time increases, and thus the rich air-fuel ratio (A/F)RB becomes smaller. The rich air-fuel ratio (A/F)RB is stored in advance in the ROM 42 in the form of a map shown in FIG. 4(B).

On the other hand, also when the operating condition of the auxiliary engine 20 fluctuates, an amount of the reducing agent fed from the auxiliary engine 20 fluctuates. That is, when an amount of the exhaust gas discharged from the auxiliary engine 20 per unit time increases, an amount of the reducing agent fed from the auxiliary engine 20 per unit time increases. Therefore, a coefficient RK is adopted which increases as the amount of the exhaust gas discharged from the auxiliary engine 20 per unit time increases, and the rich air-fuel ratio (A/F)R for the auxiliary engine 20 in which the rich operation is performed is calculated by multiplying the coefficient RK with the aforementioned rich air-fuel ratio (A/F)RB.

Figure 5A:
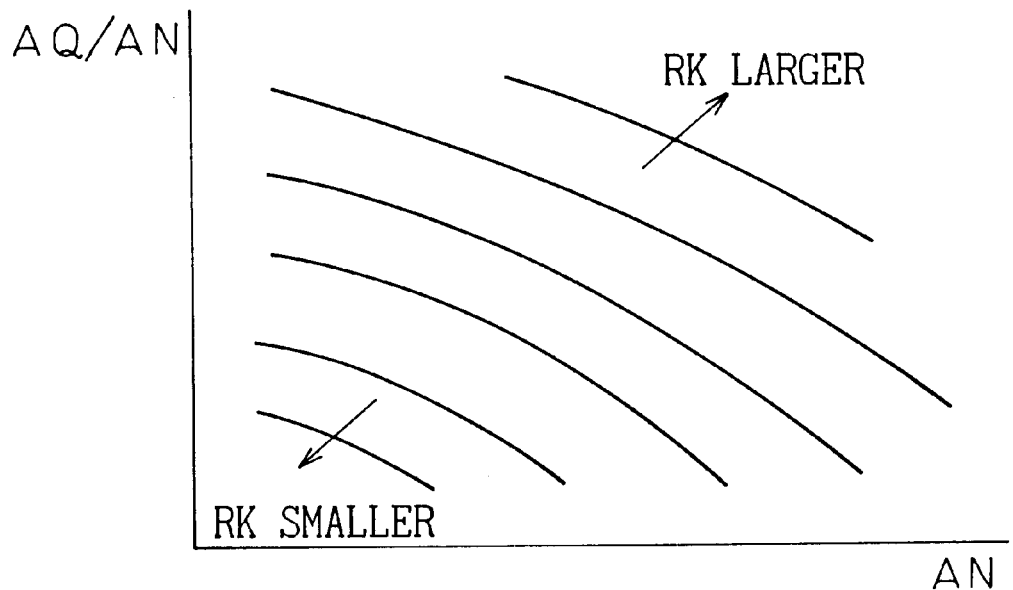
FIGS. 5A and 5B are diagrams illustrating a coefficient RK.
Figure 5B:
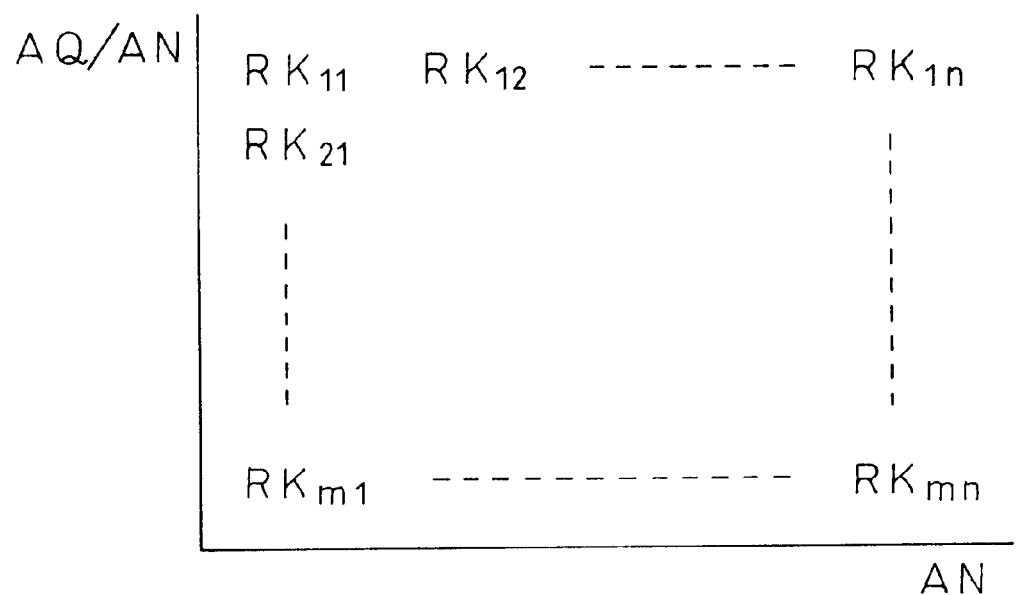

FIG. 5(A) illustrates the relationships, obtained by experiments, between the coefficient RK suitable for keeping the exhaust gas air-fuel ratio of the exhaust gas flowing to the TW catalyst 8a at (A/F)RR, and the engine load AQ/AN and the engine speed AN of the auxiliary engine 20, under the constant rich air-fuel ratio (A/F)RB. In FIG. 5(A), each curve shows the identical coefficient RK. As can be seen in FIG. 5(A), as the engine load AQ/AN increases, an amount of the exhaust gas discharged from the auxiliary engine 20 per unit time increases, and thus the coefficient RK also increases. When the engine speed AN increases, an amount of the exhaust gas discharged from the auxiliary engine 20 per unit time increases, and thus the coefficient RK increases. This coefficient RK is stored in ROM 42 in advance in the form of a map shown in FIG. 5(B).

As described above, at the $NH_3$—AO catalyst 14a, $NO_X$ discharged from the second cylinder group 1b is reduced by $NH_3$ from the TW catalyst 8a. In this case, if an amount of $NH_3$ flowing to the $NH_3$—AO catalyst 14a is smaller than that of $NH_3$ necessary for purifying $NO_X$ flowing to the $NH_3$—AO catalyst 14a, $NO_X$ flows out from the $NH_3$—AO catalyst 14a without being purified. On the contrary, even if an amount of $NH_3$ flowing to the $NH_3$—AO catalyst 14a is much larger than the amount of $NH_3$ necessary for purifying $NO_X$ flowing to the $NH_3$—AO catalyst 14a, the excess $NH_3$ is adsorbed in the $NH_3$—AO catalyst 14a. Therefore, both $NO_X$ and $NH_3$ are prevented from flowing out of the $NH_3$—AO catalyst 14a. Accordingly, the exhaust gas air-fuel ratio (A/F)RR of the exhaust gas flowing to the TW catalyst 8a is determined to make the amount of $NH_3$ flowing to the $NH_3$—AO catalyst 14a equal to or larger than the amount of $NH_3$ necessary for purifying $NO_X$ flowing to the $NH_3$—AO catalyst 14a.

However, as shown in FIG. 3, if the exhaust gas of the auxiliary engine 20 is continuously fed into the exhaust pipe 7 to continuously perform the $NH_3$ synthesizing operation in the TW catalyst 8a and thereby the excess $NH_3$ is continuously adsorbed in the $NH_3$—AO catalyst 14a, the $NH_3$ adsorbing capacity of the $NH_3$—AO catalyst 14a becomes lowered. If the $NH_3$—AO catalyst 14a saturates, $NH_3$ is discharged from the $NH_3$—AO catalyst 14a without being purified. To solve the above problem, the amount of $NH_3$ adsorbed in the $NH_3$—AO catalyst 14a, that is, the adsorbed $NH_3$ amount is found, and when this adsorbed $NH_3$ amount exceeds a predetermined upper threshold $UT(NH_3)$, the switching valve 25 is turned OFF to stop feeding the exhaust gas of the auxiliary engine 20 into the exhaust pipe 7. As a result, the excess $NH_3$ is prevented from being discharged without being adsorbed in the $NH_3$—AO catalyst 14a.

When the feeding of the exhaust gas of the auxiliary engine 20 into the exhaust pipe 7 is stopped, the exhaust gas air-fuel ratio of the exhaust gas flowing to the TW catalyst 8a becomes lean. As a result, $NO_X$ in the exhaust gas flowing to the TW catalyst 8a passes through the TW catalyst 8a as it is. In other words, the $NH_3$ synthesizing operation of the TW catalyst 8a is stopped. The $NO_X$ passing through the TW catalyst 8a then flows to the $NH_3$—AO catalyst 14a.

When $NH_3$ does not flow to the $NH_3$—AO catalyst 14a, the adsorbed $NH_3$ is desorbed from the $NH_3$—AO catalyst 14a. The desorbed $NH_3$ reduces $NO_X$ in the exhaust gas flowing to the $NH_3$—AO catalyst 14a. Accordingly, also when the feeding of the exhaust gas of the auxiliary engine 20 into the exhaust pipe 7 is stopped, both $NO_X$ and $NH_3$ is sufficiently purified at the $NH_3$—AO catalyst 14a. Namely, also in this case, $NO_X$ and $NH_3$ is prevented from flowing out of the $NH_3$—AO catalyst 14a without being purified.

Figure 6:
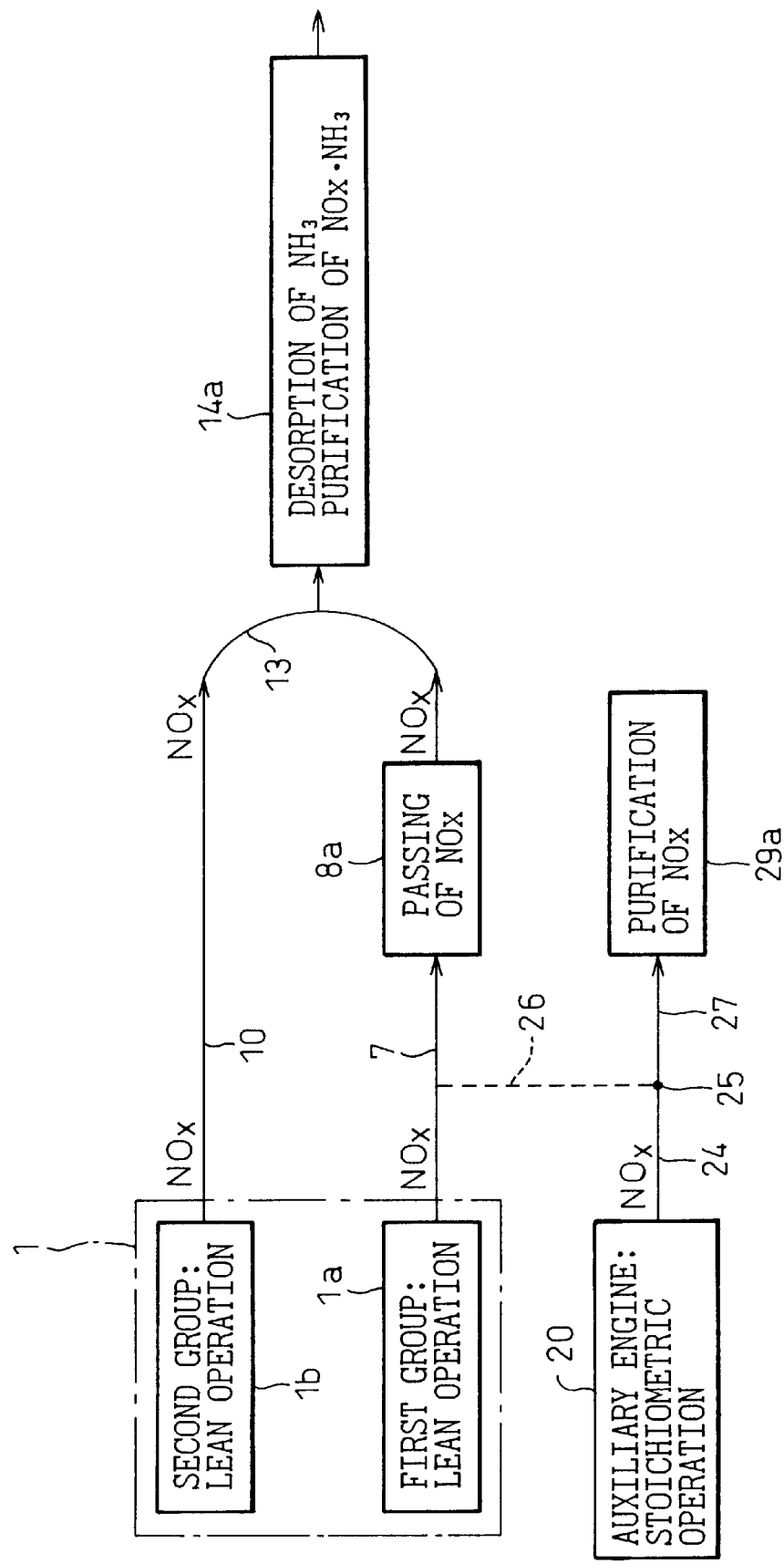
FIG. 6 schematically illustrates the exhaust gas purifying method of the exhaust gas purifying device shown in FIG. 1.

On the other hand, the exhaust gas discharged from the auxiliary engine 20 is introduced to the TW catalyst 29a via the switching valve 25 and the introducing pipe 27. In this case, the auxiliary engine 20 performs the stoichiometric operation. As a result, $NO_X$, HC and CO in the exhaust gas discharged from the auxiliary engine 20 is simultaneously purified at the TW catalyst 29a. That is, both the exhaust gases of the main engine 1 and the auxiliary engine 20 are sufficiently purified. FIG. 6 schematically illustrates the exhaust gas purifying method in this case.

When the feeding of the exhaust gas from the auxiliary engine 20 to the exhaust pipe 7 is stopped in this way, the adsorbed $NH_3$ is gradually desorbed from the $NH_3$—AO catalyst 14a. When the adsorbed $NH_3$ amount of the $NH_3$—AO catalyst 14a becomes smaller and the $NH_3$ amount desorbing from the $NH_3$—AO catalyst 14a becomes smaller, $NO_X$ flowing to the $NH_3$—AO catalyst 14a will be discharged from the $NH_3$—AO catalyst 14a without being reduced. In order to solve the above problem, when the adsorbed $NH_3$ amount of the $NH_3$—AO catalyst 14a becomes smaller than a predetermined lower threshold $LT(NH_3)$, the auxiliary engine 20 performs the rich operation again, and the exhaust discharged from the auxiliary engine 20 is fed to the exhaust pipe 7. As a result, $NH_3$ synthesizing at the TW catalyst 8a is resumed, and the feeding of the $NH_3$ to the $NH_3$—AO catalyst 14a is resumed. Accordingly, $NO_X$ is prevented from flowing out of the $NH_3$—AO catalyst 14a without being purified.

FIG. 7 is a time chart illustrating the adsorbed $NH_3$ amount $S(NH_3)$ of the $NH_3$—AO catalyst 14a, a condition of the switching valve 25, the target air-fuel ratios $M(A/F)T$ and $A(A/F)T$ of the main and the auxiliary engines 1 and 20. In FIG. 7, time zero shows a time at which the switching valve 25 is turned ON and the feeding of the exhaust gas from the auxiliary engine 20 into the exhaust pipe 7 starts. When the switching valve 25 is turned ON, the target air-fuel ratio $A(A/F)T$ of the auxiliary engine 20 is made equal to the rich air-fuel ratio (A/F)R, and the auxiliary engine 20 performs the rich operation. When the feeding of the exhaust gas of the auxiliary engine 20 starts, the adsorbed $NH_3$ amount $S(NH_3)$ increases gradually. At the time of "a", the adsorbed $NH_3$ amount $S(NH_3)$ exceeds the upper threshold $UT(NH_3)$. When $S(NH_3)>UT(NH_3)$, the switching valve 25 is turned OFF, and the exhaust gas of the auxiliary engine 20 is introduced to the TW catalyst 29a. In this case, the target air-fuel ratio $A(A/F)T$ of the auxiliary engine 20 is made equal to the stoichiometric air-fuel ratio (A/F)S, and the auxiliary engine 20 performs the stoichiometric operation. As a result, the $NH_3$ adsorbed in the $NH_3$—AO catalyst 14a is gradually desorbed therefrom. Therefore, the adsorbed $NH_3$ amount $S(NH_3)$ decreases gradually. At the time of "b", the adsorbed $NH_3$ amount $S(NH_3)$ becomes smaller than the lower threshold $LT(NH_3)$. When $S(NH_3)<LT(NH_3)$, the target air-fuel ratio $A(A/F)T$ of the auxiliary engine 20 is made equal to the rich air-fuel ratio (A/F)R again, and the switching valve 25 is turned ON again, and thereby the exhaust gas of the auxiliary engine 20 is fed into the exhaust pipe 7. Note that the target air-fuel ratio $M(A/F)T$ of the main engine 1 is kept at the lean air-fuel ratio (A/F)L.

It is difficult to directly find the adsorbed $NH_3$ amount $S(NH_3)$ in the $NH_3$—AO catalyst 14a. Therefore, according to the present embodiment, the adsorbed $NH_3$ amount $S(NH_3)$ is estimated on the basis of the difference between the amounts of $NH_3$ and $NO_X$ flowing to the $NH_3$—AO catalyst 14a, that is, the difference between the amount of $NH_3$ synthesized at the TW catalyst 8a and the amount of $NO_X$ discharged from the second cylinder group 1b.

To find the amount of $NH_3$ flowing to the $NH_3$—AO catalyst 14a, a sensor for detecting the $NH_3$ amount may be arranged in the interconnecting pipe 13 between the TW catalyst 8a and the $NH_3$—AO catalyst 14a. However, the amount of $NH_3$ flowing to the $NH_3$—AO catalyst 14a, that is, the amount of $NH_3$ synthesized at the TW catalyst 8a is estimated on the basis of the amount of $NO_X$ flowing to the TW catalyst 8a. The amount of $NO_X$ flowing to the TW catalyst 8a is estimated on the basis of the operating conditions of the main engine 1 and the auxiliary engine 20.

That is, as the amount of $NO_X$ flowing to the TW catalyst 8a per unit time increases, the amount of $NH_3$ synthesized at the TW catalyst 8a per unit time increases. Further, as the conversion efficiency ETA of the TW catalyst 8a increases, the amount of $NH_3$ synthesized at the TW catalyst 8a increases.

When the $NH_3$ adsorbing operation is performed at the $NH_3$—AO catalyst 14a, the amount of $NO_X$ flowing to the TW catalyst 8a per unit time $Q(NO_X)$ is obtained as a sum of the amount of $NO_X$ discharged from the first cylinder unit 1a per unit time $Ma(NO_X)$ and the amount of $NO_X$ discharged from the auxiliary engine 20 per unit time $A(NO_X)$. As the engine speed MN of the main engine 1 increases, the amount of the exhaust gas discharged from the first cylinder group 1a per unit time increases, and thus the $NO_X$ amount $Ma(NO_X)$ increases. Also, as the engine load MQ/MN of the main engine 1 increases, the amount of the exhaust gas discharged from the first cylinder group 1a increases and the combustion temperature raises, and thus the $NO_X$ amount $Ma(NO_X)$ increases.

Figure 8A:
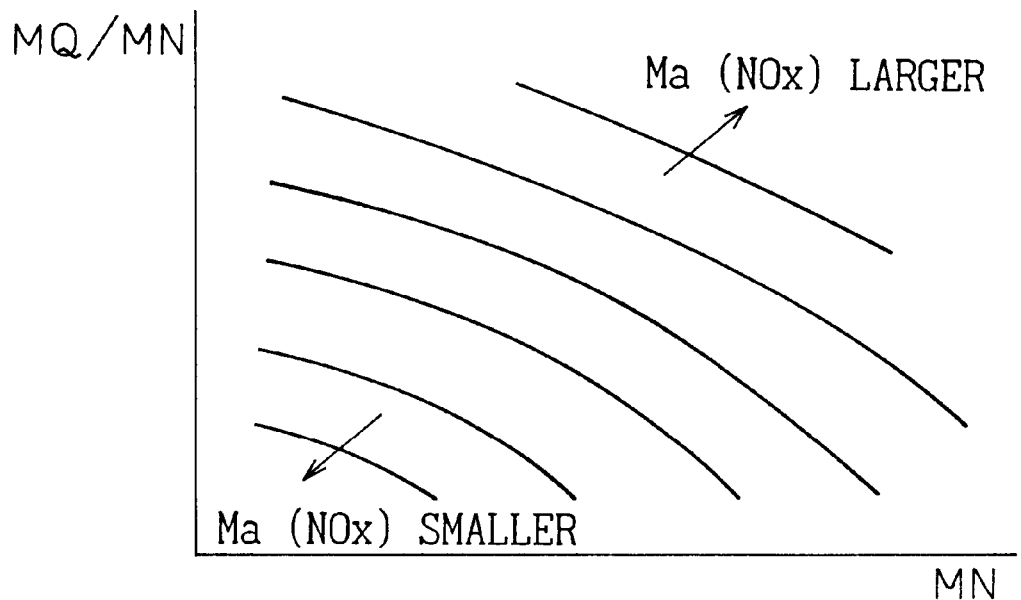
FIGS. 8A and 8B are diagrams illustrating an amount of $NO_X$ discharged from the first cylinder group per unit time.

FIG. 8(A) illustrates relationships, obtained by experiments, between the $NO_X$ amount $Ma(NO_X)$, and the engine load MQ/MN and the engine speed MN of the main engine 1, under the constant lean air-fuel ratio (A/F)L. In FIG. 8(A), each curve shows the identical $NO_X$ amount. As shown in FIG. 8(A), the $NO_X$ amount $Ma(NO_X)$ increases as the engine load MQ/MN increases. Also, $Ma(NO_X)$ increases as the engine speed MN increases. Note that, the $NO_X$ amount $Ma(NO_X)$ shown in FIG. 8(A) is stored in advance in the ROM 42 in the form of a map shown in FIG. 8(B).

Similarly, as the engine speed AN of the auxiliary engine 20 increases, the amount of exhaust gas discharged from the auxiliary engine 20 per unit time increases, and thus $A(NO_X)$ increases. As the engine load AQ/AN of the auxiliary engine 20 increases, an amount of exhaust gas discharged from the auxiliary engine 20 increases and the combustion temperature raises, and thus $A(NO_X)$ increases.

Figure 9A:
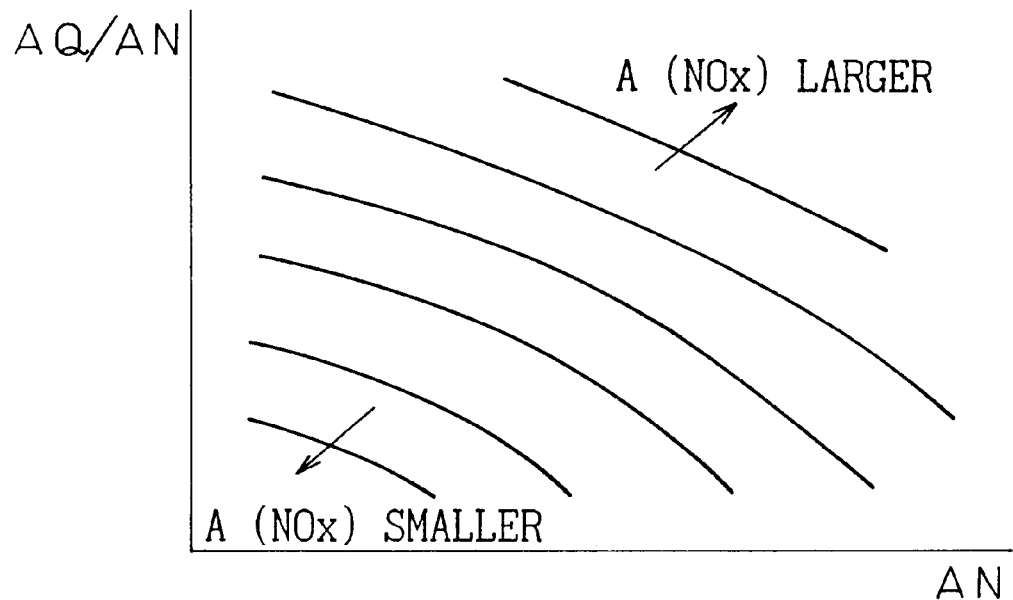
FIGS. 9A and 9B are diagrams illustrating an amount of $NO_X$ discharged from the auxiliary engine per unit time.

FIG. 9(A) illustrates relationships, obtained by experiments, between the $NO_X$ amount $A(NO_X)$, and the engine load AQ/AN and the engine speed AN of the auxiliary engine 20, under the constant rich air-fuel ratio (A/F)R. In FIG. 9(A), each curve shows the identical $NO_X$ amount. As shown in FIG. 9(A), the $NO_X$ amount $A(NO_X)$ increases as the engine load AQ/AN increases. Also, the $NO_X$ amount $A(NO_X)$ increases as the engine speed AN increases. Note that the $NO_X$ amount $A(NO_X)$ shown in FIG. 9(A) is stored in the ROM 42 in advance in the form of a map shown in FIG. 9(B).

Figure 9B:
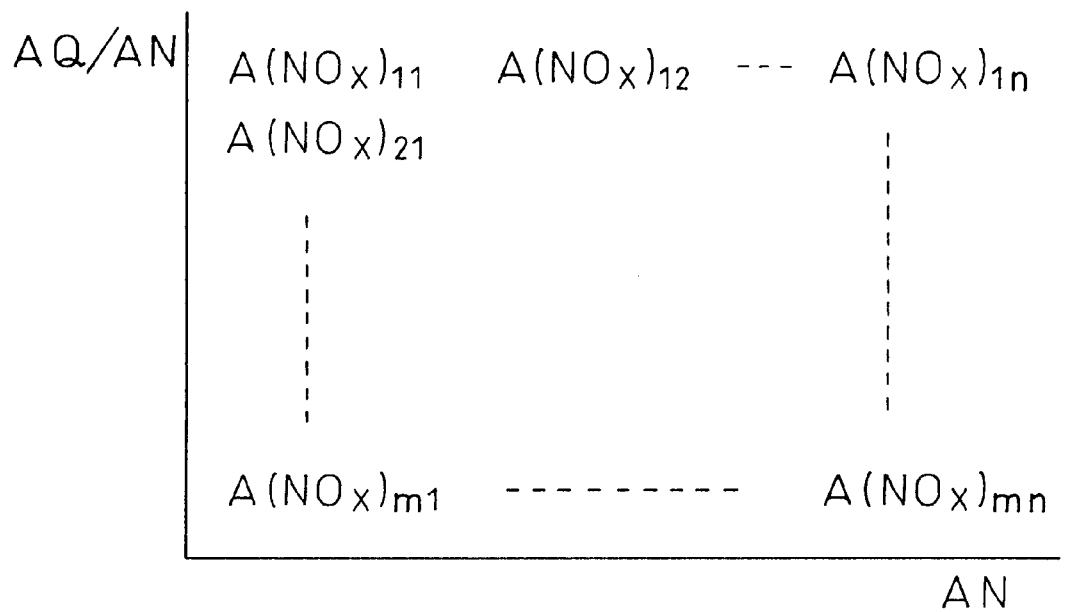
Figure 10:
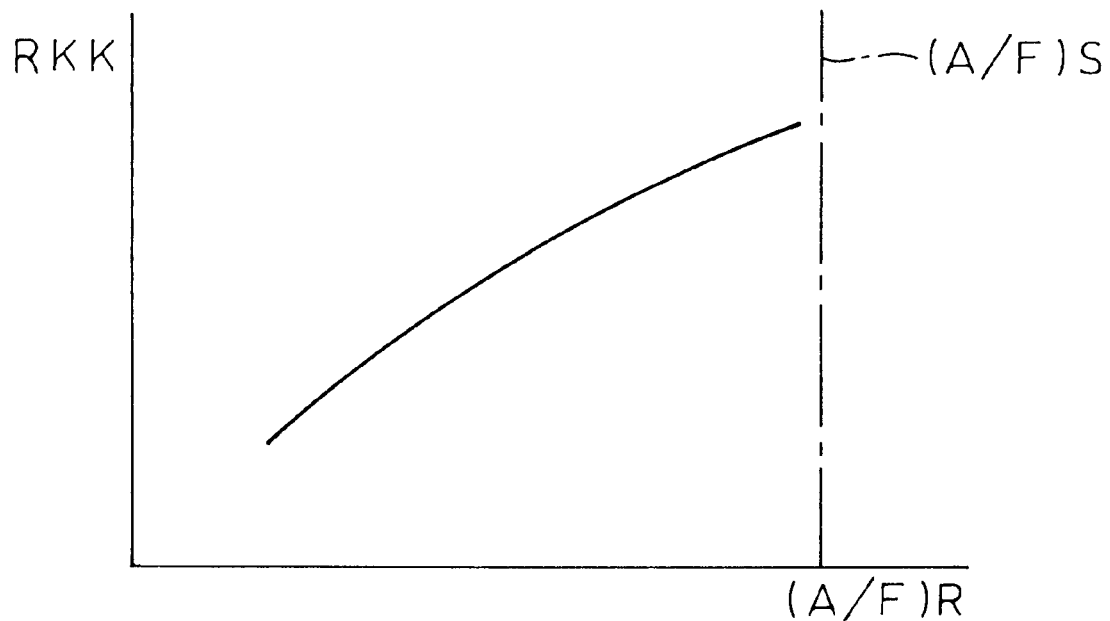
FIG. 10 is a diagram illustrating a correction coefficient RKK.

Further, $A(NO_X)$ becomes smaller as the rich air-fuel ratio (A/F)R, which is the target air-fuel ratio (A/F)T of the auxiliary engine 20, becomes smaller. Thus, a coefficient RKK is adopted which becomes smaller as the rich air-fuel ratio (A/F)R becomes smaller as shown in FIG. 10, and $A(NO_X)$ found by FIG. 9(B) is corrected by multiplying the coefficient RKK therewith. This coefficient RKK is stored in the ROM 42 in advance in the form of a map shown in FIG. 10.

Figure 11:
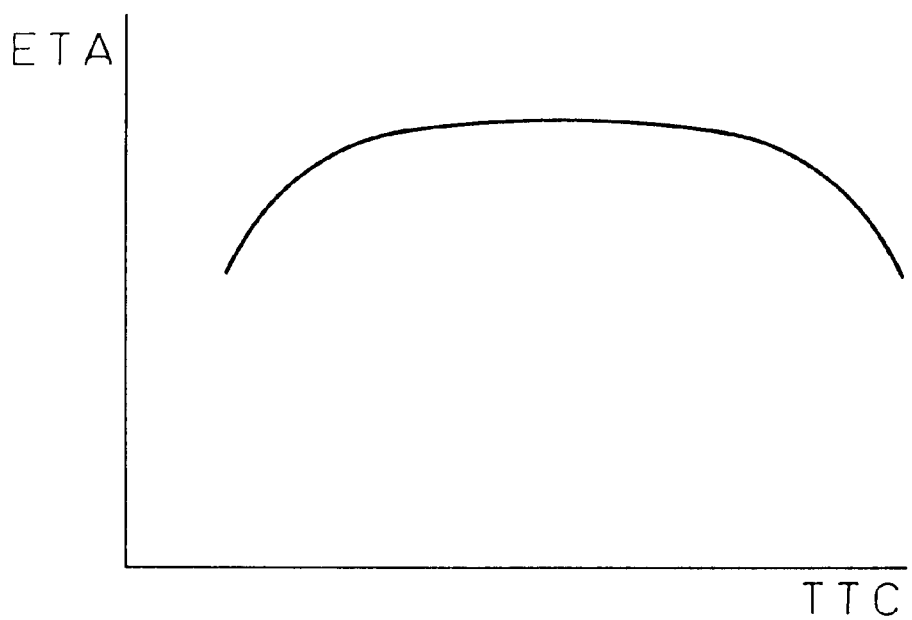
FIG. 11 is a diagram illustrating a conversion efficiency of the TW catalyst.

On the other hand, the conversion efficiency ETA of the TW catalyst 8a changes in accordance with the exhaust gas temperature TTC of the exhaust gas flowing to the TW catalyst 8a which represents the temperature of the TW catalyst 8a. Namely, as shown in FIG. 11, at the constant rich air-fuel ratio (A/F)R, the conversion efficiency ETA increases as the temperature TTC raises when TTC is low, and decreases as the temperature TTC raises when TTC is high. The conversion efficiency ETA is stored in the ROM 42 in advance in the form of a map shown in FIG. 11.

As can be seen in FIG. 2(B), the $NO_X$ amount $Ma(NO_X)$ discharged from the first cylinder group 1a per unit time changes in accordance with the engine air-fuel ratio of the first cylinder group 1a. Accordingly, when the lean air-fuel ratio (A/F)L changes in accordance with, for example, the operating condition of the main engine 1, it is necessary to correct $Ma(NO_X)$ found by the map shown in FIG. 8(B), in accordance with the lean air-fuel ratio (A/F)L. Alternatively, it is necessary to find, in advance, a map showing relationships between the lean air-fuel ratio (A/F)L and $Ma(NO_X)$ and to find $Ma(NO_X)$ by this map. The conversion efficiency ETA of the TW catalyst 8a also changes in accordance with the exhaust gas air-fuel ratio (A/F)RR of the exhaust gas flowing to the TW catalyst 8a as shown in FIG. 2(A). Accordingly, when (A/F)RR changes in accordance with, for example, the operating condition of the main engine 1, it is necessary to correct the efficiency ETA found by the map in FIG. 11, in accordance with (A/F)RR. Alternatively, it is necessary to find, in advance, a map showing relationships between (A/F)RR and the efficiency ETA, and to find ETA by this map.

A product $Q(NO_X)\cdot ETA$ of $Q(NO_X)$, which is a sum of $Ma(NO_X)$ and $A(NO_X)\cdot RKK$, and ETA, represents the amount of $NH_3$ flowing to the $NH_3$—AO catalyst 14a per unit time $F(NH_3)$.

To find the amount of $NO_X$ flowing to the $NH_3$—AO catalyst 14a when the second cylinder group 1b performs the lean operation, $F(NO_X)$, a sensor for detecting the inflowing $NO_X$ amount $F(NO_X)$ may be arranged in the interconnecting pipe 13 between the second cylinder group 1b and the $NH_3$—AO catalyst 14a. However, the inflowing $NO_X$ amount $F(NO_X)$ can be found on the basis of the amount of $NO_X$ discharged from the second cylinder group 1b per unit time $Mb(NO_X)$.

As the engine speed MN of the main engine 1 increases, the amount of exhaust gas discharged from the second cylinder group 1b per unit time increases, and thus $Mb(NO_X)$ increases. Further, as the engine load MQ/MN of the main engine 1 increases, the amount of exhaust gas discharged from the second cylinder group 1b increases and the combustion temperature raises, and thus $Mb(NO_X)$ increases.

Figure 12A:
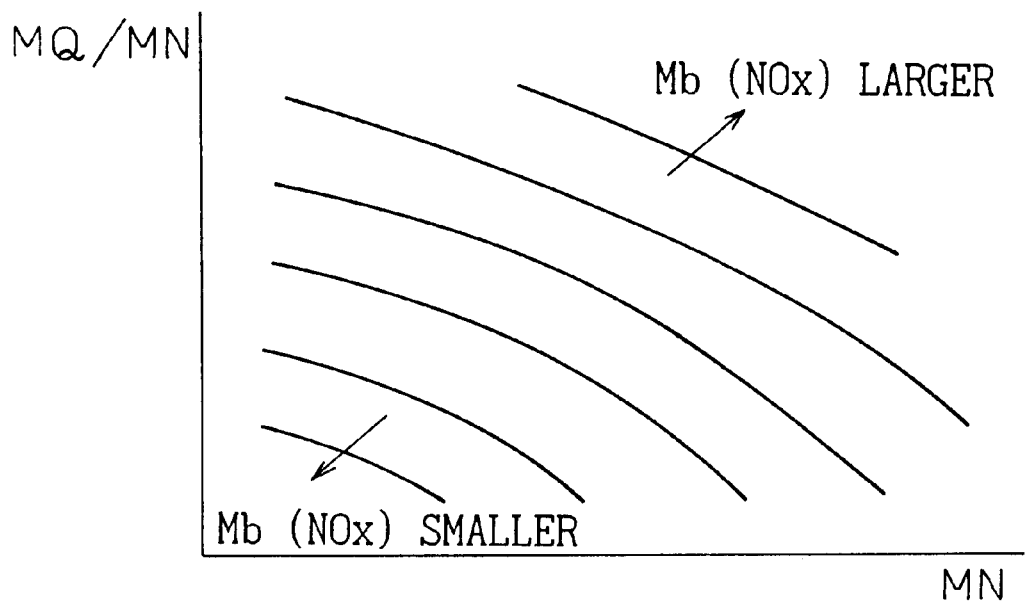
FIGS. 12A and 12B are diagrams illustrating an amount of $NO_X$ discharged from the second cylinder group per unit time.

FIG. 12(A) illustrates relationships, obtained by experiments, between the discharged $NO_X$ amount $Mb(NO_X)$, and the engine load MQ/MN and the engine speed MN of the main engine 1, under the constant lean air-fuel ratio (A/F)L. In FIG. 12(A), each curve shows the identical $NO_X$ amount. As shown in FIG. 12(A), the discharged $NO_X$ amount $Mb(NO_X)$ increases as the engine load MQ/MN increases, and also increases as the engine speed MN increases. In this embodiment, the inflowing $NO_X$ amount $F(NO_X)$ is regarded as the discharged $NO_X$ amount $Mb(NO_X)$. Note that the discharged $NO_X$ amount $Mb(NO_X)$ shown in FIG. 12(A) is stored in the ROM 42 in advance in the form of a map shown in FIG. 12(B).

If an $NH_3$ amount necessary for reducing a unit amount of inflowing $NO_X$ in the $NH_3$—AO catalyst 14a is referred to as KC, and if the $NO_X$ amount flowing to the $NH_3$—AO catalyst 14a per unit time is $F(NO_X)$, the consumed $NH_3$ amount by reducing the $NO_X$ is expressed by $KC\cdot F(NO_X)$. Accordingly, the excess $NH_3$ amount per unit time at the $NH_3$—AO catalyst 14a, that is, the amount of $NH_3$ newly adsorbed in the $NH_3$—AO catalyst 14a per unit time is expressed by $F(NH_3)-KC\cdot F(NO_X)$.

Accordingly, when the auxiliary engine 20 performs the rich operation and the exhaust gas therefrom is introduced into the exhaust pipe 7, the adsorbed $NH_3$ amount $S(NH_3)$ is expressed by the following equation:

$$S(NH_3)=S(NH_3)+\{F(NH_3)-KC \cdot F(NO_X)\} \cdot DELTAaa$$

where DELTAaa expresses a time interval of the detection time of $F(NH_3)$ and $F(NO_X)$. Accordingly, $\{F(NH_3)-KC \cdot (NO_X)\} \cdot DELTAaa$ expresses the amount of $NH_3$ newly adsorbed in the $NH_3$—AO catalyst 14a during a period from the previous detection of the $F(NH_3)$ and $F(NO_X)$ to the present detection.

Figure 13:
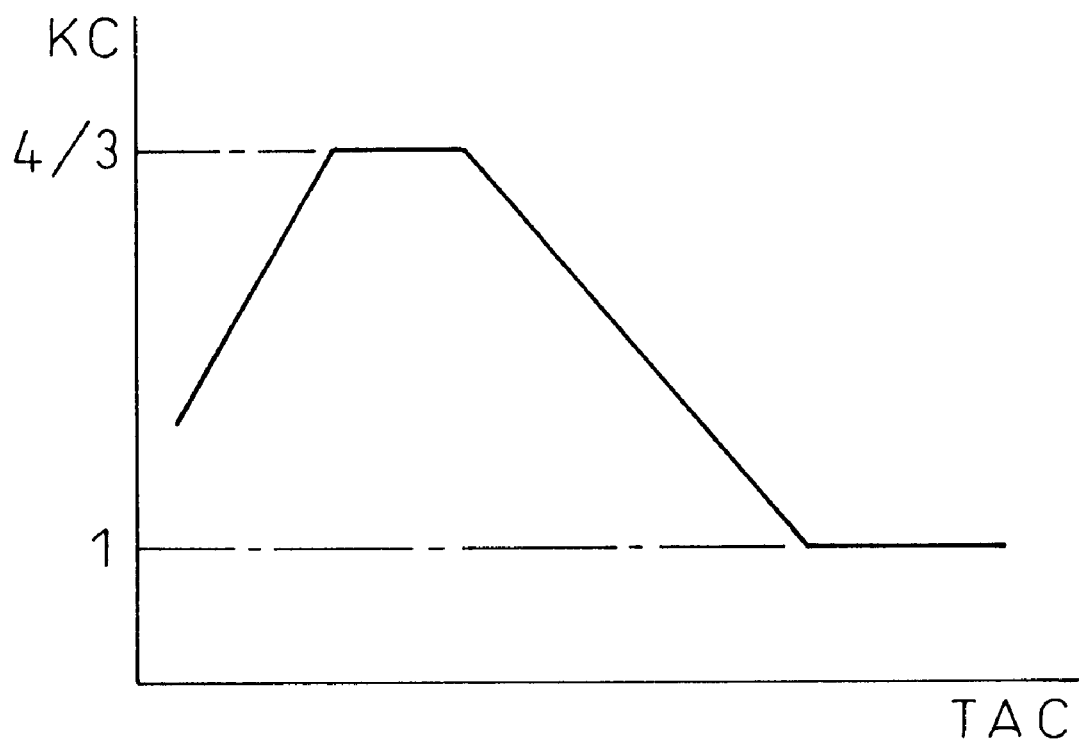
FIG. 13 is a diagram illustrating an equivalent coefficient.

KC is a coefficient determined in accordance with the fractions of components of $NO_X$ flowing to the $NH_3$—AO catalyst 14a, that is, the fractions of $NO_2$ and NO to the total $NO_X$ flowing to the $NH_3$—AO catalyst 14a. KC is referred to as an equivalent coefficient hereinafter. If all $NO_X$ flowing to the $NH_3$—AO catalyst 14a is $NO_2$, the equivalent coefficient KC is 4/3 as can be seen in the above equation (9), and if all $NO_X$ flowing to the $NH_3$—AO catalyst 14a is NO, the equivalent coefficient KC is 1 as can be seen in the above equation (10). The composition of $NO_X$ flowing to the $NH_3$—AO catalyst 14a depends on the exhaust gas air-fuel ratio and the temperature TA of the exhaust gas flowing to the $NH_3$—AO catalyst 14a. Accordingly, when the exhaust gas air-fuel ratio of the exhaust gas flowing to the $NH_3$—AO catalyst 14a is substantially constant, the equivalent coefficient KC depends on the exhaust gas temperature TAC. The relationships is shown in FIG. 13. As can be seen in FIG. 13, when the exhaust gas temperature TAC is low, the equivalent coefficient KC increases as the exhaust temperature TAC rises, and when the exhaust gas temperature TAC is high, the equivalent coefficient KC decreases as the exhaust temperature TAC rises. When the exhaust gas temperature TAC further rises, the equivalent coefficient KC is kept constant. This equivalent coefficient KC is stored in the ROM 42 in advance in the form of a map shown in FIG. 13. Note that $F(NH_3)/KC$ represents an amount of $NO_X$ capable of being reduced by $NH_3$ when the amount of $NH_3$ flowing to the $NH_3$—AO catalyst 14a is $F(NH_3)$.

Figure 14A:
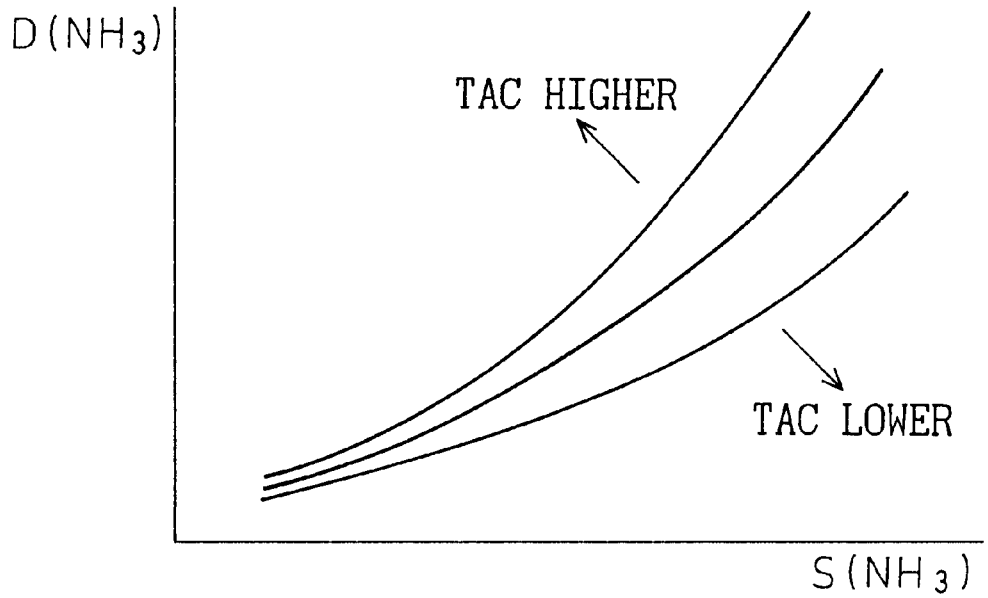
FIGS. 14A and 14B are diagrams illustrating an amount of $NH_3$ desorbed from the $NH_3$—AO catalyst per unit time.

On the other hand, FIG. 14(A) illustrates an amount of $NH_3$ desorbed from the $NH_3$—AO catalyst 14a per unit time, i.e., a desorbed $NH_3$ amount $D(NH_3)$, when the feeding of the exhaust gas from the auxiliary engine 20 into the exhaust gas pipe 7 is stopped, which is obtained by experiment. As can be seen in FIG. 14(A), the desorbed $NH_3$ amount $D(NH_3)$ increases as the adsorbed $NH_3$ amount $S(NH_3)$ of the $NH_3$—AO catalyst 14a is large. Also, as the exhaust gas temperature TAC of the exhaust gas flowing to the $NH_3$—AO catalyst 14a rises, the desorbed $NH_3$ amount $D(NH_3)$ increases. The desorbed $NH_3$ amount $D(NH_3)$ is stored in the ROM 42 in advance in the form of a map shown in FIG. 14(B).

Accordingly, the adsorbed $NH_3$ amount $S(NH_3)$ of the $NH_3$—AO catalyst 14a is obtained by the following equation when the feeding operation of the exhaust gas from the auxiliary engine 20 into the exhaust pipe 7 is stopped:

$$S(NH_3)=S(NH_3)-D(NH_3) \cdot DELTAad$$

where DELTAad represents a time interval of the detection of $D(NH_3)$. Accordingly, $D(NH_3) \cdot DELTAad$ represents an amount of $NH_3$ desorbed from the $NH_3$—AO catalyst 14a during a period from the previous detection of $D(NH_3)$ to the present detection of $D(NH_3)$.

In this embodiment, the temperature TTC and TAC of the exhaust gas flowing to the TW catalyst 8a and the $NH_3$—AO catalyst 14a are respectively detected by the temperature sensors 60 and 61. However, it is possible to estimate the exhaust gas temperatures TTC and TAC on the basis of the operating condition of the auxiliary engine 20.

If an air-fuel mixture spreading over the entire combustion chamber uniformly is formed when the target air-fuel ratio (A/F)T is very lean such as 18.5, a spark plug (not shown) cannot ignite the air-fuel mixture, because the air-fuel mixture is very thin, and misfiring may occur. To solve this, in the main engine shown in FIG. 1, an ignitable air-fuel mixture is formed in a restricted region the combustion chamber and the reminder is filled with only the air or only the air and the EGR gas, and the air-fuel mixture is ignited by the spark plug, when the lean operation is to be performed. This prevents the engine from misfiring, even when the engine air-fuel ratio is very lean. Alternatively, the misfiring may be prevented by forming a swirl flow in the combustion chamber, while forming a uniform air-fuel mixture in the combustion chamber.

Figure 15:
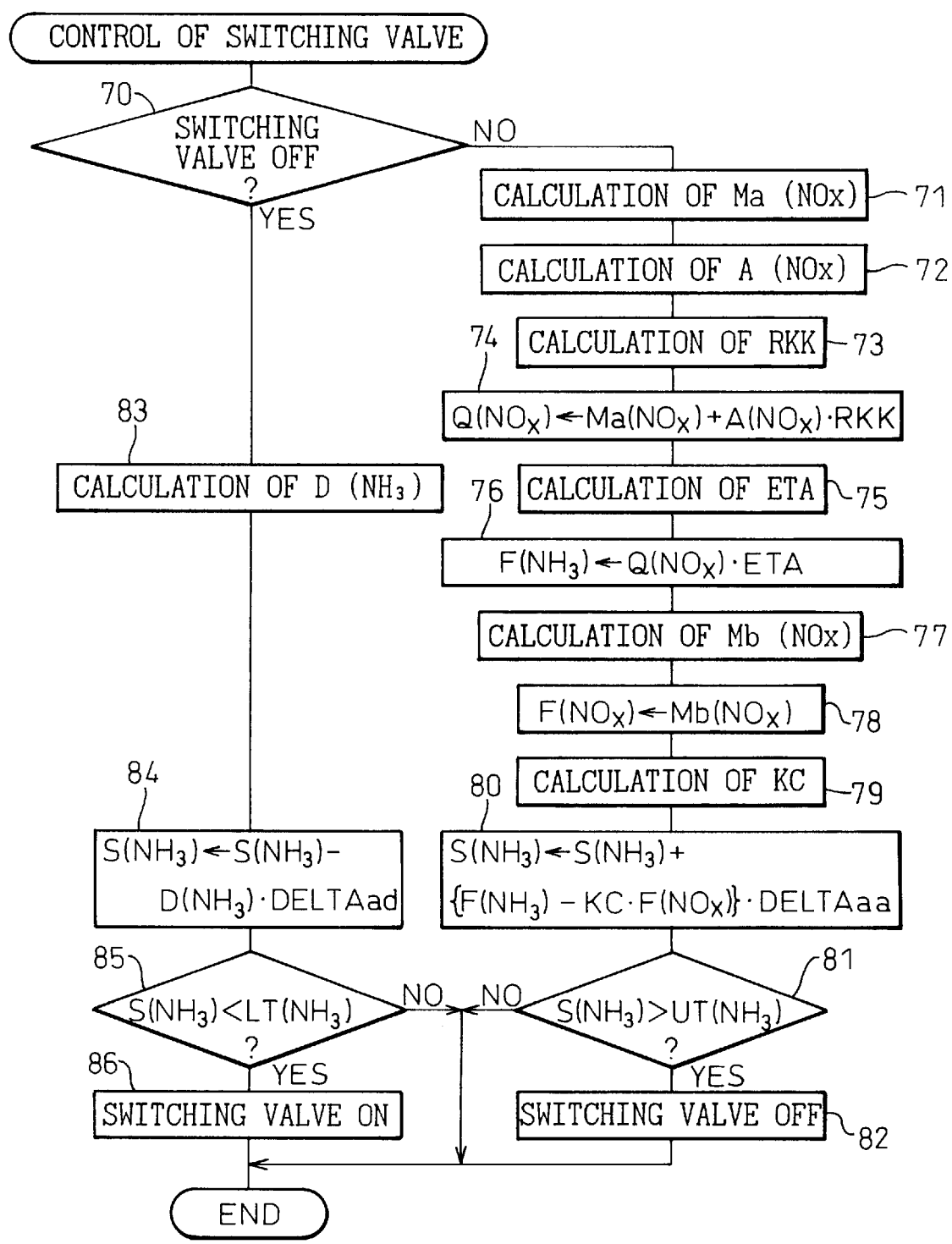
FIG. 15 is a flow chart for controlling the switching valve.

FIG. 15 illustrates a routine for controlling the switching valve. This routine is executed by interruption every predetermined time.

Referring to FIG. 15, first, in step 70, it is judged whether the switching valve 25 is turned OFF. When the switching valve 70 is turned ON, that is, when the exhaust gas of the auxiliary cylinder 20 is introduced into the exhaust pipe 7, the routine goes to step 71, where the discharged $NO_X$ amount $Ma(NO_X)$ of the first cylinder group 1a is calculated using the map shown in FIG. 8(B). In the following step 72, the discharged $NO_X$ amount $A(NO_X)$ of the auxiliary cylinder 20 is calculated using the map shown in FIG. 9(B). In the following step 73, the coefficient RKK is calculated using the map shown in FIG. 10. In the following step 74, the inflowing $NO_X$ amount $Q(NO_X)$ of the TW catalyst 8a is calculated using the following equation:

$$Q(NO_X)=Ma(NO_X)+A(NO_X) \cdot RKK$$

In the following step 75, the conversion efficiency ETA of the TW catalyst 8a is calculated using the map shown in FIG. 11. In the following step 76, the inflowing $NH_3$ amount $F(NH_3)$ of the $NH_3$—AO catalyst 14a is calculated using the following equation:

$$F(NH_3)=Q(NO_X) \cdot ETA$$

Figure 12B:
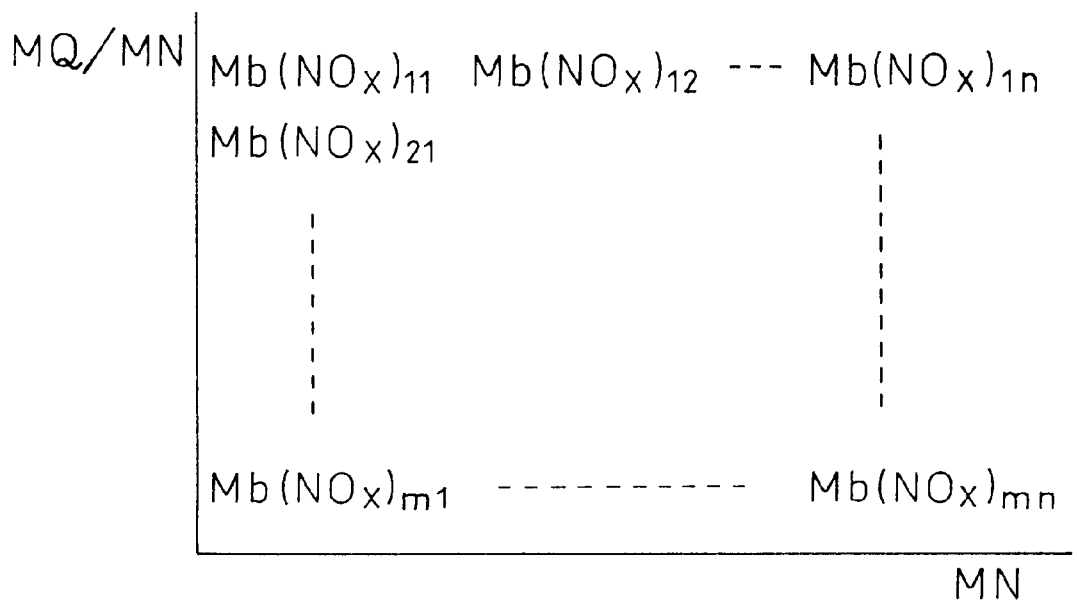

In the following step 77, the discharged $NO_X$ amount $Mb(NO_X)$ of the second cylinder group 1b is calculated using the map shown in FIG. 12(B). In the following step 78, the discharged $NO_X$ amount $Mb(NO_X)$ is memorized as the inflowing $NO_X$ amount $F(NO_X)$ of the $NH_3$—AO catalyst 14a. In the following step 79, the equivalent coefficient KC is calculated using the map shown in FIG. 13. In the following step 80, the adsorbed NH, amount $S(NH_3)$ of the $NH_3$—AO catalyst 14a is calculated using the following equation:

$$S(NH_3)=S(NH_3)+\{F(NH_3)-KC \cdot F(NO_X)\} \cdot DELTAaa$$

where DELTAaa is a time interval from the previous processing cycle to the present processing cycle. In the following step 81, it is judged whether the adsorbed $NH_3$ amount $S(NH_3)$ is larger than the upper threshold $UT(NH_3)$. If $S(NH_3) \leq UT(NH_3)$, the processing cycle is ended. That is, if $S(NH_3) \leq UT(NH_3)$, it is judged that the $NH_3$ adsorbing capacity of the $NH_3$—AO catalyst 14a is still large, and the switching valve 25 is kept turned ON, and thus the exhaust gas of the auxiliary cylinder 20 is continuously fed into the exhaust pipe 7, to thereby continue the $NH_3$ synthesizing operation of the TW catalyst 8a.

Contrarily, if $S(NH_3)>UT(NH_3)$ in step 81, the routine goes to step 82, where the switching valve 25 is turned OFF, and then the processing cycle is ended. That is, when S(NH$_3$)>UT(NH$_3$), it is judged that the NH$_3$ adsorbing capacity of the NH$_3$—AO catalyst 14$a$ becomes smaller. Therefore, the feeding of the exhaust gas from the auxiliary engine 20 into the exhaust pipe 7 is stopped, to thereby stop the NH$_3$ synthesizing operation of the TW catalyst 8$a$.

Figure 14B:
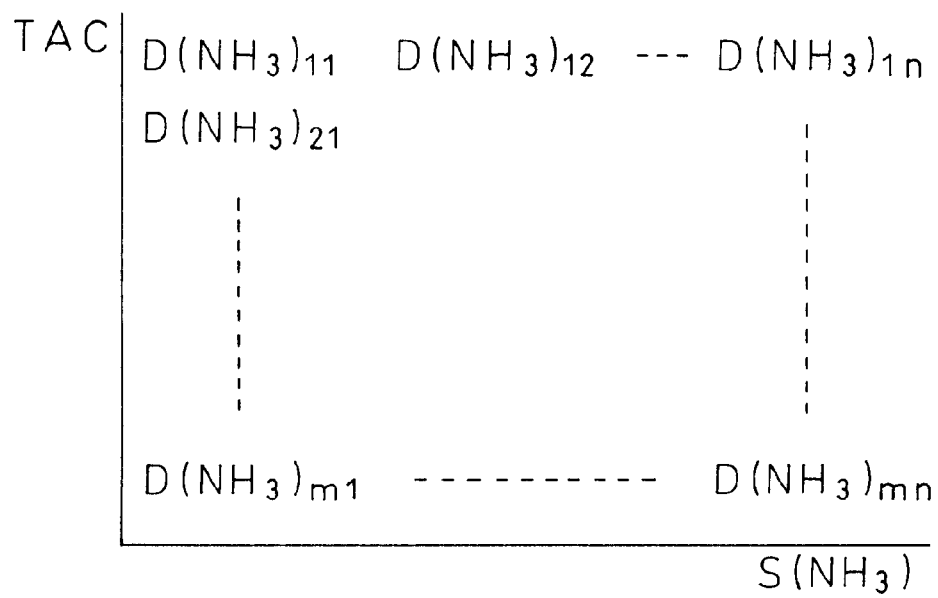

On the other hand, if the switching valve 25 is turned OFF in step 70, the routine goes to step 83, where the desorbed NH$_3$ amount D(NH$_3$) of the NH$_3$—AO catalyst 14$a$ is calculated using the map shown in FIG. 14(B). In the following step 84, the adsorbed NH$_3$ amount S(NH$_3$) of the NH$_3$—AO catalyst 14$a$ is calculated using the following equation:

$$S(NH_3)=S(NH_3)-D(NH_3) \cdot DELTAad$$

where DELTAad is a time interval from the previous processing cycle to the present processing cycle. In the following step 85, it is judged whether the adsorbed NH$_3$ amount S(NH$_3$) is smaller than the lower threshold LT(NH$_3$). If S(NH$_3$) ≧LT(NH$_3$), the processing cycle is ended. That is, if S(NH$_3$)≧UT(NH$_3$), it is judged that the NH$_3$ adsorbing capacity of the NH$_3$—AO catalyst 14$a$ is still small, and the switching valve 25 is kept being turned OFF, to thereby stop the NH$_3$ synthesizing operation of the TW catalyst 8$a$ continuously.

On the other hand, if S(NH$_3$)<LT(NH$_3$) in step 85, the routine goes to step 86, where the switching valve 25 is turned ON, and then the processing cycle is ended. That is, if S(NH$_3$)<LT(NH$_3$), it is judged that the NH$_3$ adsorbing capacity of the NH$_3$—AO catalyst 14$a$ becomes sufficiently large. Therefore, the feeding of the exhaust gas from the auxiliary engine 20 into the exhaust pipe 7 is resumed, to thereby resume the NH$_3$ synthesizing operation of the TW catalyst 8$a$.

Figure 16:
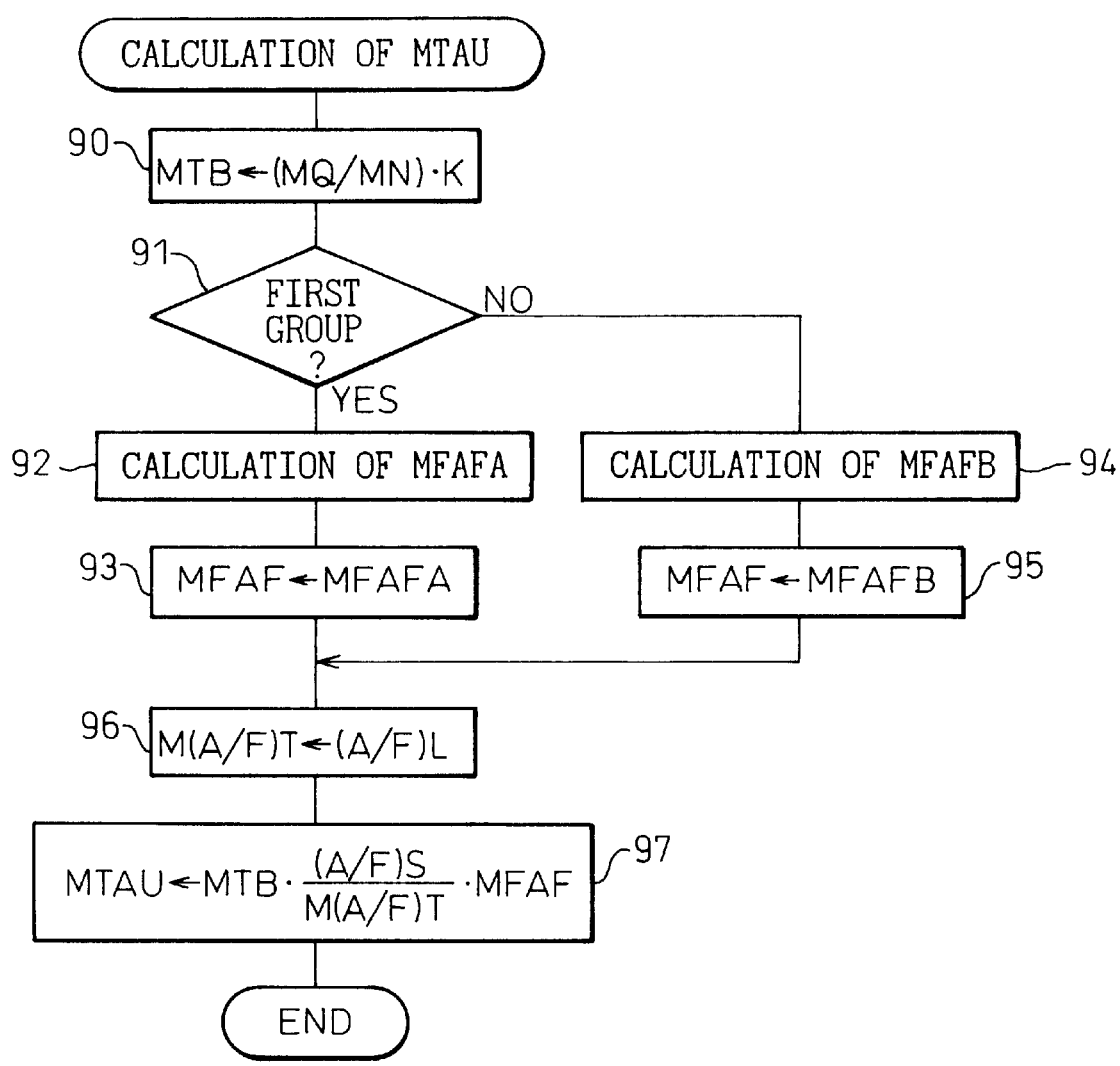
FIG. 16 is a flow chart for calculating the fuel injection time of the main engine.

FIG. 16 shows a routine for calculating the fuel injection time MTAU of the main engine 1. This routine is executed by interruption every predetermined crank angle of the main engine 1.

Referring to FIG. 16, first, in step 90, the basic fuel injection time MTB is calculated using the following equation, with the intake air amount MQ and the engine speed MN of the main engine 1:

$$MTB=(MQ/MN) \cdot K$$

In the following step 91, it is judged whether the fuel injection time MTAU to be calculated in the present processing cycle is the for the first cylinder group 1$a$ or for the second cylinder group 1$b$. If the fuel injection time TAU to be calculated in the present processing cycle is for the first cylinder group 1$a$, that is, for the first cylinder #1, the routine goes to step 92, where the feedback correction coefficient MFAFA for the first cylinder group 1$a$ is calculated. In the following step 93, MFAFA is memorized as MFAF. Next, the routine jumps to step 96.

If the fuel injection time TAU to be calculated in the present cycle is for the second cylinder group 1$b$, that is, for one of the second, the third and the fourth cylinders #2, #3, and #4, in step 91, the routine goes to step 94, where the feedback correction coefficient MFAFB for the second cylinder group 1$b$ is calculated. In the following step 94, MFAFB is memorized as MFAF. Then, the routine goes to step 96.

In step 96, the target air-fuel ratio M(A/F)T is made to be the lean air-fuel ratio (A/F)L. In this embodiment, the lean air-fuel ratio (A/F)L is made equal to 18.5 regardless of the operating condition of the main engine 1. Accordingly, in step 96, (A/F)T is made equal to 18.5.

In the following step 97, the fuel injection time TAU is calculated using the following equation:

$$MTAU=MTB \cdot ((A/F)S/M(A/F)T) \cdot MFAF$$

Fuel is injected from each fuel injector 5 for the period of this fuel injection time MTAU.

Figure 17:
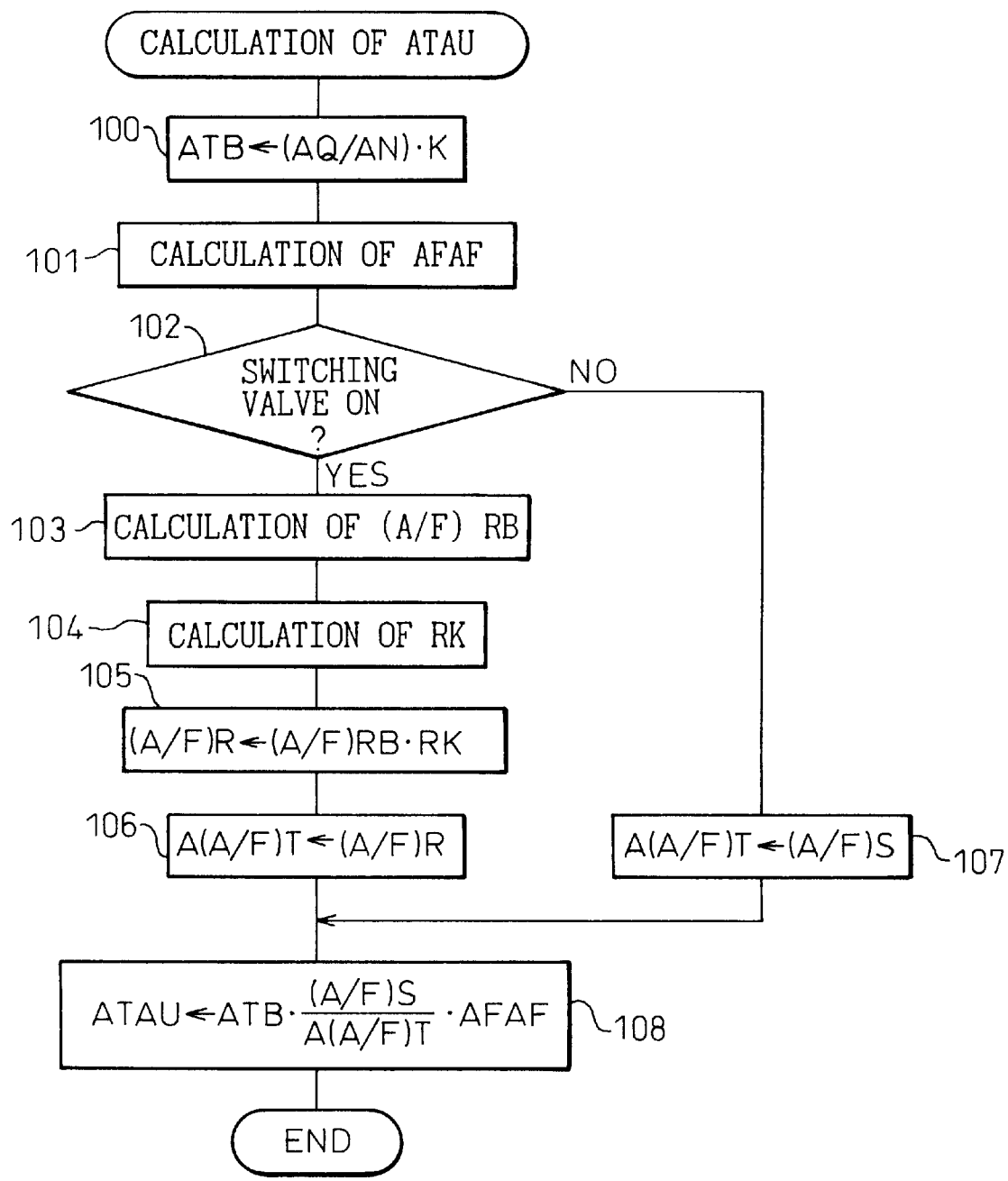
FIG. 17 is a flow chart for calculating the fuel injection time of the auxiliary engine.

FIG. 17 illustrates a routine for calculating the fuel injection time ATAU of the auxiliary engine 20. This routine is executed by the interruption every predetermined crank angle of the auxiliary engine 20.

Referring to FIG. 17, first, in step 100, the basic fuel injection time ATB is calculated using the following equation, with the intake air amount AQ and the engine speed AN of the auxiliary engine 20.

$$ATB=(AQ/AN) \cdot K$$

In the following step 101, the feedback correction coefficient AFAF is calculated. In the following step 102, it is judged whether the switching valve 25 is turned ON. If the switching valve 25 is turned ON, the routine goes to step 103, where the rich air-fuel ratio (A/F)RB is calculated using the map shown in FIG. 4(B). In the following step 104, the coefficient RK is calculated using the map shown in FIG. 5(B). In the following step 105, the rich air-fuel ratio (A/F)R is calculated using the following equation:

$$(A/F)R=(A/F)RB \cdot RK$$

In the following step 106, the target air-fuel ratio A(A/F)T is made to be the rich air-fuel ratio A(A/F)R. Then, the routine goes to step 108.

On the other hand, if the switching valve 25 is turned OFF in step 102, the routine goes to step 107, where the target air-fuel ratio A(A/F)T is made to be the stoichiometric air-fuel ratio (A/F)S. Then, the routine goes to step 108.

In step 108, the fuel injection time ATAU is calculated using the following equation:

$$ATAU=ATB \cdot ((A/F)S/A(A/F)T) \cdot AFAF$$

Fuel is injected from the fuel injector 23 for a period of this fuel injection time ATAU.

In this embodiment, the exhaust gas air-fuel ratio of the exhaust gas flowing to the TW catalyst 8$a$ is made rich by feeding or adding the exhaust gas of the auxiliary engine 20 into the exhaust gas of the first cylinder group 1$a$. Therefore, it is possible to sufficiently purify the exhaust gas discharged from the main and the auxiliary engines 1 and 20, while obtaining an addition output torque of the auxiliary engine 20. Note that, when the main engine 1 is originally provided with the auxiliary engine 20, there is no need to newly install a rich exhaust gas synthesizing device 19. Accordingly, the structure can be made simple.

Further, in this embodiment, the switching valve 25 is controlled to stop feeding of the exhaust gas of the auxiliary engine 20 to the NH$_3$—AO catalyst 14$a$ to thereby prevent the exhaust gas air-fuel ratio of the exhaust gas flowing to the TW catalyst 8$a$ from being made rich, when the NH$_3$ adsorbed in the NH$_3$—AO catalyst 14$a$ is to be desorbed therefrom. However, while feeding the exhaust gas of the auxiliary engine 20 into the exhaust pipe 7 continuously, the engine air-fuel ratio of the auxiliary engine 20 may be controlled to make the exhaust gas air-fuel ratio of the exhaust gas flowing to the TW catalyst 8$a$ stoichiometric or lean, when the NH$_3$ adsorbed in the NH$_3$—AO catalyst 14$a$ is to be desorbed therefrom. In this case, when the exhaust gas air-fuel ratio of the exhaust gas flowing to the TW catalyst 8a is made stoichiometric, $NO_X$, HC and CO in the inflowing exhaust gas is simultaneously purified sufficiently thereon. On the other hand, when the exhaust gas air-fuel ratio of the exhaust gas flowing to the TW catalyst 8a is made lean, $NO_X$ passes through the TW catalyst 8a and then flows to the $NH_3$—AO catalyst 14a, and is reduced by $NH_3$ desorbed from the $NH_3$—AO catalyst 14a. Accordingly, in this case, $NO_X$ and $NH_3$ are prevented from flowing out of the $NH_3$—AO catalyst 14a without being purified.

Next, another embodiment of the exhaust gas purifying method of the engine shown in FIG. 1 will be explained.

In this embodiment, the auxiliary engine 20 performs the rich operation and the exhaust gas of the auxiliary engine 20 is introduced into the TW catalyst 8a, until the adsorbed $NH_3$ amount $S(NH_3)$ of the $NH_3$—AO catalyst 14a exceeds the upper threshold $UT(NH_3)$, and when the adsorbed $NH_3$ amount $S(NH_3)$ becomes lower than the lower threshold $LT(NH_3)$, the exhaust gas of the auxiliary engine 20 performing the rich operation is introduced to the TW catalyst 8a again, as in the same manner as the embodiment described above.

However, if the operating condition of the main engine 1 varies and thereby the inflowing $NO_X$ amount $F(NO_X)$ of the $NH_3$—AO catalyst 14a increase widely, the $NO_X$ amount may become too much with respect to the $NH_3$ at the $NH_3$—AO catalyst 14a, even though the adsorbed $NH_3$ amount $S(NH_3)$ is large or the TW catalyst 8a is performing the $NH_3$ synthesizing operation. If $NO_X$ becomes excessive with respect to $NH_3$ at the $NH_3$—AO catalyst 14a, the $NO_X$ will pass through the $NH_3$—AO catalyst 14a without being purified.

On the other hand, the inflowing $NO_X$ amount $F(NO_X)$ equals to the discharged $NO_X$ amount $Mb(NO_X)$ of the second cylinder group 1b, when the exhaust gas of the auxiliary engine 20 is fed to the TW catalyst 8a (see FIG. 3), and equals to a sum of the discharged $NO_X$ amounts $Ma(NO_X)$ and $Mb(NO_X)$ when the feeding of the exhaust gas of the auxiliary engine 20 to the TW catalyst 8a is stopped (see FIG. 6). Accordingly, the inflowing $NO_X$ amount $F(NO_X)$ varies in accordance with the target air-fuel ratio $M(A/F)T$ of the main engine 1. That is, considering that the discharged $NO_X$ amount from the main engine 1 with the engine air-fuel ratio being $(A/F)N$ equals to that with the engine air-fuel ratio being the lean air-fuel ratio $(A/F)L$, the inflowing $NO_X$ amount $F(NO_X)$ becomes smaller when the engine air-fuel ratio of the main engine 1 is made between $(A/F)N$ and the stoichiometric air-fuel ratio $(A/F)S$, or is made smaller than $(A/F)N$. Note that, $(A/F)N$ for the lean air-fuel ratio $(A/F)L$ of 18.5, is 16.5, as can be seen in FIG. 2(B).

Therefore, in this embodiment, first, a threshold TH is found which is a slightly smaller than the $NO_X$ amount capable of being purified by the amount of $NH_3$ flowing to or desorbed from the $NH_3$—AO catalyst 14a. When the inflowing $NO_X$ amount $F(NO_X)$ exceeds the threshold TH, it is judged that $NO_X$ is excessive with respect to $NH_3$ at the $NH_3$—AO catalyst 14a, and the lean air-fuel ratio $(A/F)L$, which is the target air-fuel ratio $M(A/F)T$ of the main engine 1, is made equal to, for example, $(A/F)P$ (such as 15.0) shown in FIG. 2(B), to thereby decrease the inflowing $NO_X$ amount $F(NO_X)$. As a result, the amount of $NO_X$ is prevented from becoming too much at the $NH_3$—AO catalyst 14a, and from flowing out of the $NH_3$—AO catalyst 14a without being purified.

Figure 18A:
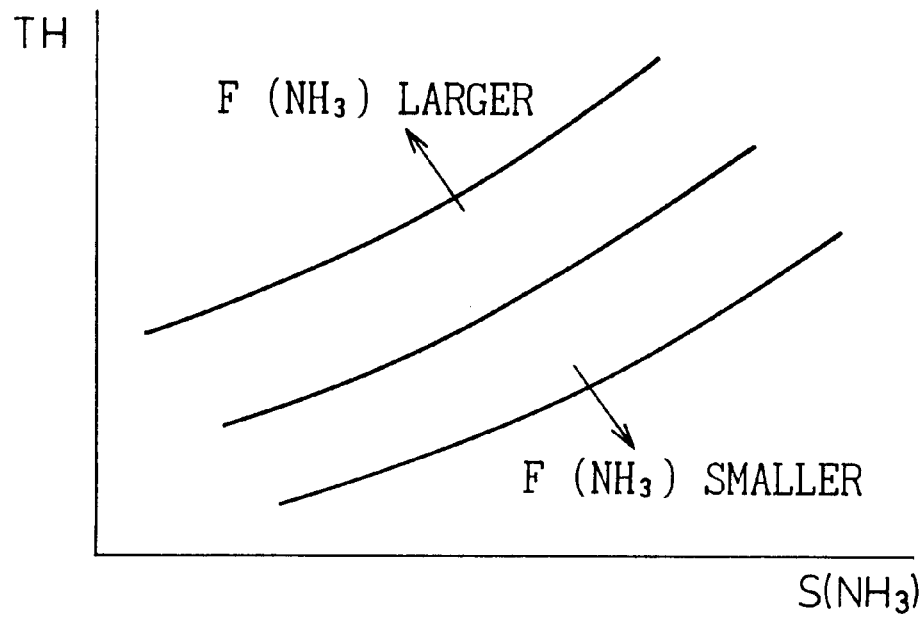
FIGS. 18A and 18B are diagrams illustrating the threshold TH during the $NH_3$ synthesizing operation.
Figure 18B:
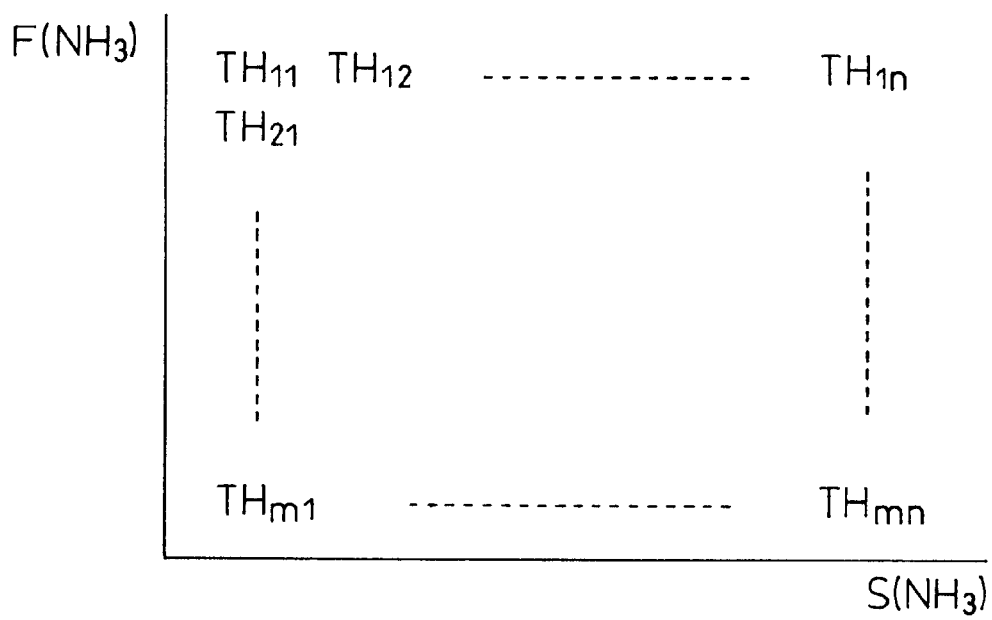

FIG. 18(A) illustrates the threshold TH when the exhaust gas of the auxiliary engine 20 is fed to the TW catalyst 8a, obtained by experiment. As can be seen FIG. 18(A), the threshold TH in this case is obtained as a function of the adsorbed $NH_3$ amount $S(NH_3)$ and the inflowing $NO_X$ amount $F(NO_X)$. The threshold TH increases as $S(NH_3)$ increases with the constant $F(NH_3)$, and increases as $F(NH_3)$ increases with the constant $S(NH_3)$. The threshold TH in this case is stored in the ROM 42 in advance in the form of a map shown in FIG. 18(B).

FIG. 19 illustrates the threshold TH when the feeding of the exhaust gas of the auxiliary engine 20 to the TW catalyst 8a is stopped, obtained by experiments. As can be seen FIG. 19, the threshold TH in this case is obtained as the function of the adsorbed $NH_3$ amount $S(NH_3)$, and increases as $S(NH_3)$ increases. The threshold TH in this case is stored in the ROM 42 in advance in the form of a map shown in FIG. 19.

FIG. 20 illustrates a routine for controlling the engine air-fuel ratio of the main engine 1, according to the present embodiment. The routine is executed by interruption every predetermined time.

Referring to FIG. 20, first, in step 200, it is judged whether the switching valve 25 is turned OFF. If the switching valve 25 is turned ON, that is, the exhaust gas of the auxiliary engine 20 is fed to the exhaust pipe 7, the routine goes to step 201, where the discharged $NO_X$ amount $Mb(NO_X)$ of the second cylinder group 1b is calculated using the map shown in FIG. 12(B). In the following step 202, $Mb(NO_X)$ is memorized as the inflowing $NO_X$ amount $F(NO_X)$. In the following step 203, the threshold TH is calculated using the map shown in FIG. 18(B). For the calculation of the threshold TH, the adsorbed $NH_3$ amount $S(NH_3)$ and the inflowing $NH_3$ amount $F(NH_3)$ obtained in the routine shown in FIG. 15 may be used. Then, the routine goes to step 208.

Figure 8B:
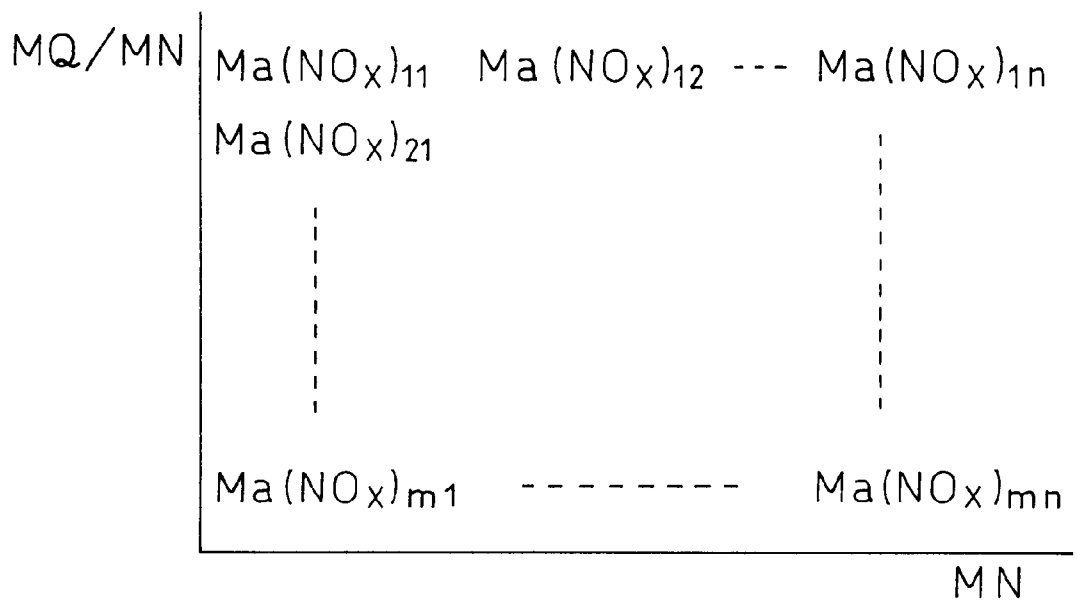

If the switching valve is turned OFF, that is the feeding of the exhaust gas of the auxiliary engine 20 is stopped, in step 200, the routine goes to step 204, where the discharged $NO_X$ amount $Ma(NO_X)$ of the first cylinder group 1a is calculated using the map shown in FIG. 8(B). In the following step 205, the discharged $NO_X$ amount $Mb(NO_X)$ of the second cylinder group 1b is calculated using the map shown in FIG. 12(B). In the following step 206, the inflowing $NO_X$ amount $F(NO_X)$ is calculated using the following equation:

$$F(NO_X)=Ma(NO_X)+Mb(NO_X)$$

In the following step 207, the threshold TH is calculated using the map shown in FIG. 19. For the calculation of the threshold TH, the adsorbed $NH_3$ amount $S(NH_3)$ obtained in the routine shown in FIG. 15 may be used. Then, the routine goes to step 208.

In the step 208, it is judged whether the inflowing $NO_X$ amount $F(NO_X)$ is larger than the threshold obtained in step 203 or 207. If $F(NO_X) \leq TH$, it is judged that $NO_X$ is not excessive to $NH_3$ at the $NH_3$—AO catalyst 14a, and the routine goes to step 209, where the target air-fuel ratio of the main engine $M(A/F)T$ is made equal to the lean air-fuel ratio $(A/F)L$. Then, the processing cycle is ended. Contrarily, if $F(NO_X)>TH$, it is judged that $NO_X$ will be excessive to $NH_3$ at the $NH_3$—AO catalyst 14a, and the routine goes to step 210, where the target air-fuel ratio of the main engine $M(A/F)T$ is made equal to $(A/F)P$. Then, the processing cycle is ended.

In this embodiment, the engine air-fuel ratio of the main engine 1 is controlled by controlling the target air-fuel ratio thereof $M(A/F)T$, that is, the fuel amount to be injected. Alternatively, an intake air control valve may be arranged in, for example, the intake duct 4 downstream of the throttle valve 6. In this case, the intake air control valve may be controlled to decrease the intake air amount, without changing the fuel amount to be injected, to thereby change the engine air-fuel ratio of the main engine I from the lean air-fuel ratio (A/F)L to (A/F)P, for example.

Figure 21:
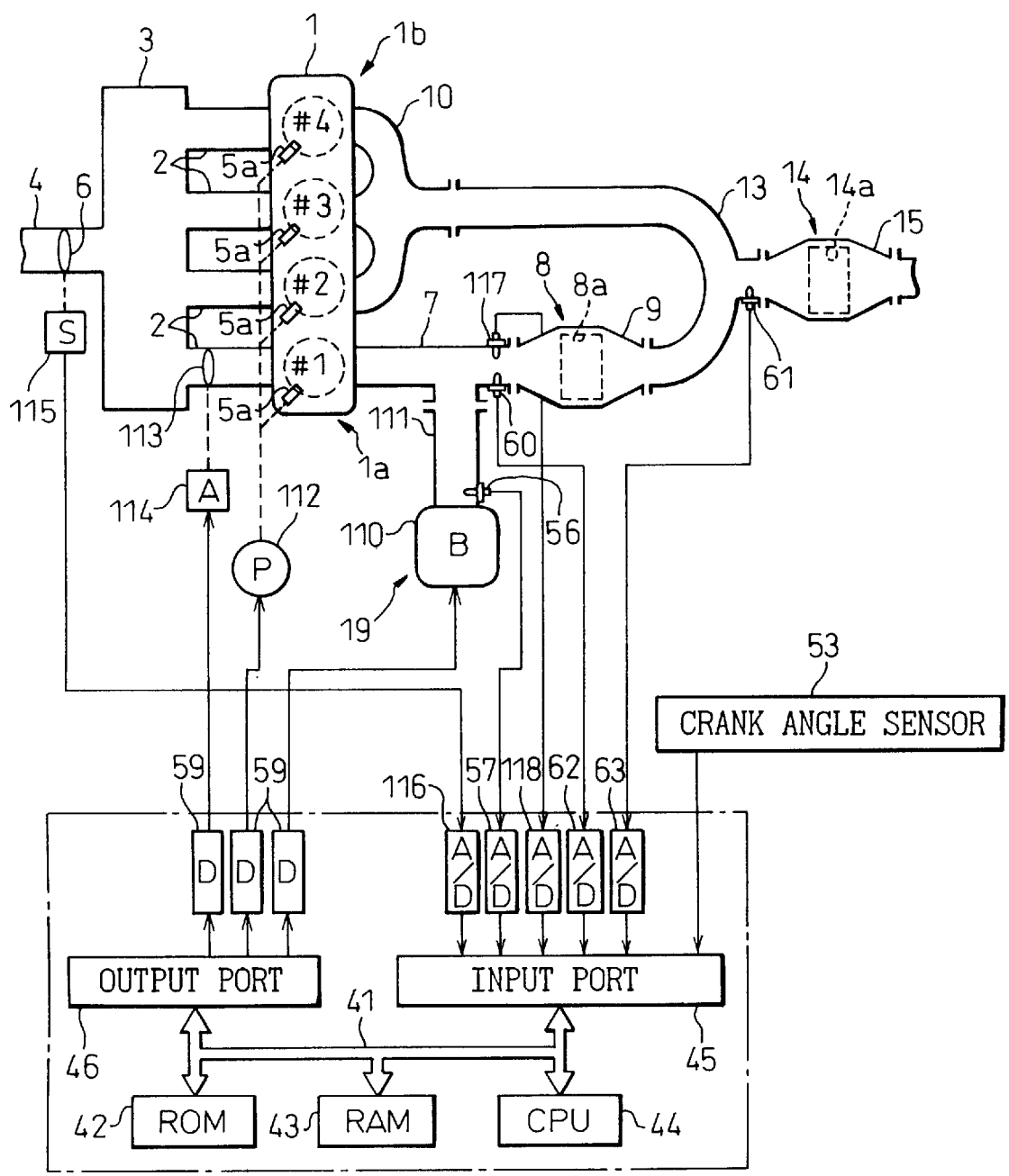
FIG. 21 is a general view of an engine according to further another embodiment.

FIG. 21 illustrates further another embodiment, where the present invention is adapted to the diesel engine. Alternatively, the present invention may be adapted to the spark-ignition gasoline engine.

Referring to FIG. 21, the main engine 1, which is the diesel engine, has a first cylinder #1, constituting the first cylinder group 1a, and a second, a third, and a fourth cylinder #2, #3, and #4, constituting the second cylinder group 1b. The rich gas forming device 19 in this embodiment comprises a burner 110. The exhaust side of the burner 110 is connected to the exhaust pipe 7 via an exhaust pipe 111. Note that the burner 110 is controlled by the output signal output from the electronic control unit 40.

To each cylinder of the main engine 1, the fuel is fed via a corresponding fuel injection nozzle 5a, to which the fuel is fed via a common fuel pump 112. Also, an intake air control valve 113 is arranged in the blanch 2 of the first cylinder #1, capable of decreasing the intake air amount of the first cylinder #1, that is, the first cylinder group 1a. The intake air control valve 113 is driven by an actuator 114 of the negative pressure type or the electromagnetic type. Note that the fuel pump 112 and the actuator 114 are controlled by the output signal output from the electronic control unit 40.

Referring further to FIG. 21, an opening degree sensor 115 is attached to the throttle valve 6, the sensor 115 generating an output voltage proportional to the opening degree of the throttle valve 6. The output voltage of the sensor 115 is input to the input port 45 of the electronic control unit 40, via the A/D convertor 116. Further, an air-fuel ratio sensor 117 is attached to the exhaust pipe 7 downstream of the outlet of the exhaust pipe 111, for detecting the exhaust gas air-fuel ratio flowing therethrough. The output voltage of the sensor 117 is input to the input port 45 via the A/D convertor 118. The sensor 117 is constructed by a sensor generating an output voltage which corresponds to the exhaust gas air-fuel ratio over a broader range of the exhaust gas air-fuel ratio, as mentioned above. The air-fuel ratio sensor 56 arranged in the exhaust pipe 111 is for detecting the exhaust gas air-fuel ratio of the exhaust gas of the burner 110.

On the other hand, the output port 46 of the electronic control unit 40 is connected to the burner 110, the fuel pump 112, and the actuator 114, via corresponding drive circuits 59.

In each cylinder of the main engine 1, the fuel is injected from the fuel injection nozzle 5a, the amount of which is required to obtain the output torque suitable for the respective engine operating condition. The fuel amount is stored in the ROM 42 in advance, as the function of, for example, the opening degree of the throttle valve 6 and the engine speed MN. In this embodiment, the engine air-fuel ratio is kept at approximately 22.0 (air-excess ratio is approximately 1.5), for example. Namely, the main engine 1 performs the lean operation continuously. This prevents the discharge of the undesirable smoke.

On the other hand, the burner 110 is operated or stopped in accordance with the adsorbed $NH_3$ amount $S(NH_3)$ of the $NH_3$—AO catalyst 14a. Namely, the burner 110 performs the rich operation and the exhaust gas thereof is introduced to the TW catalyst 8a to make the exhaust gas air-fuel ratio of the exhaust gas flowing to the TW catalyst 8a rich to thereby synthesize the $NH_3$ thereon, until the adsorbed $NH_3$ amount $S(NH_3)$ exceeds the upper threshold $UT(NH_3)$.

Considering the $NH_3$ synthesizing operation of the TW catalyst 8a, the exhaust gas air-fuel ratio of the entire exhaust gas flowing to the TW catalyst 8a is preferably kept at about 13.8. However, the operation of the burner 110 in this embodiment is substantially stable regardless of the operating condition of the main engine 1. As a result, when the operating condition of the main engine 1 varies, the exhaust gas air-fuel ratio of the exhaust gas flowing to the TW catalyst 8A may vary or, in particular, may be lean.

To solve this, the intake air control valve 113 is provided for decreasing the intake air amount, and the engine air-fuel ratio of the first cylinder group 1a is controlled by controlling the intake air control valve 113 without controlling the fuel amount to be injected, to thereby maintain the exhaust gas air-fuel ratio of the exhaust gas flowing to the TW catalyst 8a at about 13.8. In this case, the opening degree of the intake air control valve 113 is feedback-controlled in accordance with the output signal from the air-fuel ratio sensor 117. As a result, the appropriate $NH_3$ synthesizing operation can be achieved at the TW catalyst 8a.

When the opening degree of the intake air control valve 113 is made smaller, the engine air-fuel ratio of the first cylinder group 1a changes toward the rich side, but is made slightly lean with respect to the stoichiometric air-fuel ratio (A/F)S. Hereinafter such an operating condition is referred to as a slightly lean operation. When the first cylinder group 1a, that is, the first cylinder #1 performs the slightly lean operation, the exhaust gas air-fuel ratio of the exhaust gas flowing to the TW catalyst 8a is easily made rich. In other words, the amount of the exhaust gas of the burner 110 can be reduced, and therefore, the amount of the reducing agent to be fed from the rich gas forming device 19 to the exhaust pipe 7 can be reduced. Note that the engine air-fuel ratio of the first cylinder #1 is not richer or smaller than about 16.0 (air-excess ratio being about 1.1), even when the opening degree of the intake air control valve 113 is made the minimum degree thereof.

Figure 22:
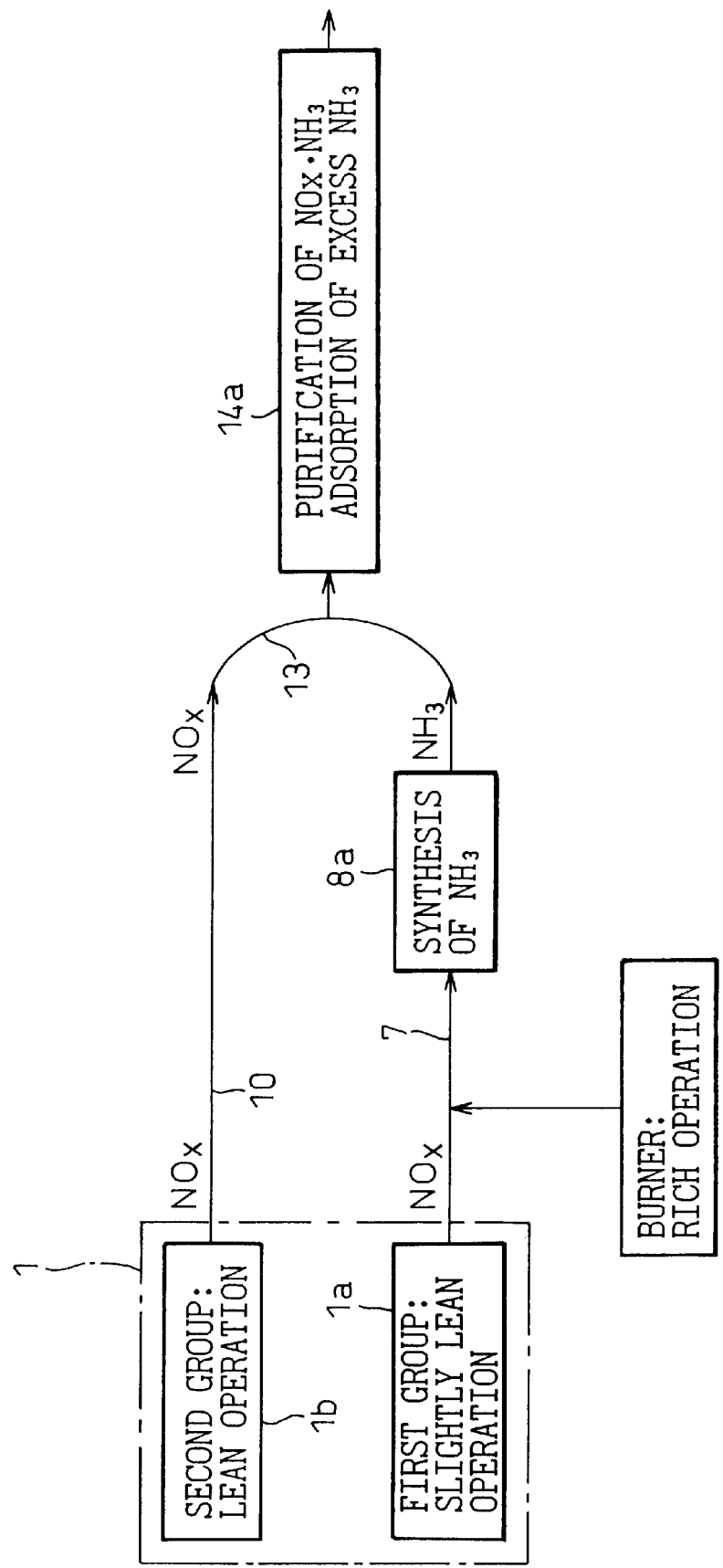
FIGS. 22 and 23 schematically illustrate the exhaust gas purifying method of the exhaust gas purifying device shown in FIG. 21.

The $NH_3$ synthesized in the TW catalyst 8a then flows to the $NH_3$—AO catalyst 14a, and reduces $NO_X$ discharged from the second cylinder group 1b. The excess $NH_3$ is adsorbed in the $NH_3$—AO catalyst 14. FIG. 22 schematically illustrates the exhaust gas purifying method in this case.

Figure 23:
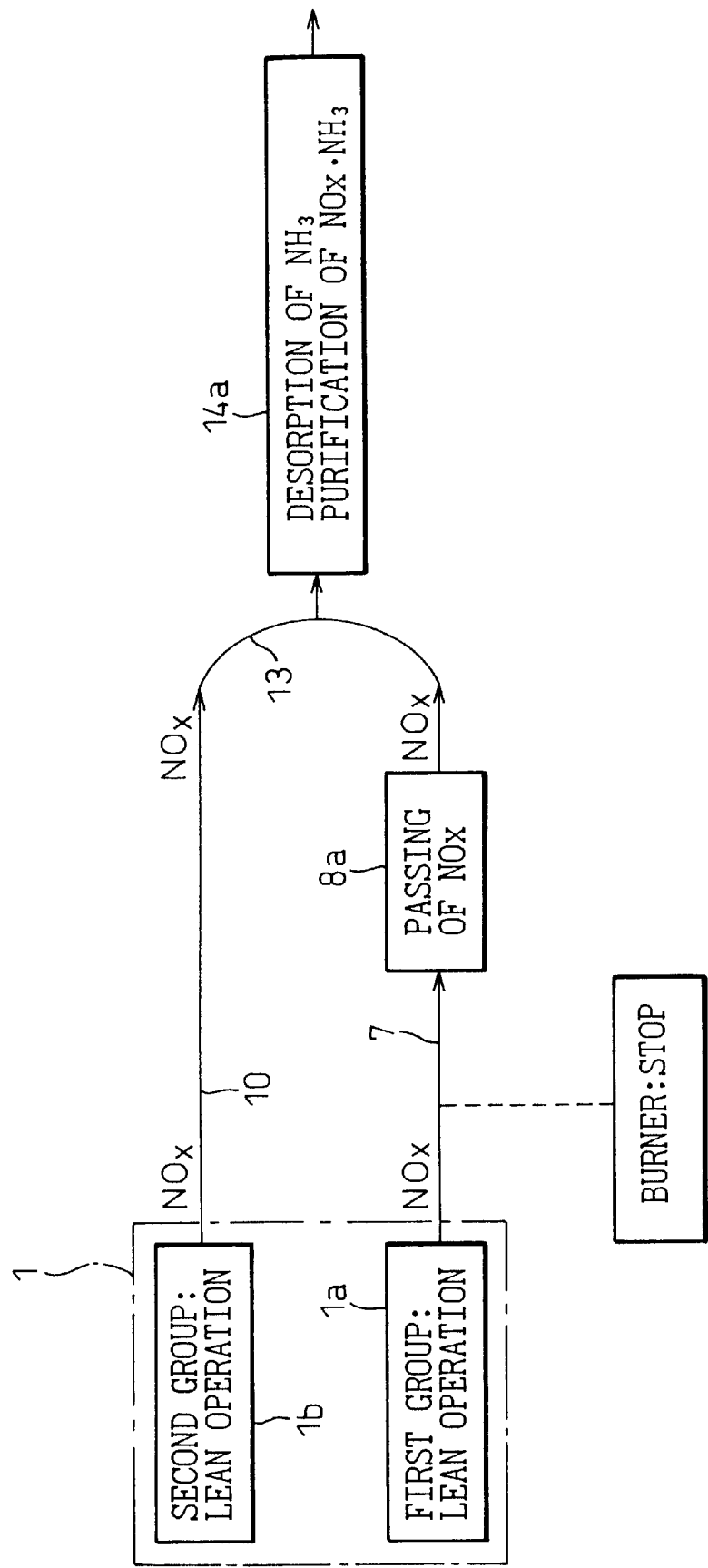

When the adsorbed $NH_3$ amount $S(NH_3)$ exceeds the upper threshold $UT(NH_3)$, the operation of the burner 110 is stopped, and the intake air control valve 113 is fully opened. As a result, the exhaust gas air-fuel ratio of the exhaust gas flowing to the TW catalyst 8a is made lean, $NO_X$ in the exhaust gas of the first cylinder group 1a passes through the TW catalyst 8a, and then flows to the $NH_3$—AO catalyst 14a. At the $NH_3$—AO catalyst 14a, the adsorbed $NH_3$ is desorbed, and the $NH_3$ reduces $NO_X$ in the exhaust gas from the first and the second cylinder groups 1a and 1b. FIG. 23 schematically illustrates the exhaust gas purifying method in this case.

When the adsorbed $NH_3$ amount $S(NH_3)$ becomes smaller than the lower threshold $LT(NH_3)$, the operation of the burner 110 is resumed, to thereby resume the $NH_3$ synthesizing operation at the TW catalyst 8a.

Figure 24:
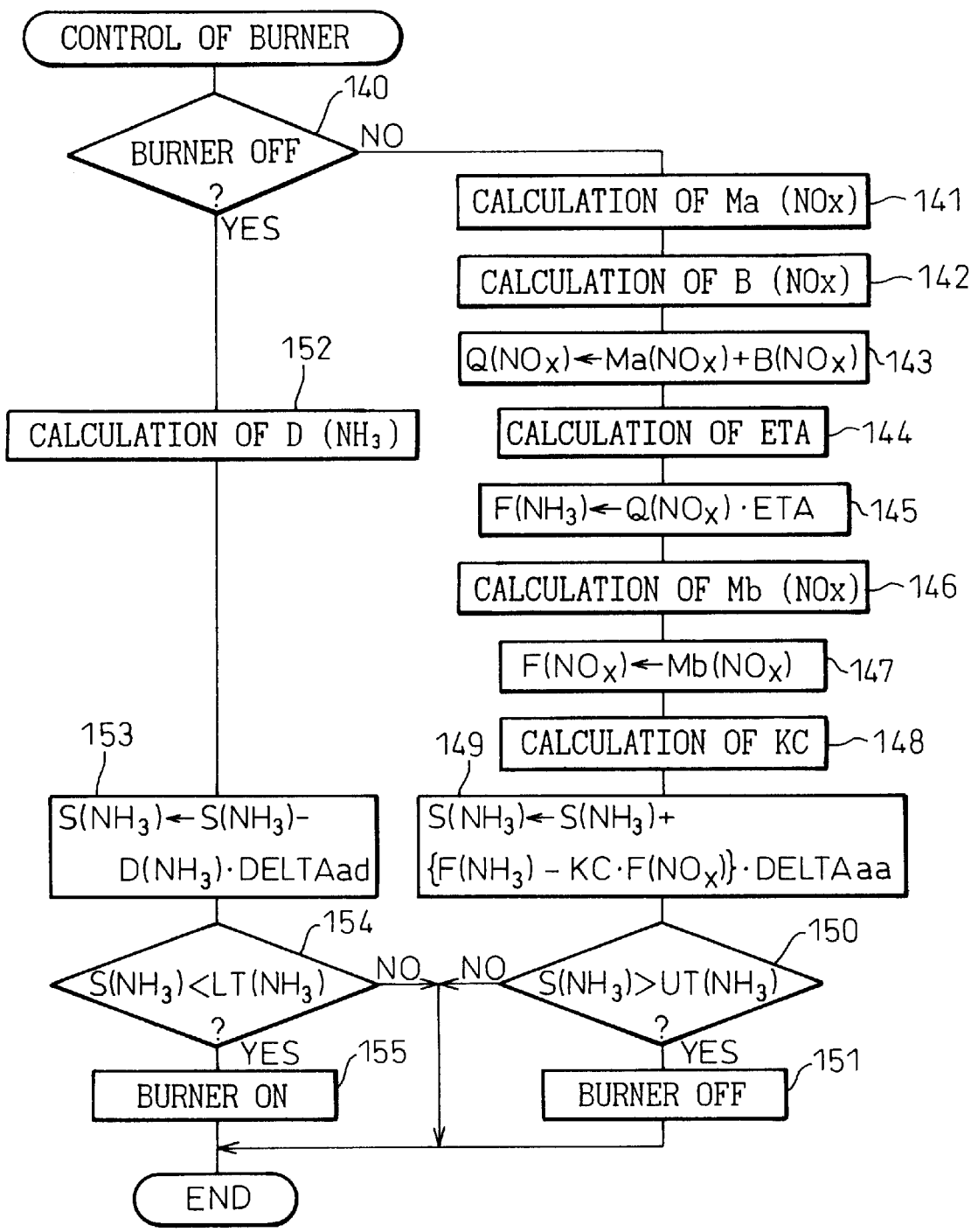
FIG. 24 is a flow chart for controlling the burner according to the embodiment shown in FIG. 21.

FIG. 24 illustrates a routine for controlling the operation of the burner 110. The routine is executed by interruption every predetermined time.

Referring to FIG. 24, first, in step 140, it is judged whether the burner 110 is turned OFF, namely, the operation of the burner 110 is stopped. If the burner 110 is turned ON, namely, the burner 110 is operated and the exhaust gas thereof is introduced to the exhaust pipe 7, the routine goes to step 141, where the discharged $NO_X$ amount $Ma(NO_X)$ is calculated using the map shown in FIG. 8(B). In the following step 142, a discharged $NO_X$ amount from the burner 110 per unit time $B(NO_X)$ is calculated using the map shown in FIG. 25. In this embodiment, the air-fuel ratio is maintained approximately constant, but the map shown in FIG. 25 is provided to obtain the discharged $NO_X$ amount $B(NO_X)$, even if the air-fuel ratio of the burner fluctuates.

Figure 25:
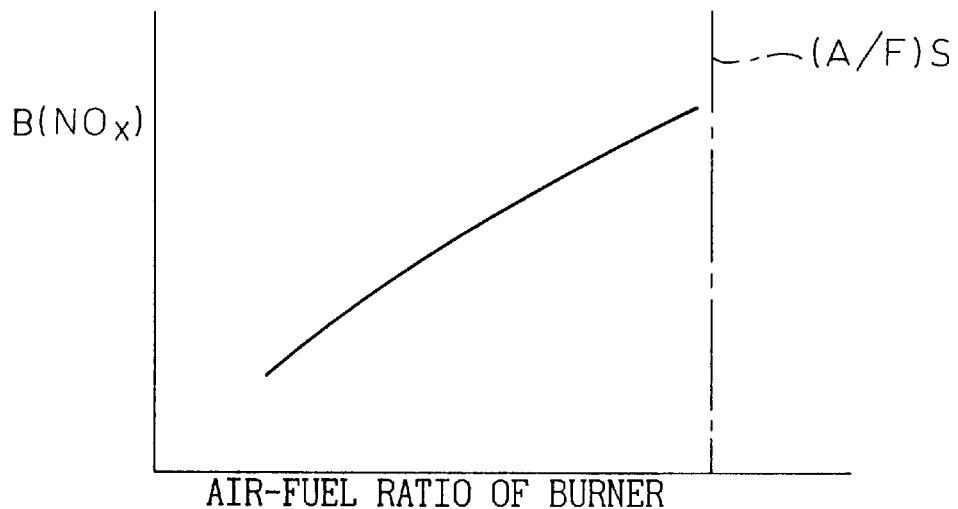
FIG. 25 is a diagram illustrating an amount of $NO_X$ discharged from the burner per unit time.

FIG. 25 illustrates the relationships, obtained by experiments, between the amount of $NO_X$ discharged from the burner 110 per unit time $B(NO_X)$ and the air-fuel ratio of the burner 110, under the constant air amount. As can be seen from FIG. 25, the discharged $NO_X$ amount $B(NO_X)$ increases as the air-fuel ratio of the burner 110 decreases. Note that the discharged $NO_X$ amount $B(NO_X)$ is stored in the ROM 42 in advance in the form of the map shown in FIG. 25.

In the following step 143, the inflowing $NO_X$ amount $Q(NO_X)$ of the TW catalyst 8a is calculated using the following equation:

$$Q(NO_X) = Ma(NO_X) + B(NO_X)$$

In the following step 144, the conversion efficiency ETA of the TW catalyst 8a is calculated using the map shown in FIG. 11. In the following step 145, the inflowing $NH_3$ amount $F(NH_3)$ is calculated using the following equation:

$$F(NH_3) = Q(NO_X) \cdot ETA$$

In the following step 146, the discharged $NO_X$ amount $Mb(NO_X)$ of the second cylinder group 1b is calculated using the map shown in FIG. 12(B). In the following step 147, the discharged $NO_X$ amount $Mb(NO_X)$ is memorized as the inflowing $NO_X$ amount $F(NO_X)$. In the following step 148, the equivalent coefficient KC is calculated using the map shown in FIG. 13. In the following step 149, the adsorbed $NH_3$ amount $S(NH_3)$ is calculated using the following equation:

$$S(NH_3) = S(NH_3) + \{F(NH_3) - KC \cdot F(NO_X)\} \cdot DELTAaa$$

where DELTAaa represents a time interval from the previous processing cycle to the present processing cycle. In the following step 150, it is judged whether the adsorbed $NH_3$ amount $S(NH_3)$ is larger than the upper threshold $UT(NH_3)$. If $S(NH_3) \leq UT(NH_3)$, the processing cycle is ended. That is, if $S(NH_3) \leq UT(NH_3)$, it is judged that the $NH_3$ adsorbing capacity of the $NH_3$—AO catalyst 14a is still large, and the burner 110 is kept turned ON, and thus the exhaust gas of the burner 110 is continuously fed into the exhaust pipe 7, to thereby continue the $NH_3$ synthesizing operation of the TW catalyst 8a.

Contrarily, if $S(NH_3) > UT(NH_3)$ in step 150, the routine goes to step 151, where the burner 110 is turned OFF, and then the processing cycle is ended. That is, when $S(NH_3) > UT(NH_3)$, it is judged that the $NH_3$ adsorbing capacity of the $NH_3$—AO catalyst 14a becomes smaller. Therefore, the feeding of the exhaust gas from the burner 110 into the exhaust pipe 7 is stopped, to thereby stop the $NH_3$ synthesizing operation of the TW catalyst 8a.

On the other hand, if the burner 110 is turned OFF in step 140, the routine goes to step 152, where the desorbed $NH_3$ amount $D(NH_3)$ of the $NH_3$—AO catalyst 14a is calculated using the map shown in FIG. 14(B). In the following step 153, the adsorbed $NH_3$ amount $S(NH_3)$ is calculated using the following equation:

$$S(NH_3) = S(NH_3) - D(NH_3) \cdot DELTAad$$

where DELTAad is a time interval from the previous processing cycle to the present processing cycle. In the following step 154, it is judged whether the adsorbed $NH_3$ amount $S(NH_3)$ is smaller than the lower threshold $LT(NH_3)$. If $S(NH_3) \leq LT(NH_3)$, the processing cycle is ended. That is, if $S(NH_3) \leq UT(NH_3)$, it is judged that the $NH_3$ adsorbing capacity of the $NH_3$—AO catalyst 14a is still small, and the burner 110 is kept turned OFF, to thereby stop the $NH_3$ synthesizing operation of the TW catalyst 8a continuously.

On the other hand, if $S(NH_3) < LT(NH_3)$ in step 154, the routine goes to step 155, where the burner 110 is turned ON, and then the processing cycle is ended. That is, if $S(NH_3) < LT(NH_3)$, it is judged that the $NH_3$ adsorbing capacity of the $NH_3$—AO catalyst 14a becomes sufficiently large. Therefore, the feeding of the exhaust gas from the burner 110 into the exhaust pipe 7 is resumed, to thereby resume the $NH_3$ synthesizing operation of the TW catalyst 8a.

Note that the fuel of the burner 110 may be a hydrocarbon such as gasoline, isooctane, hexane, heptane, gas oil, and kerosene, and a hydrocarbon which can be stored in a liquid state, such as butane or propane. However, if the fuel is identical to that for the main engine 1, it is not necessary to provide a specific fuel tank. For this reason, the fuel for the burner 110 is identical to that of the main engine 1, for example, gasoline.

In this embodiment, the air-fuel ratio of the burner 110 is determined to be constant. However, the air-fuel ratio of the burner 110 may be changed in accordance with, for example, the operating condition of the main engine 1. Further, the burner 110 may be arranged integrally with the TW catalyst 8a or the catalytic converter 9.

Alternatively, the air-fuel ratio of the burner 110 may be continuously operated with the air-fuel ratio of the lean or the stoichiometric, when the $NH_3$ is to be desorbed from the $NH_3$—AO catalyst 14a.

Figure 26:
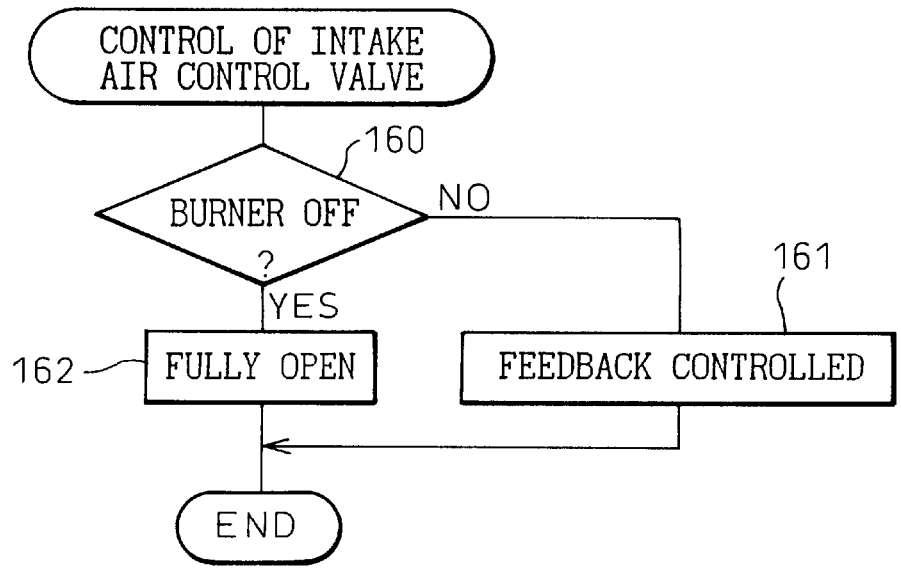
FIG. 26 is a flow chart for controlling the opening degree of the intake air control valve.

FIG. 26 illustrates a routine for controlling the opening degree of the intake air control valve 113. The routine is executed by interruption every predetermined time.

Referring to FIG. 25, first, in step 160, it is judged whether the operation of the burner 110 is stopped (OFF). When the burner 110 is turned ON, that is, the burner 110 performs the rich operation and the exhaust gas thereof is introduced to the exhaust pipe 7 to make the exhaust gas air-fuel ratio of the exhaust gas flowing to the TW catalyst 8a rich, the routine goes to step 161, where the opening degree of the intake air control valve 113 is feedback controlled in accordance with the output signal from the air-fuel ratio sensor 117. As a result, the exhaust gas air-fuel ratio of the exhaust gas flowing to the TW catalyst 8a is kept at an exhaust gas air-fuel ratio suitable for synthesizing $NH_3$, such as about 13.8. Then, the processing cycle is ended.

Contrarily, if the burner 110 is turned OFF, that is, the operation of the burner 110 is stopped, the routine goes to step 162, where the intake air control valve 113 is fully opened, and then the processing cycle is ended. Note that the other constructions and the operation of the exhaust gas purifying device are the same as those in the embodiment shown in FIG. 1, and thus the explanations therefor are omitted.

Next, another embodiment of the exhaust gas purifying catalyst 14 will be explained.

The exhaust gas purifying catalyst in this embodiment uses, for example, a honeycomb type substrate made of cordierite, and an alumina layer which act as a carrier for the catalyst is coated on the cell surface of the honeycomb substrate. On this carrier, at least one substance selected from elements belong to the fourth period or the eighth group in the periodic table of elements, such as copper Cu, chrome Cr, vanadium V, titanium Ti, iron Fe, nickel Ni, cobalt Co, platinum Pt, palladium Pd, rhodium Rh and iridium Ir are carried as a catalyst.

If the exhaust gas purifying catalyst formed as in the above mentioned manner is referred to as an $NH_3.NO_X$ purifying catalyst, the $NH_3.NO_X$ purifying catalyst is capable of converting all the $NH_3$ component in the exhaust gas flowing into the $NH_3.NO_X$ purifying catalyst to $N_2$ provided that the exhaust gas is under an oxidizing atmosphere and the temperature of the catalyst is within a specific temperature range as determined by the substance being used as the catalyst. Therefore, when the exhaust gas is under an oxidizing atmosphere containing an $NH_3$ component and flows through the $NH_3.NO_X$ purifying catalyst in this temperature range, the $NH_3$ component in the exhaust gas is almost completely resolved, and the exhaust gas flowing out from the $NH_3.NO_X$ purifying catalyst contains no $NH_3$ component. In the explanation below, this temperature range in which the $NH_3.NO_X$ purifying catalyst can resolve all the $NH_3$ component in the exhaust gas is called an optimum temperature range.

When the temperature of the $NH_3.NO_X$ purifying catalyst is higher than the optimum temperature range, the $NH_3$ component in the exhaust gas flowing into the $NH_3.NO_X$ purifying catalyst is oxidized by the $NH_3.NO_X$ purifying catalyst and $NO_X$ components are produced Namely, when the temperature of the $NH_3.NO_X$ purifying catalyst is higher than the optimum temperature range, the oxidizing reaction of the $NH_3$ component, i.e., the above-mentioned reactions (7) and (8) become dominant on the $NH_3.NO_X$ purifying catalyst, and the amount of $NO_X$ components, mainly NO and $NO_2$, in the exhaust gas flowing out from the $NH_3.NO_X$ purifying catalyst increase.

Further, when the temperature of the $NH_3.NO_X$ purifying catalyst is lower than the optimum temperature range, the oxidizing reaction of the $NH_3$ component (7) and (8) becomes lower, and the amount of the $NH_3$ component in the exhaust gas flowing out from the $NH_3.NO_X$ purifying catalyst increases.

Figure 27:
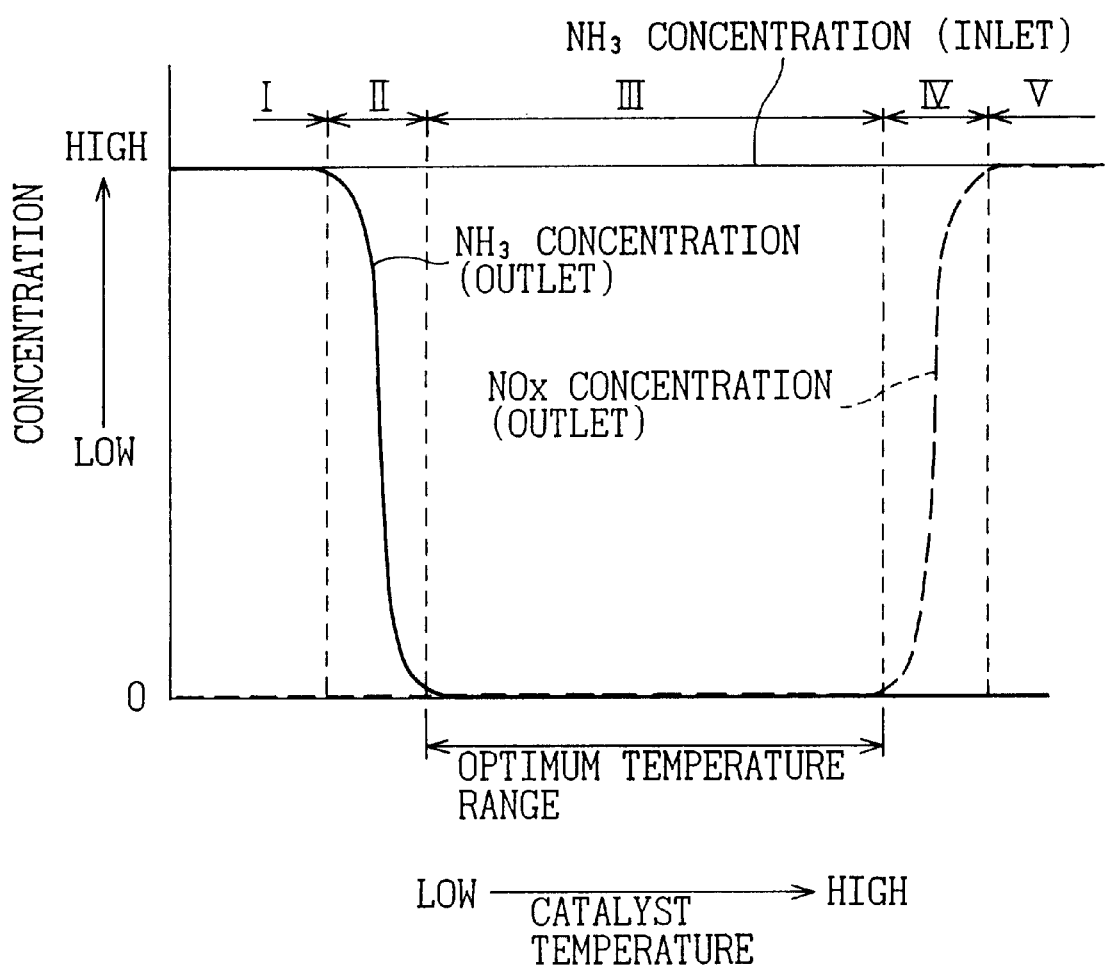
FIG. 27 is a diagram illustrating the characteristic of the exhaust gas purifying catalyst, according to further another embodiment.

FIG. 27 schematically illustrates the variation in the characteristics of the $NH_3.NO_X$ purifying catalyst in accordance with the change in the temperature. FIG. 27 shows the variation in the concentration of the $NH_3$ and $NO_X$ components in the exhaust gas flowing out from the $NH_3.NO_X$ purifying catalyst in accordance with the temperature of the $NH_3.NO_X$ purifying catalyst when the exhaust gas flowing into the $NH_3.NO_X$ purifying catalyst is under an oxidizing atmosphere and the concentration of $NH_3$ in the exhaust gas is maintained at a constant level.

The vertical axis and the horizontal axis in FIG. 27 represent the concentration of the respective components in the exhaust gas and the temperature of the $NH_3.NO_X$ purifying catalyst, respectively. The solid line and the dotted line in FIG. 27 represent the concentrations of the $NH_3$ component and the $NO_X$ components in the exhaust gas flowing out from the $NH_3.NO_X$ purifying catalyst, respectively.

As shown in FIG. 27, provided that the concentration of the $NH_3$ component in the exhaust gas flowing into the $NH_3.NO_X$ purifying catalyst is maintained at a constant level, the concentration of the $NH_3$ component in the outflowing exhaust gas is substantially the same as the concentration of $NH_3$ in the inflowing exhaust gas in the low temperature region (region I in FIG. 27). In this temperature region, the concentration of the $NO_X$ components in the outflow exhaust gas is substantially zero. This means that substantially all of the $NH_3$ component in the exhaust gas passes through the $NH_3.NO_X$ purifying catalyst without reaction when the temperature is low (region I in FIG. 27).

When the temperature becomes higher than the above low temperature region, the concentration of the $NH_3$ component in the outflow exhaust gas decreases as the temperature increases, while the concentration of the $NO_X$ components is substantially the same (region II in FIG. 27). Namely, in this temperature region, the amount of $NH_3$ component in the exhaust gas which is converted to $N_2$ component increases as the temperature increases.

When the temperature further increases, as shown in region III in FIG. 27, the concentration of $NH_3$ component in the outflow exhaust gas further decreases and the concentration of both the $NH_3$ and $NO_X$ components becomes substantially zero. Namely, in this temperature region (region III in FIG. 27), all of the $NH_3$ component in the exhaust gas flowing into the $NH_3.NO_X$ purifying catalyst is resolved (i.e., converted to $N_2$ component) by the $NH_3.NO_X$ purifying catalyst without forming $NO_X$ components.

However, when the temperature becomes higher than this region, the concentration of the $NO_X$ components in the outflow exhaust gas increases as the temperature increases (region IV in FIG. 27), and all of the $NH_3$ component in the exhaust gas is converted to $NO_X$ components by the $NH_3.NO_X$ purifying catalyst in a high temperature region (region V in FIG. 27).

In this specification, the optimum temperature range of the $NH_3.NO_X$ purifying catalyst is defined as a temperature range in which all of the $NH_3$ component in the exhaust gas is converted to $N_2$ component without forming any $NO_X$ component, i.e., such as the temperature range indicated by the temperature region III in FIG. 27.

The optimum temperature range of the $NH_3.NO_X$ purifying catalyst changes according the substance used as catalytic component, and generally starts at a relatively low temperature compared with, for example, the activating temperature of the TW catalyst. For example, when a substance such as platinum Pt, rhodium Rh, or palladium Pd is used, the optimum temperature range is approximately 100 to 400° C. (preferably 100 to 300° C. and most preferably 100 to 250° C. in case of platinum Pt, and preferably 150 to 400° C. and most preferably 150 to 300° C. in case of rhodium Rh or palladium Pd). When a substance such as copper Cu, chrome Cr, or iron is used, the optimum temperature range is approximately 150 to 650° C. (preferably 150 to 500° C.). Therefore, if the $NH_3.NO_X$ purifying catalyst is formed as a tandem compound type catalyst using both types of the catalytic component, i.e., if the catalytic components such as platinum Pt are carried on the downstream part of the substrate and the catalytic components such as chrome Cr are carried on the upstream part of the substrate, the optimum temperature range of the $NH_3.NO_X$ purifying catalyst can be widened as a whole.

The reason why the $NH_3.NO_X$ purifying catalyst converts substantially all of the $NH_3$ component in the exhaust gas to the $N_2$ component without producing $NO_X$ components only in the specific temperature range is not clear at present. However, it is considered that this phenomena is due to the following reason.

Namely, when the temperature of the $NH_3.NO_X$ purifying catalyst is in the optimum temperature range, the above mentioned denitrating reactions (9) and (10) occur on the $NH_3.NO_X$ purifying catalyst, in addition to the above mentioned oxidizing reactions (7) and (8). Due to these denitrating reactions (9) and (10), the $NO_X$ components produced by the oxidizing reactions (7) and (8) are immediately converted to the $N_2$ component. Namely, in the optimum temperature range, a portion of the $NH_3$ in the exhaust gas flowing into the $NH_3.NO_X$ purifying catalyst is converted to $NO_X$ by the oxidizing reactions (7) and (8), and this $NO_X$ immediately reacts with the remaining $NH_3$ in the exhaust gas and is converted to $N_2$ by the denitrating reactions (9) and (10). By these sequential reactions, substantially all of the $NH_3$ in the exhaust gas is converted to $N_2$ when the temperature of the catalyst is within the optimum temperature range.

When the temperature of the $NH_3.NO_X$ purifying catalyst is above the optimum temperature range, the oxidizing reactions (7) and (8) become dominant in the catalyst and the portions of $NH_3$ which is oxidized by the catalyst increases. Thus, the denitrating reactions (9) and (10) hardly occur in the catalyst due to the shortage of $NH_3$ component in the exhaust gas, and the $NO_X$ produced by the oxidizing reactions (7) and (8) flows out from the $NH_3.NO_X$ purifying catalyst without being reduced by the denitrating reactions (9) and (10).

On the other hand, when the temperature of the $NH_3.NO_X$ purifying catalyst is below the optimum temperature range, the oxidizing reactions (7) and (8) hardly occur due to the low temperature. This causes the $NH_3$ in the exhaust gas to pass through the $NH_3.NO_X$ purifying catalyst without being oxidized by the $NO_X$ due to the shortage of the $NO_X$ in the exhaust gas.

As explained above, the optimum temperature range of the $NH_3.NO_X$ purifying catalyst is a temperature range in which the oxidizing reactions of the $NH_3$ (7) and (8) and the denitrating reactions of the $NO_X$ (9) and (10) balance each other in such a manner that the $NO_X$ produced by the oxidation of the $NH_3$ immediately reacts with $NH_3$ in the exhaust gas without causing any surplus $NO_X$ and $NH_3$. Consequently, the optimum temperature range of the $NH_3.NO_X$ purifying catalyst is determined by the oxidizing ability of the catalyst and its temperature dependency. Therefore, when the catalyst component having high oxidizing ability, such as platinum Pt, is used, the optimum temperature range becomes lower than that when the catalyst component having relatively low oxidizing ability, such as chrome Cr, is used.

As explained above, though the mechanism of the phenomenon is not completely clarified, the $NH_3.NO_X$ purifying catalyst actually converts all of the $NH_3$ in the exhaust gas under an oxidizing atmosphere when the temperature is within the optimum temperature range. Further, when the $NH_3.NO_X$ purifying catalyst is used in the optimum temperature range the following facts were found in connection with the above phenomenon:

(a) When the exhaust gas flowing into the $NH_3.NO_X$ purifying catalyst is under an oxidizing atmosphere, i.e., when the exhaust gas air-fuel ratio of the inflowing exhaust gas is lean with respect to the stoichiometric air-fuel ratio, substantially all of the $NH_3$ in the exhaust gas is converted to $N_2$ without producing any $NO_X$. This occurs when the exhaust gas is under an oxidizing atmosphere (a lean air-fuel ratio), but regardless of the degree of leanness of the exhaust gas air-fuel ratio of the inflowing exhaust gas.

(b) When the exhaust gas flowing into the $NH_3.NO_X$ purifying catalyst contains $NO_X$ in addition to $NH_3$, all of the $NO_X$ in the exhaust gas as well as the $NH_3$ is converted to $N_2$, and the concentration of the $NO_X$ components in the exhaust gas becomes zero. In this case, the ratio of the concentrations of the $NO_X$ components and the $NH_3$ component is not necessarily stoichiometrical for the denitrating reactions (9) and (10) (i.e., 4:3, or 1:1). It is only required that the exhaust gas contains an amount of $NH_3$ more than the amount required for reducing the $NO_X$ ($NO_2$ and NO) in the exhaust gas. As explained above, since the surplus $NH_3$ in the exhaust gas is all converted to $N_2$ when the exhaust gas is under an oxidizing atmosphere, no surplus $NH_3$ is contained in the exhaust gas flowing out from the $NH_3.NO_X$ purifying catalyst even in this case.

(c) When the exhaust gas flowing into the $NH_3.NO_X$ purifying catalyst contains HC and CO components, all of the HC and CO components are oxidized by the $NH_3.NO_X$ purifying catalyst, provided that the exhaust gas air-fuel ratio of the inflowing exhaust gas is lean with respect to the stoichiometric air-fuel ratio, and no HC and CO components are contained in the exhaust gas flowing out from the $NH_3.NO_X$ purifying catalyst.

However, when the exhaust gas flowing into the $NH_3.NO_X$ purifying catalyst contains both the $NH_3$ and $NO_X$, it was found that the temperature region IV in FIG. 27, i.e., the temperature region in which the concentration of $NO_X$ components in the outflow exhaust gas increases as the temperature of the catalyst increases, moves to the lower temperature side compared to that when the exhaust gas flowing into the $NH_3.NO_X$ purifying catalyst contains only the $NH_3$ components. This is because, when the exhaust gas contains $NO_X$ in addition to $NH_3$, the $NO_X$ in the inflowing exhaust gas in addition to the $NO_X$ produced by the oxidizing reaction of $NH_3$ must be reduced by the $NH_3$ in the exhaust gas. Consequently, the shortage of the $NH_3$ is apt to occur in the relatively low temperature region. Therefore, when the exhaust gas contains both the $NH_3$ and the $NO_X$, the optimum temperature range of the $NH_3.NO_X$ purifying catalyst becomes narrower.

In relation to above (b), a conventional denitrating catalyst, such as a vanadia-titania $V_2O_5$—$TiO_2$ type catalyst also has a capability for resolving $NH_3$ and $NO_X$ in the exhaust gas with certain conditions. However, in case of the conventional denitrating catalyst, the amounts of $NH_3$ and $NO_X$ components must be strictly stoichiometrical to react $NH_3$ with $NO_X$ without causing any surplus $NH_3$ and $NO_X$. Namely, when both the $NO_2$ and NO are contained in the exhaust gas, the amount (moles) of the $NH_3$ in the exhaust gas must be strictly equal to the total of the moles of $NO_2$ in the exhaust gas multiplied by ¾ and the moles of NO in the exhaust gas to react $NH_3$ and $NO_X$ without causing any surplus $NH_3$ and $NO_X$. However, in case of the $NH_3.NO_X$ purifying catalyst in the embodiment, if the amount of the $NH_3$ is more than the stoichiometrical compared to the amount of $NO_X$, and if the exhaust gas air-fuel ratio of the inflowing exhaust gas is lean, all of the $NH_3$ and $NO_X$ are converted to $N_2$ without causing any surplus $NH_3$ and $NO_X$. This is an important difference between the $NH_3.NO_X$ purifying catalyst in the present invention and the conventional denitrating catalyst.

As explained in FIG. 27, though the $NH_3.NO_X$ purifying catalyst converts all of the $NH_3$ in the exhaust gas in the optimum temperature range, some $NH_3$ passes through when the temperature is below the optimum temperature range. To prevent this outflow of $NH_3$ in the low temperature region, an acidic inorganic substance may be used. It is known in the art that an acidic inorganic substance (which includes Broensted acids such as zeolite, silica $SiO_2$, silica-alumina $SiO_2$—$Al_2O_3$, and titania $TiO_2$ as well as Lewis acids including oxides of transition metals such as copper Cu, cobalt Co, nickel Ni and iron Fe) absorb $NH_3$ when the temperature is low. Therefore, one or more of these acidic inorganic substances may be carried on the substrate of the $NH_3 \cdot NO_X$ purifying catalyst, or the substrate itself may be formed by a porous material made of such acidic inorganic substances to prevent the outflow of $NH_3$ in the low temperature region. In this case, the $NH_3$ component which is not converted to an $N_2$ component in the temperature region below the optimum temperature range is absorbed in the acidic inorganic substances in the $NH_3 \cdot NO_X$ purifying catalyst, and the amount of the outflow of the $NH_3$ from the $NH_3 \cdot NO_X$ purifying catalyst in the low temperature region can be reduced. The $NH_3$ absorbed in the acidic inorganic substances is desorbed when the temperature of the $NH_3 \cdot NO_X$ purifying catalyst becomes high, or when the concentration of the $NH_3$ component in the exhaust gas becomes low. Therefore, the $NH_3$ absorbed in the acidic inorganic substance is converted to $N_2$ by the $NH_3 \cdot NO_X$ purifying catalyst when it is desorbed from the acidic inorganic substance. When the temperature of the exhaust gas flowing into the $NH_3 \cdot NO_X$ purifying catalyst changes in a wide range, therefore, it is suitable to use these acidic inorganic substances to prevent the outflow of $NH_3$ in low temperature region.

Further, as long as such desorption occurs, the adsorbed $NH_3$ amount in the acidic inorganic substance does not increase. As a result, the $NH_3 \cdot NO_X$ purifying catalyst is prevented from being saturated with $NH_3$, that is, $NH_3$ is prevented from flowing out from the $NH_3 \cdot NO_X$ purifying catalyst without being purified. Thus there is no need for arranging the $NH_3$ purifying catalyst downstream of the $NH_3 \cdot NO_X$ purifying catalyst, and the structure of the exhaust gas purifying catalyst is simplified.

Figure 28:
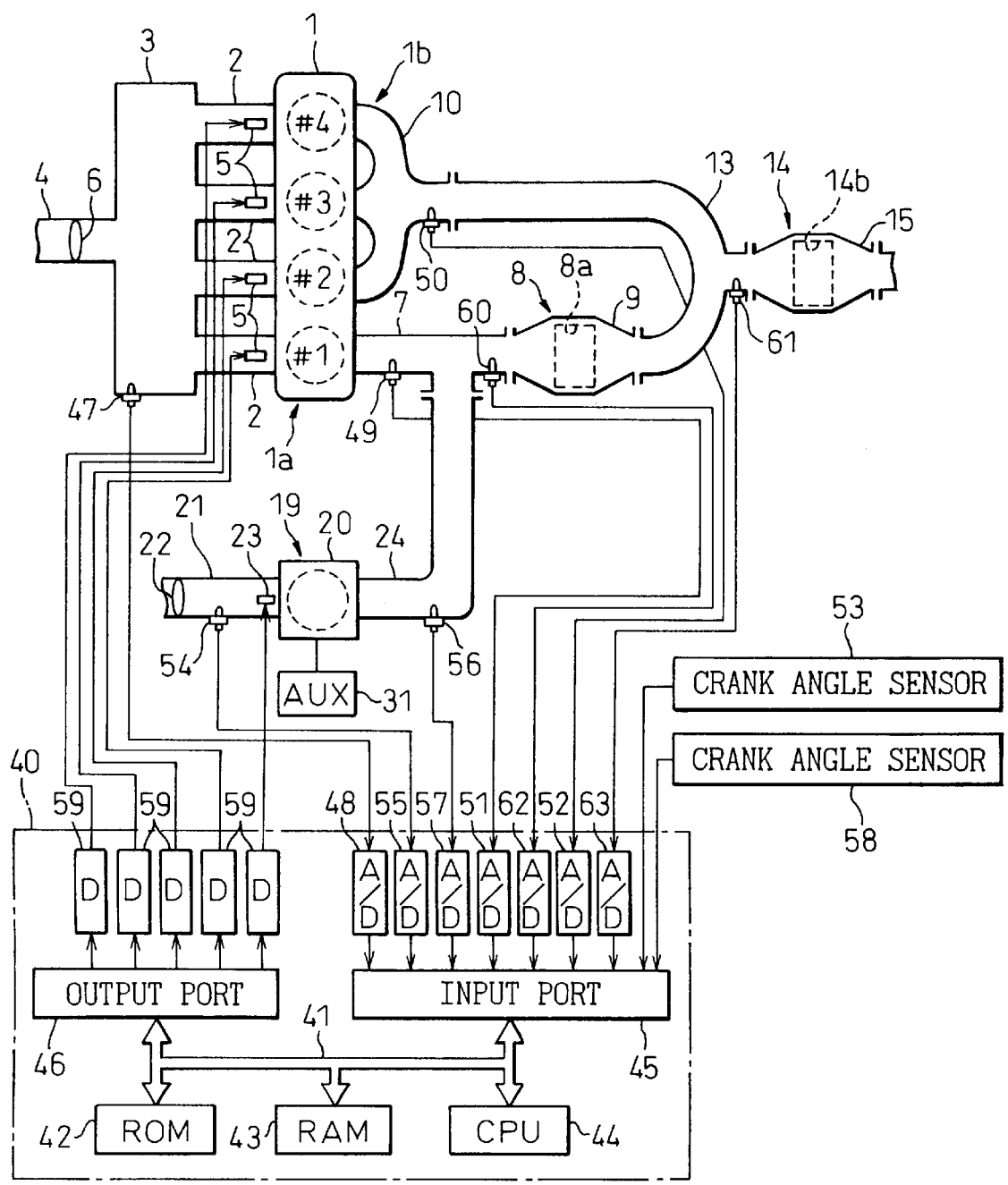
FIG. 28 is a general view of an engine according to further another embodiment.

FIG. 28 illustrates further another embodiment.

Referring to FIG. 28, the rich gas forming device 19 comprises the auxiliary engine, as in the embodiment shown in FIG. 1. However, the exhaust pipe 24 of the auxiliary engine 20 is connected to the exhaust pipe 7 without the switching valve, and thereby the exhaust gas of the auxiliary engine 20 is always introduced to the exhaust pipe 7.

In this embodiment, the exhaust gas purifying catalyst 14 is composed of an $NO_X$ occluding and reducing ($NO_X$—OR) catalyst having the $NO_X$ occluding function and the catalytic function. The $NO_X$—OR catalyst comprises at least one substance selected from alkali metals such as potassium K, sodium Na, lithium Li, and cesium Cs, alkali earth metals such as barium Ba and calcium Ca, rare earth metals such as lanthanum La and yttrium Y, and transition metals such as iron Fe and copper Cu, and of precious metals such as palladium Pd, platinum Pt, rhodium Rh, and iridium Ir, which are carried on a wash coat layer of alumina as a carrier. The $NO_X$—OR catalyst performs the $NO_X$ occluding and releasing function in which it occludes $NO_X$ therein when the exhaust gas air-fuel ratio of the inflowing exhaust gas is lean, and releases the occluded $NO_X$ therefrom when the oxygen concentration in the inflowing exhaust gas becomes lower.

When the $NO_X$—OR catalyst is disposed in the exhaust passage of the engine, the $NO_X$—OR catalyst actually performs the $NO_X$ occluding and releasing function, but the detailed mechanism of the function is still unclear. However, it can be considered that the function is performed according to the following mechanism. This mechanism will be explained by using as an example a case where platinum Pt and barium Ba are carried on the carrier, but a similar mechanism is obtained even if another precious metal, alkali metal, alkali earth metal, or rare earth metal is used.

Namely, when the exhaust gas air-fuel ratio of the inflowing exhaust gas flowing to the $NO_X$—OR catalyst 14b becomes lean, that is, when the oxygen concentration in the inflowing exhaust gas increases, the oxygen $O_2$ is deposited on the surface of platinum Pt in the form of $O^{2-}$ or $O_2^-$. On the other hand, NO in the inflowing exhaust gas reacts with $O^{2-}$ or $O_2^-$ on the surface of the platinum Pt and becomes $NO_2$ ($2NO+O_2 \rightarrow 2NO_2$). Subsequently, a part of the produced $NO_2$ is oxidized on the platinum Pt and is occluded into the $NO_X$—OR catalyst. While bonding with barium oxide BaO, it is diffused in the $NO_X$—OR catalyst in the form of nitric acid ions $NO_3^-$. In this way, $NO_X$ is occluded in the $NO_X$—OR catalyst 14b.

Contrarily, when the oxygen concentration in the inflowing exhaust gas becomes lower and the production of $NO_2$ is lowered, the reaction proceeds in an inverse direction ($NO_3^- \rightarrow NO_2$), and thus nitric acid ions $NO_3^-$ in the $NO_X$—OR catalyst 14b are released in the form of $NO_2$ from the $NO_X$—OR catalyst 14b. Namely, when the oxygen concentration in the inflowing exhaust gas is lowered, that is, when the exhaust gas air-fuel ratio of the inflowing exhaust gas is changed lean to rich, $NO_X$ is released from the $NO_X$—OR catalyst. At this time, if the reducing agent, such as $NH_3$, exists at the $NO_X$—OR catalyst 14b, $NO_X$ is reduced and purified by the reducing agent. Note that, when the exhaust gas air-fuel ratio of the exhaust gas flowing to the $NO_X$—OR catalyst 14b is rich, hydrocarbon HC, carbon monoxide CO or hydrogen $H_2$ are contained in the exhaust gas flowing to the $NO_X$—OR catalyst, as can be seen in FIG. 2(A). It is considered that the HC, CO, etc. act as reducing agents, as well as $NH_3$, and reduce some of the $NO_X$ on the $NO_X$—OR catalyst 14b. However, the reducing ability of $NH_3$ is higher than that of HC, CO, etc., and thus the $NO_X$ can be reliably purified by using $NH_3$ as a reducing agent.

Figure 29:
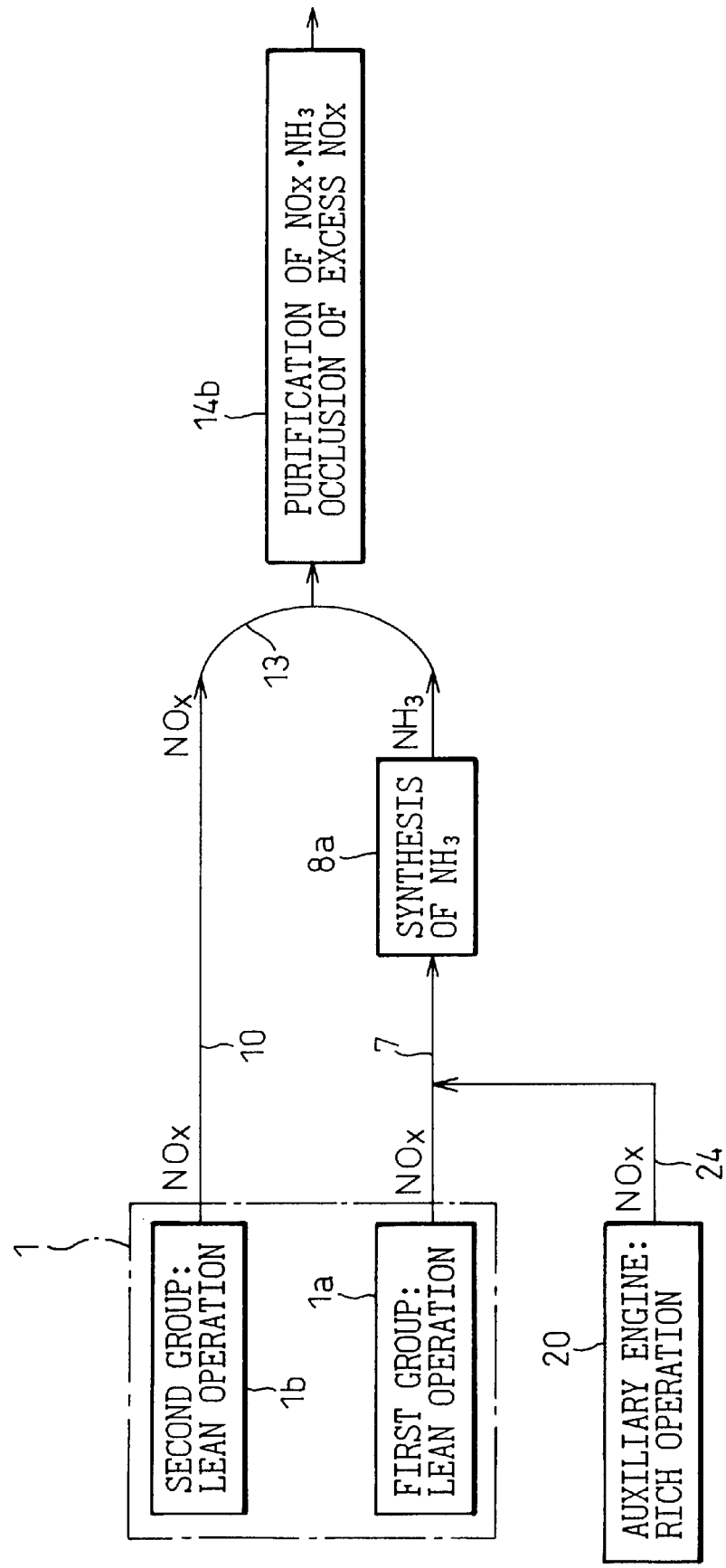
FIGS. 29 and 30 schematically illustrate the exhaust gas purifying method of the exhaust gas purifying device shown in FIG. 28.
Figure 30:
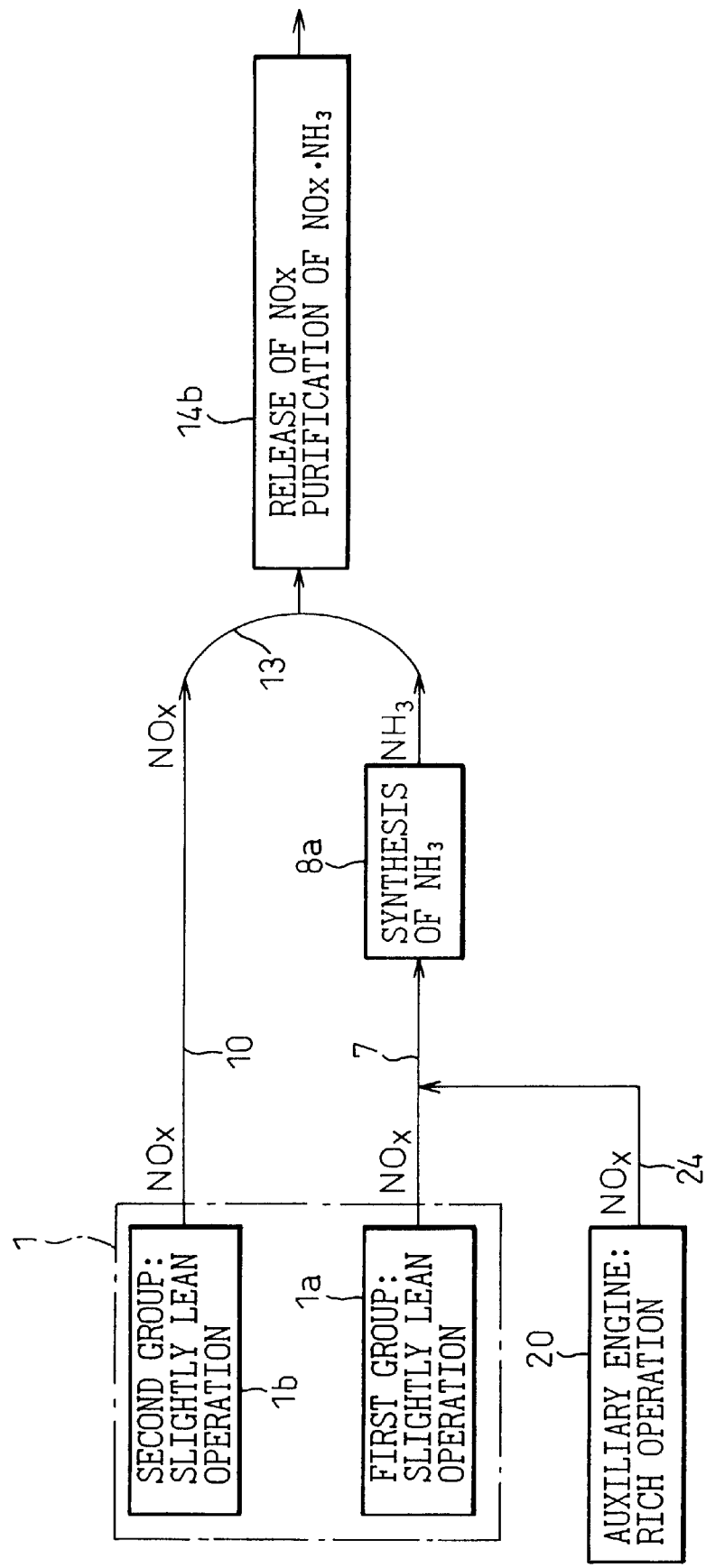

Next, the exhaust gas purifying method according to this embodiment will be explained, with reference to FIGS. 29 to 31.

In this embodiment, the main engine 1, that is, both the first cylinder group 1a and the second cylinder group 1b usually perform the lean operations. In this case, the target air-fuel ratio of the main engine M(A/F)T is made equal to the constant lean air-fuel ratio (A/F)L, such as 18.5. Contrarily the target air-fuel ratio of the auxiliary engine A(A/F)T is usually made equal to the rich air-fuel ratio (A/F)R, that is, the auxiliary engine 20 usually performs the rich operation. The target air-fuel ratio of the auxiliary engine A(A/F)T is selected to keep the exhaust gas air-fuel ratio of the exhaust gas flowing to the TW catalyst 8a at the above-mentioned rich air-fuel ratio (A/F)RR, such as 13.8. Accordingly, the $NH_3$ synthesizing operation is performed at the TW catalyst 8a, and the $NH_3$ flows to the $NO_X$—OR catalyst 14b.

The $NH_3$ from the TW catalyst 8a and the $NO_X$ from the second cylinder group 1b flow to the $NO_X$—OR catalyst 14b. At this time, the exhaust gas air-fuel ratio of the exhaust gas mixture flowing to the $NO_X$—OR catalyst 14b is lean. Thus, the $NH_3$ and the $NO_X$ are purified at the $NO_X$—OR catalyst 14b simultaneously. In the present embodiment, the rich air-fuel ratio (A/F)RR, which is the exhaust gas air-fuel ratio of the exhaust gas flowing to the TW catalyst 8a, is selected to make the $NH_3$ amount flowing to the $NO_X$—OR catalyst 14b equal to or smaller than that required to reduce the $NO_X$ amount flowing to the $NO_X$—OR catalyst 14b. In this condition, the excess $NO_X$ with respect to the $NH_3$ at the $NO_X$—OR catalyst 14b is occluded in the $NO_X$—OR catalyst 14b, and thus, both $NO_X$ and $NH_3$ are prevented from being discharged from the $NO_X$—OR catalyst 14b. The exhaust gas purifying method in this case is schematically illustrated in FIG. 29.

Then, the $NO_X$ amount occluded in the $NO_X$—OR catalyst 14b, that is, the occluded $NO_X$ amount $S(NO_X)$, increases, and when the $NO_X$—OR catalyst 14b saturates, the $NO_X$ will be discharged from the $NO_X$—OR catalyst 14b without being purified. Therefore, the occluded $NO_X$ amount $S(NO_X)$ is first obtained, and when the occluded $NO_X$ amount $S(NO_X)$ exceeds an upper threshold $UT(NO_X)$, the exhaust gas air-fuel ratio of the exhaust gas mixture flowing to the $NO_X$—OR catalyst 14b is made rich, to thereby release the occluded $NO_X$ from the $NO_X$—OR catalyst 14b. In this condition, the exhaust gas air-fuel ratio of the exhaust gas flowing to the TW catalyst 8a is kept at the rich air-fuel ratio, that is, the $NH_3$ synthesizing is continued. Thus, the $NO_X$ released from the $NO_X$—OR catalyst 14b is purified by the $NH_3$ in the inflowing exhaust gas. Accordingly, both $NO_X$ and $NH_3$ are prevented from being discharged from the $NO_X$—OR catalyst 14b, even during the $NO_X$ releasing operation.

To make the exhaust gas air-fuel ratio of the exhaust gas mixture flowing to the $NO_X$—OR catalyst 14b, the target air-fuel ratio of the main engine M(A/F)T is changed toward the rich side, while the auxiliary engine 20 continuously performs the rich operation, in this embodiment. The target air-fuel ratio M(A/F)T may be selected as any air-fuel ratio as long as the exhaust gas air-fuel ratio of the exhaust gas mixture flowing to the $NO_X$—OR catalyst 14b is kept rich. However, the target air-fuel ratio M(A/F)T is made equal to (A/F)P, which is slightly lean, such as 15.0, that is, the main engine 1 performs the slightly lean operation. On the other hand, the auxiliary engine 20 continuously performs the rich operation with the constant rich air-fuel ratio (A/F)R. The exhaust gas purifying method in this case is schematically illustrated in FIG. 30.

Alternatively, the main engine 1 may perform the stoichiometric or the rich operation, when the exhaust gas air-fuel ratio of the exhaust gas flowing to the $NO_X$—OR catalyst 14b is to be made rich. Or, the target air-fuel ratio A(A/F)T of the auxiliary engine 20 may be smaller or richer.

A continuous $NO_X$ releasing operation decreases the occluded $NO_X$ amount $S(NO_X)$. When the occluded $NO_X$ amount $S(NO_X)$ becomes lower than the lower threshold LT$(NO_X)$, the main engine 1 resumes the lean operation, while the auxiliary engine 20 continuously performs the rich operation.

Figure 31:
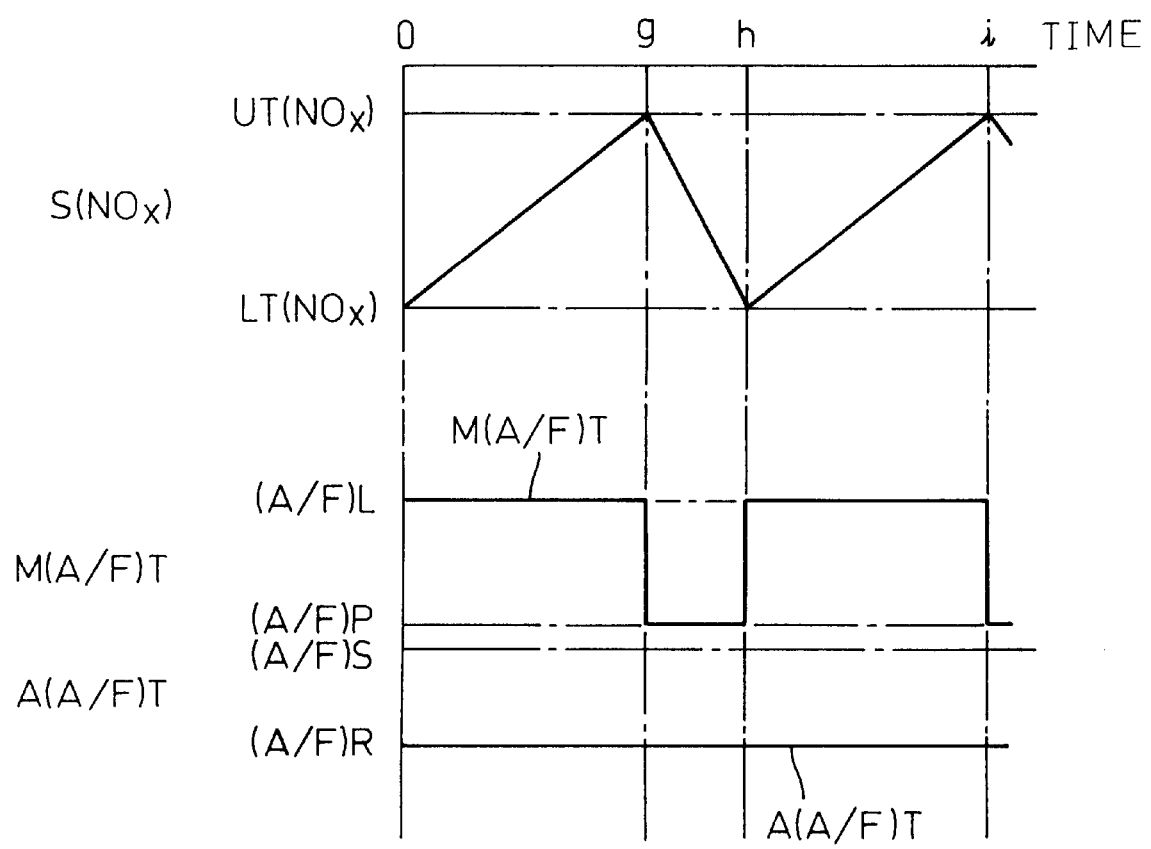
FIG. 31 is a time chart illustrating an amount of $NO_X$ occluded in the $NO_X$—OR catalyst, and target air-fuel ratios of the main and the auxiliary engines.

FIG. 31 is a time chart for illustrating the occluded $NO_X$ amount $S(NO_X)$ of the $NO_X$—OR catalyst 14b, and the target air-fuel ratios M(A/F)T and A(A/F)T of the main and the auxiliary engines 1 and 20. In FIG. 31, the time zero represents a time when the occlusion of the excess $NO_X$ starts at $NO_X$—OR catalyst 14b. At this time, the target air-fuel ratio of the auxiliary engine A(A/F)T is made equal to the rich air-fuel ratio (A/F)R, that is, the auxiliary engine 20 performs the rich operation. Contrarily, the target air-fuel ratio of the main engine M(A/F)T is made equal to the lean operation (A/F)L, that is, the main engine 1 performs the lean operation. Accordingly, the exhaust gas air-fuel ratio of the exhaust gas mixture flowing to the $NO_X$—OR catalyst 14b is made lean. As a result, the occluded $NO_X$ amount $S(NO_X)$ increases gradually, and exceeds the upper threshold $UT(NO_X)$ at the time "g". When $S(NO_X) > UT(NO_X)$, the target air-fuel ratio M(A/F)T is made equal to (A/F)P, and the main engine 1 performs the slightly lean operation. On the other hand, the target air-fuel ratio A(A/F)T is kept at the rich air-fuel ratio (A/F)R. As a result, the exhaust gas air-fuel ratio of the exhaust gas mixture flowing to the $NO_X$—OR catalyst 14b, and thus, the occluded $NO_X$ is released from the $NO_X$—OR catalyst 14b. Thus, the occluded $NO_X$ amount $S(NO_X)$ decreases, and becomes lower than the lower threshold $LT(NO_X)$ at the time "h". When $S(NO_X) < LT(NO_X)$ at the time "i", the target air-fuel ratio M(A/F)T of the main engine 1 is returned to the lean air-fuel ratio (A/F)L, to thereby make the exhaust air-fuel ratio of the exhaust gas mixture flowing to the $NO_X$—OR catalyst 14b. Note, that target air-fuel ratio of the auxiliary engine A(A/F)T is kept at the rich air-fuel ratio (A/F)R.

The exhaust gas air-fuel ratio of the exhaust gas flowing to the $NO_X$—OR catalyst 14b, that is, the exhaust gas air-fuel ratio of the exhaust gas mixture of the main and the auxiliary engines 1 and 20, must be made rich to release the occluded $NO_X$ from the $NO_X$—OR catalyst 14b, as mentioned above. Thus, when the amount of the exhaust gas of the main engine 1 is relatively large, it is difficult to make the exhaust gas air-fuel ratio of the exhaust gas mixture flowing to the $NO_X$—OR catalyst 14b rich, even though the main engine performs the slightly lean operation and the auxiliary engine 20 performs the rich operation. Therefore, in the present embodiment, the exhaust gas air-fuel ratio of the exhaust gas mixture flowing to the $NO_X$—OR catalyst 14b is made rich to release the occluded $NO_X$ from the $NO_X$—OR catalyst 14b when the exhaust gas amount of the main engine 1 is smaller than a predetermined amount, such as in the low load engine operation. As a result, the exhaust gas air-fuel ratio of the exhaust gas flowing to the $NO_X$—OR catalyst 14b is made rich easily and surely.

It is difficult to directly find the occluded $NO_X$ amount $S(NO_X)$. Thus, in the present embodiment, the occluded $NO_X$ amount $S(NO_X)$ is estimated on the basis of the difference between the $NO_X$ and the $NH_3$ amounts flowing to the $NO_X$—OR catalyst 14b. Next, the control of the $NO_X$ releasing and the calculation of the occluded $NO_X$ amount $S(NO_X)$ will be explained in detail, with reference to FIG. 32.

Figure 32:
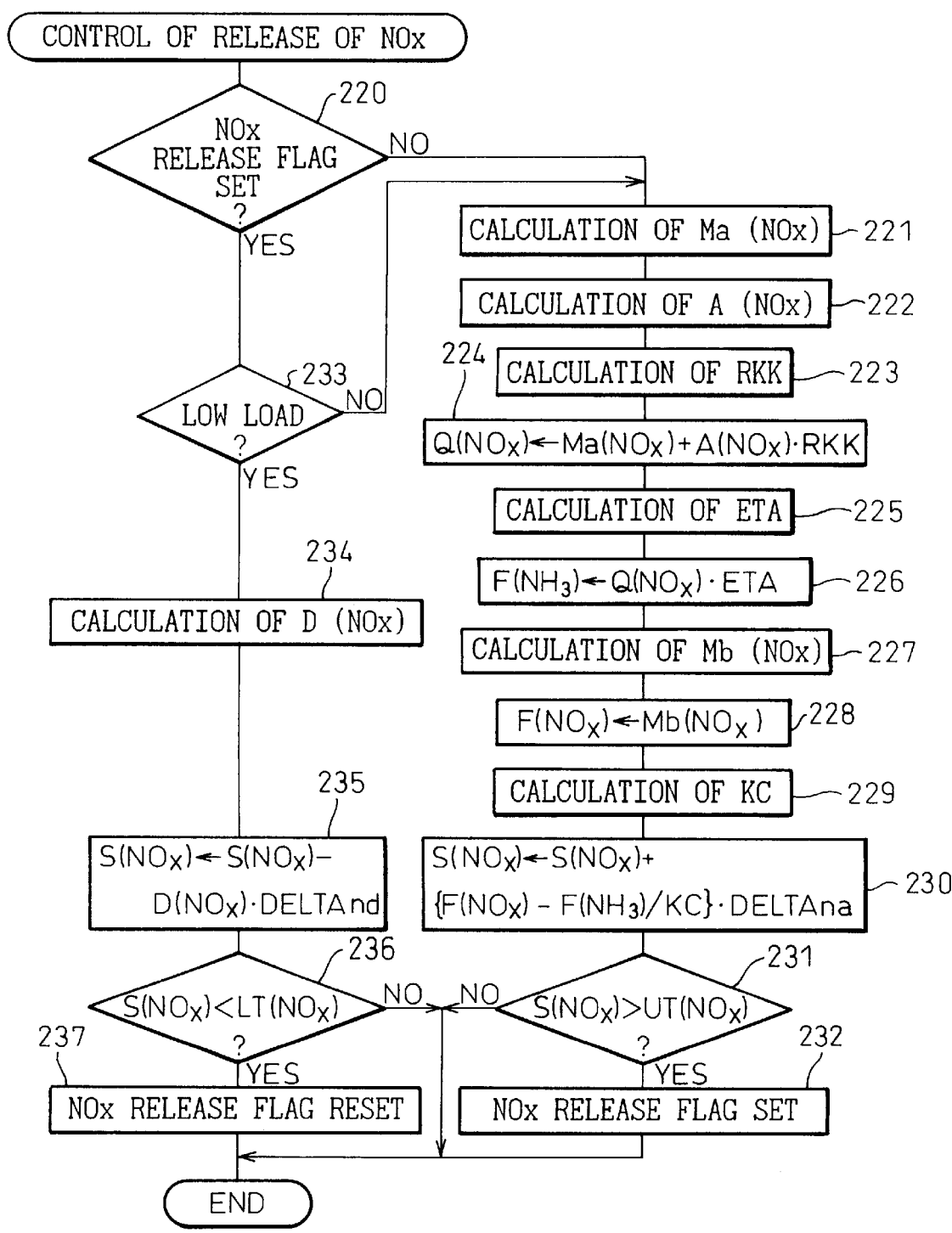
FIG. 32 is a flow chart for controlling the $NO_X$ release operation in the embodiment shown in FIG. 28.

FIG. 32 shows a routine for executing the above-mentioned $NO_X$ release control. The routine is executed by interruption every predetermined time.

Referring to FIG. 32, first, in step 220, it is Judged whether the $NO_X$ release flag is set. The $NO_X$ release flag is set when the exhaust gas air-fuel ratio of the exhaust gas flowing to the $NO_X$—OR catalyst 14b is to be made rich, and is reset when that exhaust gas air-fuel ratio is to be made lean. When the $NO_X$ release flag is reset, the routine goes to step 221, where the discharged $NO_X$ amount Ma$(NO_X)$ of the first cylinder group 1a is calculated using the map shown in FIG. 8(B). In the following step 222, the discharged $NO_X$ amount A$(NO_X)$ of the auxiliary engine 20 is calculated using the map shown in FIG. 9(B). In the following step 223, the coefficient RKK is calculated using the map shown in FIG. 10. In the following step 224, the inflowing $NO_X$ amount Q$(NO_X)$ of the TW catalyst 8a is calculated using the following equation:

$$Q(NO_X) = Ma(NO_X) + A(NO_X) \cdot RKK$$

In the following step 225, the synthesizing efficiency ETA is calculated using the map shown in FIG. 11. In the following step 226, the inflowing $NH_3$ amount $F(NH_3)$ of the $NO_X$—OR catalyst 14b is calculated using the following equation:

$$F(NH_3) = Q(NO_X) \cdot ETA$$

In the following step 227, the discharged $NO_X$ amount Mb$(NO_X)$ of the second cylinder group 1b is calculated using the map shown in FIG. 12(B). In the following step 228, Mb$(NO_X)$ is memorized as the inflowing $NO_X$ amount F($NO_X$) of the $NO_X$—OR catalyst 14b. In the following step 229, the equivalent coefficient KC is calculated using the map shown in FIG. 13. In the following step 230, the occluded $NO_X$ amount S($NO_X$) of the $NO_X$—OR catalyst 14b is calculated using the following equation:

$$S(NO_X)=S(NO_X)+\{F(NO_X)-F(NH_3)/KC\}\cdot DELTAna$$

where DELTAna represents a time interval from the previous processing cycle to the present processing cycle. Namely, the $NO_X$ amount represented by F($NH_3$)/KC in the $NO_X$ flowing to the $NO_X$—OR catalyst 14b is purified, and the remaining $NO_X$ is occluded in the $NO_X$—OR catalyst 14b. In the following step 231, it is judged whether the occluded $NO_X$ amount S($NO_X$) is larger than the upper threshold UT($NO_X$). If S($NO_X$)≦UT($NO_X$), the processing cycle is ended. That is, if S($NO_X$)≦UT($NO_X$), it is judged that the $NO_X$ occluding capacity of the $NO_X$—OR catalyst 14b is still large, and the exhaust gas air-fuel ratio of the exhaust gas flowing to the $NO_X$—OR catalyst 14b is kept lean, to thereby continue the $NO_X$ occluding operation of the $NO_X$—OR catalyst 14b.

Contrarily, if S($NO_X$)>UT($NO_X$) in step 231, the routine goes to step 232, where the $NO_X$ release flag is set, and then the processing cycle is ended. That is, when S($NO_X$)>UT($NO_X$), it is judged that the $NO_X$ occluding capacity of $NO_X$—OR catalyst 14b becomes smaller, and the exhaust gas air-fuel ratio of the exhaust gas flowing to the $NO_X$—OR catalyst 14b is changed to rich, to thereby release the occluded $NO_X$.

On the other hand, when the $NO_X$ release flag is set in step 220, the routine goes to step 233, where it is judged whether the main engine 1 is under the low load operation. When the main engine 1 is in the middle or the high load operation, the routine goes to step 221. Namely, when the main engine 1 is in the middle or the high load operation, the $NO_X$ releasing operation is not performed, but the excess $NO_X$ occluding operation is performed, even though the $NO_X$ release flag is set. Contrarily, when the main engine 1 is in the low load operation, the $NO_X$ occluding operation is performed, and the routine goes from step 233 to step 234, where the released $NO_X$ amount D($NO_X$) of the $NO_X$—OR catalyst 14b is calculated using the map shown in FIG. 33(B).

Figure 33A:
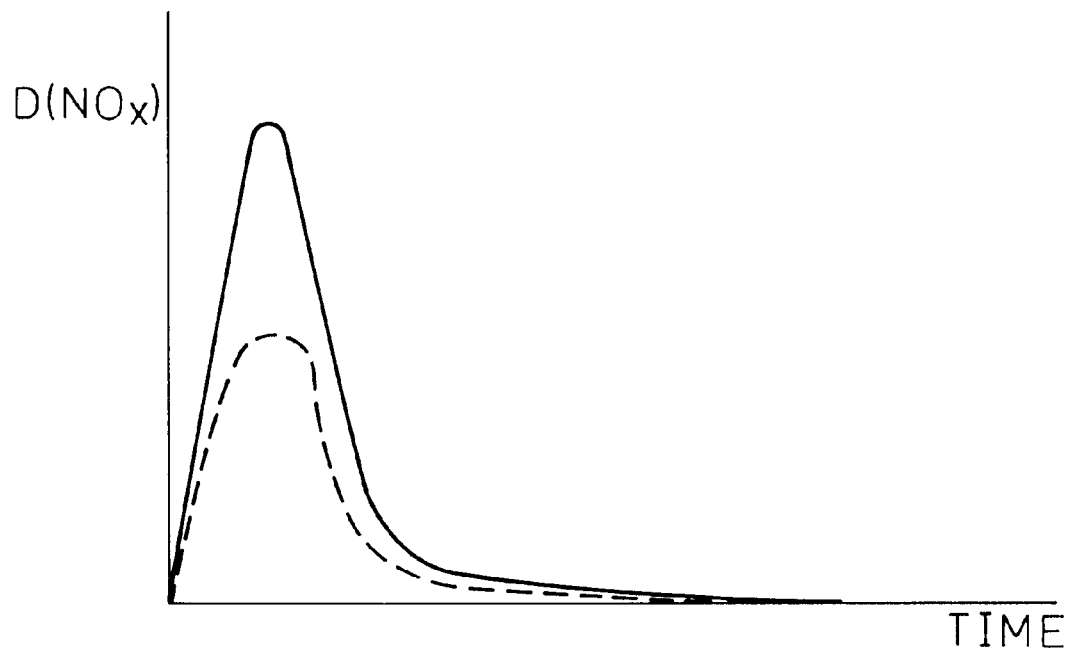
FIGS. 33A and 33B are diagrams illustrating an amount of $NO_X$ released from the $NO_X$—OR catalyst per unit time.
Figure 33B:
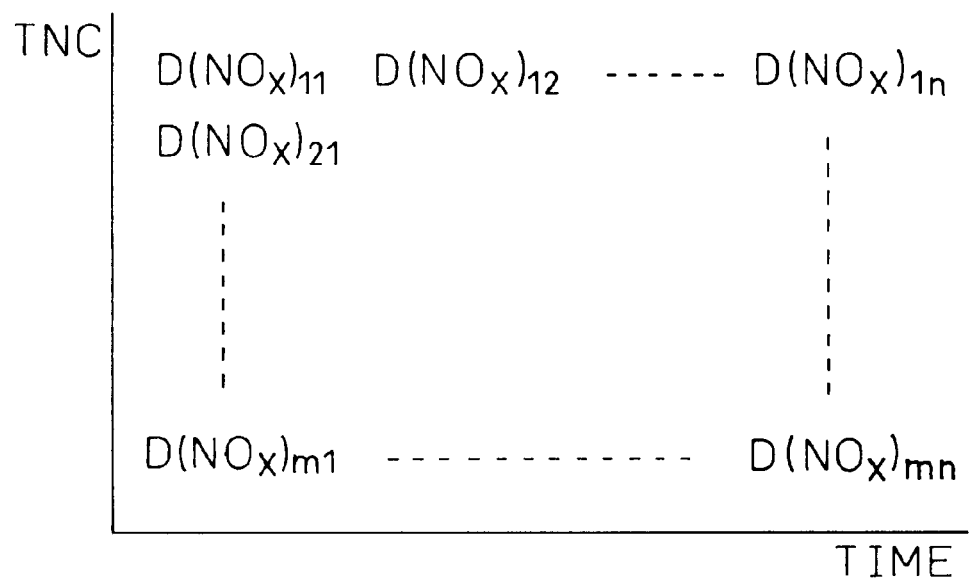

FIG. 33(A) illustrates the amount of $NO_X$ released from the $NO_X$—OR catalyst 14b per unit time D($NO_X$), obtained by experiments. In FIG. 33(A), the solid curve shows the case where the temperature of the $NO_X$—OR catalyst 14b is high, and the broken curve shows the case where that temperature is low. Further, in FIG. 33(A), TIME represents a time at which the exhaust gas air-fuel ratio of the exhaust gas flowing into the $NO_X$—OR catalyst 14b is changed from lean to rich. The decomposition rate of $NO_X$ in the $NO_X$—OR catalyst 14b becomes higher as the temperature of the $NO_X$—OR catalyst 14b becomes higher. Thus, when the temperature of the $NO_X$—OR catalyst 14b, i.e., the temperature TNC of the exhaust gas flowing to the $NO_X$—OR catalyst 14b is high as shown by the solid line in FIG. 33(A), a large amount of $NO_X$ is released from the $NO_X$—OR catalyst 14b in a short time, while when TNC is low as shown by the broken line in FIG. 33(A), a small amount of $NO_X$ is released. In other words, the released $NO_X$ amount per unit time D($NO_X$) becomes larger and the exhaust gas temperature TNC becomes higher. The released $NO_X$ amount D($NO_X$) is stored in the ROM 42 as a function of TNC and TIME, in advance in the form of a map as shown in FIG. 33(B). Note that the exhaust gas temperature TNC is detected by the temperature sensor 61, as shown in FIG. 28.

In the following step 235, the occluded $NO_X$ amount S($NO_X$) is calculated using the following equation:

$$S(NO_X)=S(NO_X)-D(NO_X)\cdot DELTAnd$$

where DELTAnd represents a time interval from the previous processing cycle to the present processing cycle. In the following step 236, it is judged whether the occluded $NO_X$ amount S($NO_X$) is smaller than the lower threshold LT($NO_X$). When S($NO_X$)≧LT($NO_X$), the processing cycle is ended. Namely, when S($NO_X$)≧LT($NO_X$), it is judged that the $NO_X$ occluding capacity of the $NO_X$—OR catalyst 14b is still small, and thus the exhaust gas air-fuel ratio of the exhaust gas flowing to the $NO_X$—OR catalyst 14b is kept rich. As a result, the $NO_X$ releasing operation is continued.

When S($NO_X$)<LT($NO_X$), the routine goes to step 237, where the $NO_X$ release flag is reset, and then the processing cycle is ended. Namely, when S($NO_X$)<LT($NO_X$), it is judged that the $NO_X$ occluding capacity of the $NO_X$—OR catalyst 14b is sufficiently large, and the exhaust gas air-fuel ratio of the exhaust gas flowing to the $NO_X$—OR catalyst 14b is made lean. As a result, the excess $NO_X$ is occluded in the $NO_X$—OR catalyst 14b.

Figure 34:
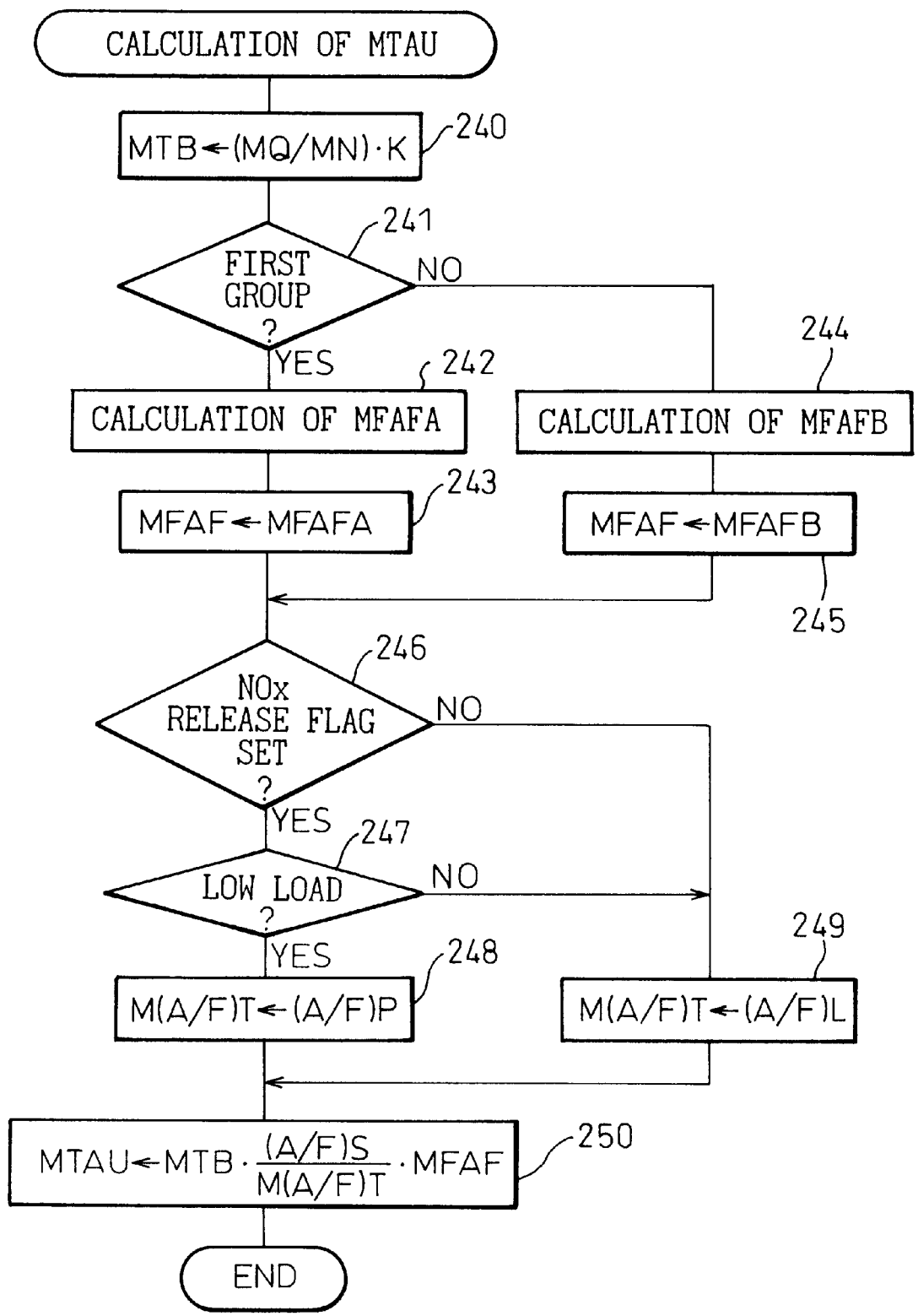
FIG. 34 is a flow chart for calculating the fuel injection time of the main engine in the embodiment shown in FIG. 28.

FIG. 34 illustrates the routine for calculating the fuel injection time MTAU for the main engine 1. The routine is executed by interruption every predetermined crank angle.

Referring to FIG. 34, first, in step 240, the basic fuel injection time MTB is calculated using the following equation:

$$MTB=(MQ/MN)\cdot K$$

In the following step 241, it is judged whether the fuel injection time MTAU to be calculated in this processing cycle is for the first cylinder group 1a or for the second cylinder group 1b. If MTAU is for the first cylinder group 1a, the routine goes to step 242, where the feedback correction coefficient FAFA for the first cylinder group 1a is calculated. In the following step 243, FAFA is memorized as FAF. Then, the routine goes to step 246.

Contrarily, in step 241, if MTAU is for the second cylinder group 1b, the routine goes to step 244, where the feedback correction coefficient FAFB for the second cylinder group 1b is calculated. In the following step 245, FAFB is memorized as FAF. Then, the routine goes to step 246.

In step 246, it is judged whether the $NO_X$ release flag, which is set or reset in the routine shown in FIG. 33, is set. If the $NO_X$ release flag is set, the routine goes to step 247, it is judged whether the main engine 1 is under the low load operation. When the main engine 1 is under the low load operation, the routine goes to step 248, where (A/F)P is memorized as the target air-fuel ratio M(A/F)T of the main engine 1. Therefore, when the $NO_X$ release flag is set and the main engine 1 is under the low load operation, the main engine 1 performs the slightly lean operation, to make the exhaust gas air-fuel ratio of the exhaust gas flowing to the $NO_X$—OR catalyst 14b rich. Accordingly, the $NO_X$ releasing operation of the $NO_X$—OR catalyst 14b is performed.

Contrarily, when the $NO_X$ release flag is reset in step 246 or when the main engine 1 is in the middle or the high load operation, the routine goes to step 249, where the target air-fuel ratio M(A/F)T for the main engine 1 is made equal to the lean air-fuel ratio (A/F)L, and the main engine 1 performs the lean operation. Therefore, the exhaust gas air-fuel ratio of the exhaust gas flowing to the $NO_X$—OR catalyst 14b is made lean, and the excess $NO_X$ is occluded in the $NO_X$—OR catalyst 14b. Then, the routine goes to step 250.

In step 250, the fuel injection time MTAU is calculated using the following equation:

$$MTAU = MTB \cdot ((A/F)S/M(A/F)T) \cdot MFAF$$

Each fuel injector 5 injects the fuel for the fuel injection time MTAU.

Figure 35:
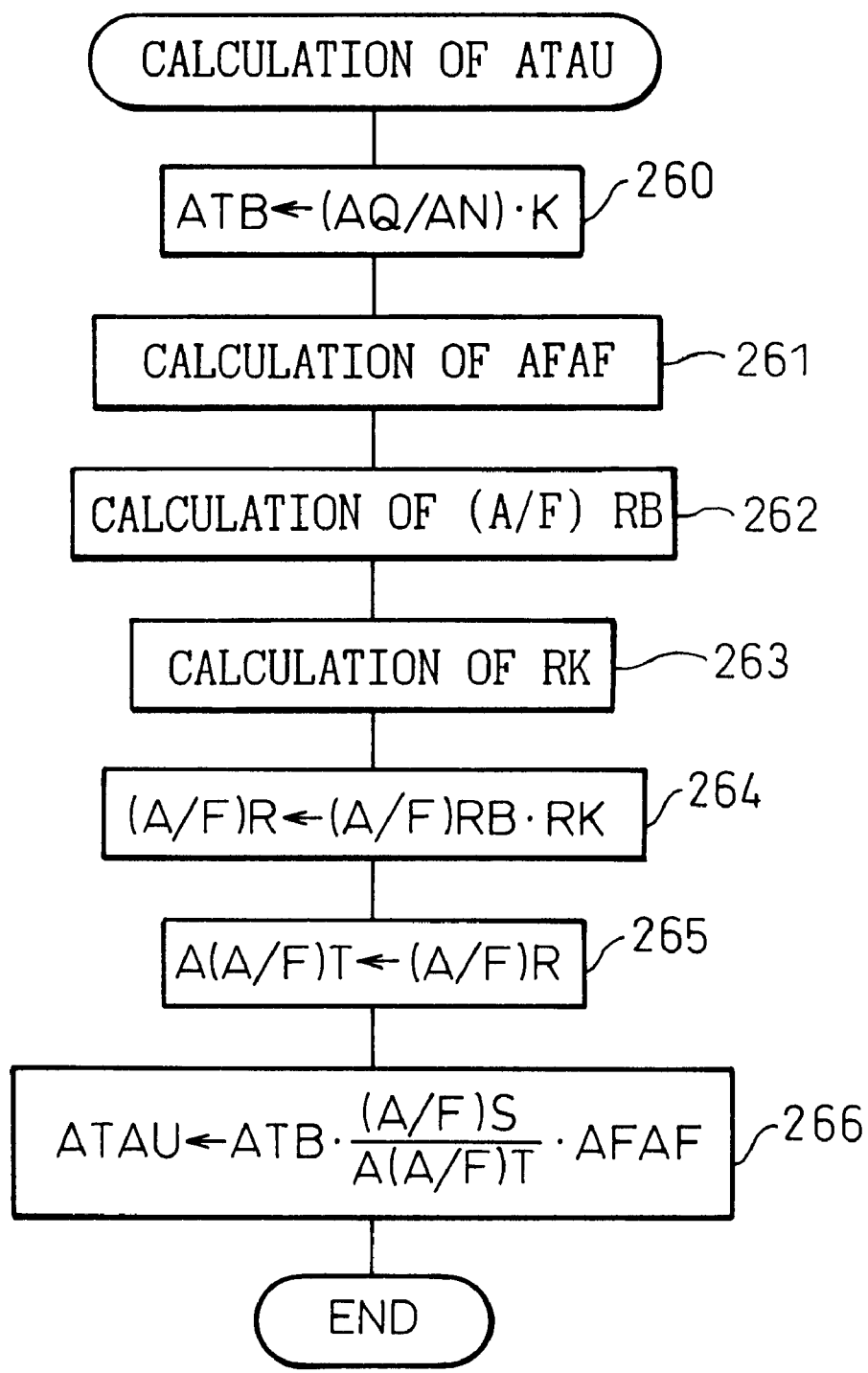
FIG. 35 is a flow chart for calculating the fuel injection time of the auxiliary engine in the embodiment shown in FIG. 28.

FIG. 35 illustrates a routine for calculating the fuel injection time ATAU of the auxiliary engine 20. This routine is executed by interruption every predetermined crank angle of the auxiliary engine 20.

Referring to FIG. 35, first, in step 260, the basic fuel injection time ATB is calculated using the following equation:

$$ATB = (AQ/AN) \cdot K$$

In the following step 261, the feedback correction coefficient AFAF is calculated. In the following step 262, the rich air-fuel ratio (A/F)RB is calculated using the map shown in FIG. 4(B). In the following step 263, the coefficient RK is calculated using the map shown in FIG. 5(B). In the following step 264, the rich air-fuel ratio (A/F)R is calculated using the following equation:

$$(A/F)R = (A/F)RB \cdot RK$$

In the following step 265, the target air-fuel ratio A(A/F)T is memorized as A(A/F)R. Then, the routine goes to step 266.

In step 266, the fuel injection time ATAU is calculated using the following equation:

$$ATAU = ATB \cdot ((A/F)S/A(A/F)T) \cdot AFAF$$

Fuel is injected from the fuel injector 23 for a period of this fuel injection time ATAU.

As mentioned above, if the main engine 1 performs the slightly lean operation when the occluded $NO_X$ is to be released from the $NO_X$—OR catalyst 14b, the $NO_X$ amount discharged from the second cylinder group 1b and flowing to the $NO_X$—OR catalyst 14b is reduced. Therefore, the $NO_X$ released from the $NO_X$—OR catalyst 14b is sufficiently purified.

In the present embodiment, the exhaust gas of the auxiliary engine 20 is continuously introduced to the exhaust pipe 7 and the $NH_3$ synthesizing is continuously performed at the TW catalyst 8a. Alternatively, the switching valve 25 and the additional TW catalyst 29a as in the engine shown in FIG. 1 may be provided to introduce the exhaust gas of the auxiliary engine 20 to the additional TW catalyst 29a usually, and to the exhaust gas of the auxiliary engine 20 performing the rich operation to the exhaust pipe 7 to thereby synthesis $NH_3$ temporarily, only when the occluded $NO_X$ is to be released from the $NO_X$—OR catalyst 14b. Note that the other constructions and the operation of the exhaust gas purifying device are the same as those in the embodiment shown in FIG. 1, and thus the explanations therefor are omitted.

Figure 36:
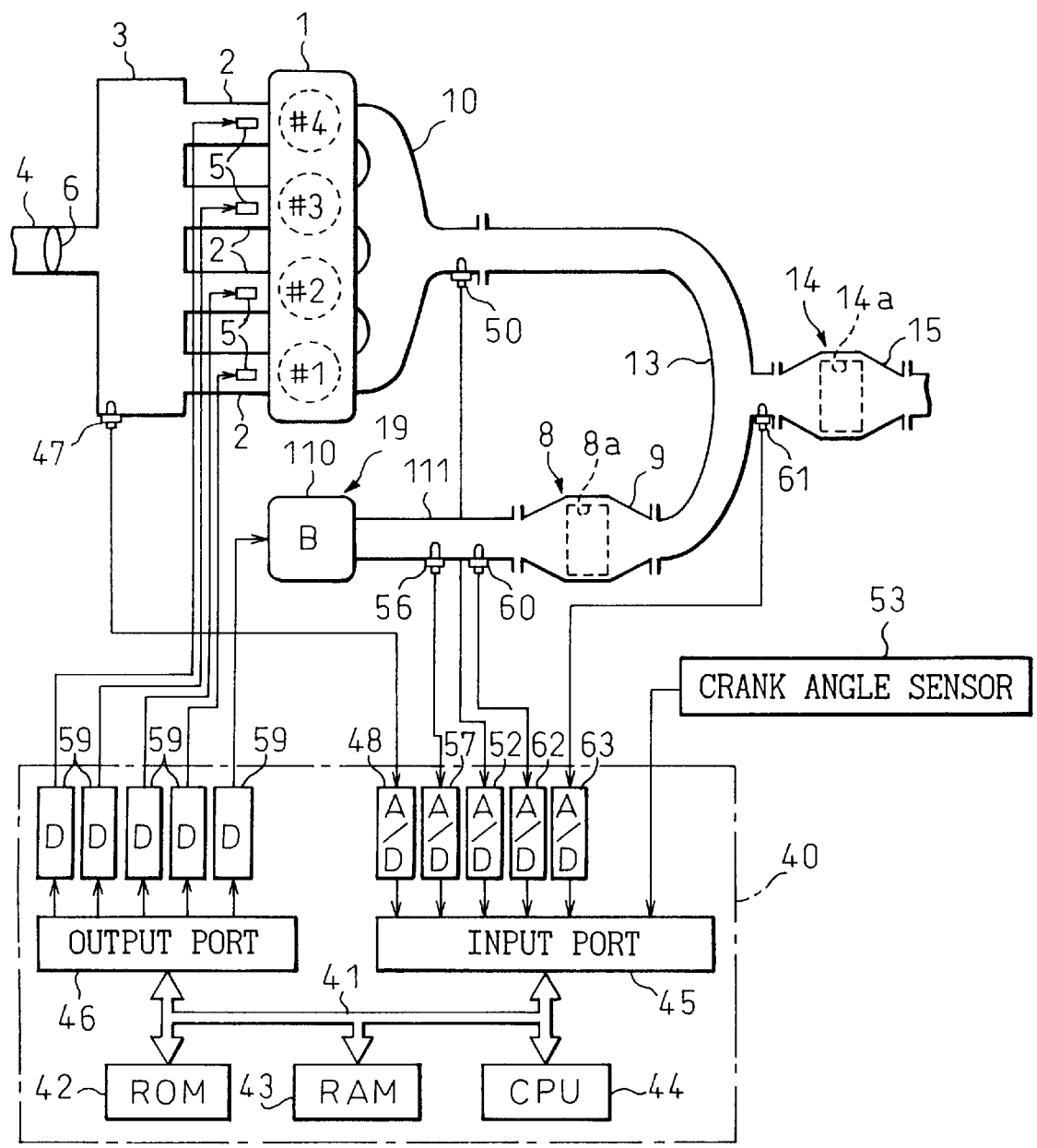
FIG. 36 is a general view of the engine according to further another embodiment.

FIG. 36 illustrates still another embodiment.

Referring to FIG. 36, the rich exhaust gas synthesizing device 19 is provided with a burner 110 capable of controlling the air-fuel ratio. The exhaust passage of this burner 110 is connected to the TW catalyst 8a forming the $NH_3$ synthesizing catalyst 8, via the exhaust pipe 111. Each cylinder of the engine 1 is connected to the exhaust manifold 10 common to all cylinders. The TW catalyst 8a and the exhaust manifold 10 are connected to the $NH_3$—AO catalyst 14a forming the exhaust gas purifying catalyst 14, via the interconnecting exhaust pipe 13. Note that the burner 110 is electrically connected to the output port 46 of the electronic control unit 40 via the drive circuit 59 and is controlled in accordance with the output signal output from the electronic control unit 40.

All cylinders of the main engine 1 usually perform the lean operation continuously. That is, the target air-fuel ratio of each cylinder of the main engine 1 is kept at, for example, a predetermined, constant lean air-fuel ratio (A/F)L. On the other hand, the burner 110 continuously performs a rich operation. That is, the target air-fuel ratio of the burner 110 is kept at, for example, a predetermined, constant rich air-fuel ratio (A/F)R. The engine air-fuel ratio of the main engine 1 is controlled in accordance with the output signal of the air-fuel ratio sensor 50, and that of the burner 110 is controlled in accordance with the output signal of the air-fuel ratio sensor 56 arranged in the exhaust pipe 111. An air amount fed to the burner 110 is made constant. Therefore, the burner 110 is operated in a steady condition.

Figure 37:
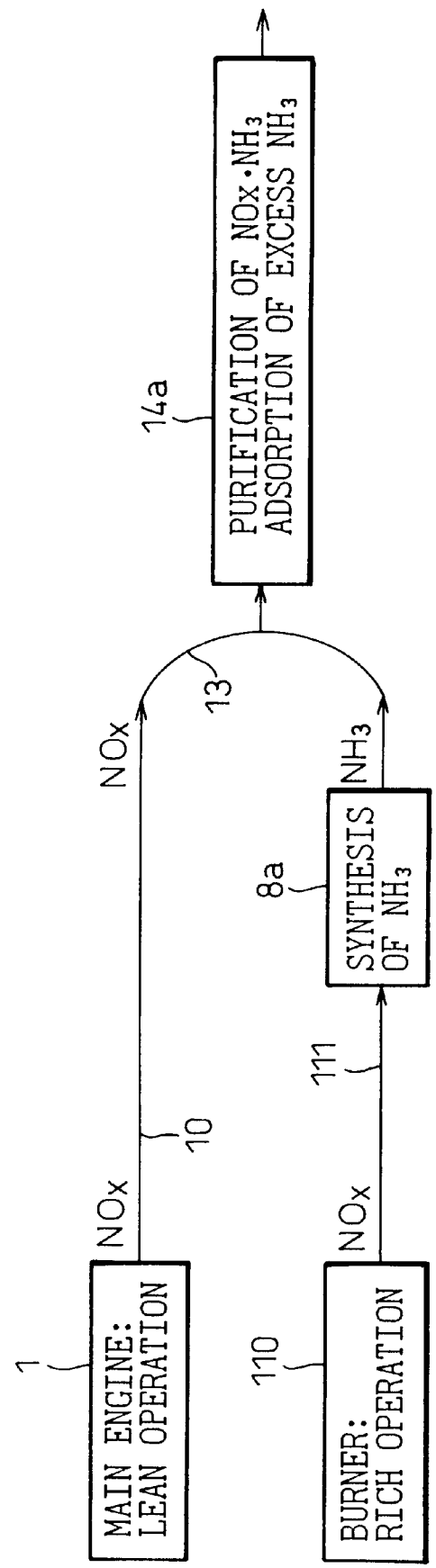
FIGS. 37 and 38 schematically illustrate the exhaust gas purifying method of the exhaust gas purifying device shown in FIG. 36.

The air-fuel ratio of the burner 110 conforms to the exhaust gas air-fuel ratio of the exhaust gas flowing to the TW catalyst 8a. When the burner 110 performs the rich operation and the exhaust gas air-fuel ratio of the exhaust gas flowing to the TW catalyst 8a is made rich, the TW catalyst 8a synthesizes $NH_3$ from the inflowing $NO_X$, and the $NH_3$ flows to the $NH_3$—AO catalyst 14a. At this time, the exhaust gas of the main engine 1 flows to the $NH_3$—AO catalyst 14a, and the exhaust gas air-fuel ratio of the exhaust gas mixture flowing to the $NH_3$—AO catalyst 14a is kept lean. As a result, at the $NH_3$—AO catalyst 14a, $NO_X$ in the inflowing exhaust gas is reduced by the inflowing $NH_3$. Therefore, it is possible to prevent $NO_X$ and $NH_3$ from flowing out of the $NH_3$—AO catalyst 14a without being purified. FIG. 37 schematically illustrates the exhaust gas purifying method in the above case.

Figure 38:
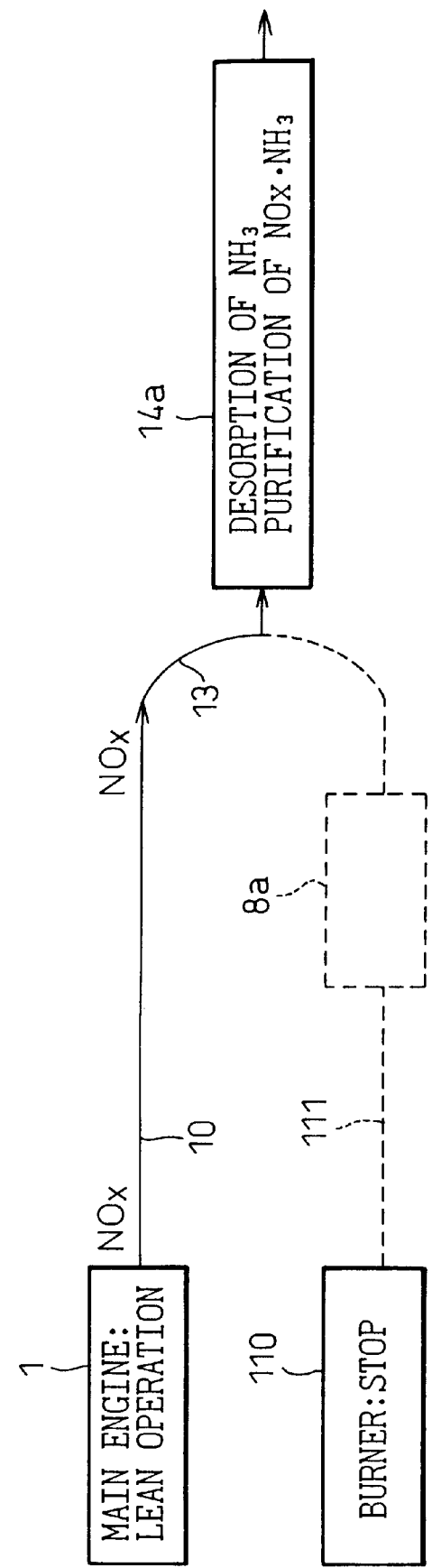

The excess $NH_3$ in the $NH_3$ fed to the $NH_3$—AO catalyst 14a is adsorbed in the $NH_3$—AO catalyst 14a. As a result, the $NH_3$ adsorbing capacity of the $NH_3$—AO catalyst 14a is gradually lowered. Therefore, when the adsorbed $NH_3$ amount of the $NH_3$—AO catalyst 14a exceeds the upper threshold, the combustion of the burner 110 is stopped, to thereby stop feeding of the exhaust gas of the burner 110 to the TW catalyst 8a. When the feeding of the exhaust gas of the burner 110 to the TW catalyst 8a is stopped, the $NH_3$ synthesizing at the TW catalyst 8a is stopped and the $NH_3$ feeding to the $NH_3$—AO catalyst 14a is stopped. As a result, the adsorbed $NH_3$ is desorbed from the $NH_3$—AO catalyst 14a. The desorbed $NH_3$ reduces $NO_X$ in the exhaust gas of the main engine 1 flowing to the $NH_3$—AO catalyst 14a. Therefore, also in this case, it is possible to prevent $NO_X$ and $NH_3$ from flowing out of the $NH_3$—AO catalyst 14a without being purified. FIG. 38 schematically illustrates the exhaust gas purifying method in the above case.

When the amount of $NH_3$ adsorbed in the $NH_3$—AO catalyst 14a becomes lower than the lower threshold, the combustion of the burner 110 is resumed, to synthesize $NH_3$ at the TW catalyst 8a, to thereby feed the $NH_3$ to the $NH_3$—AO catalyst 14a.

Figure 39:
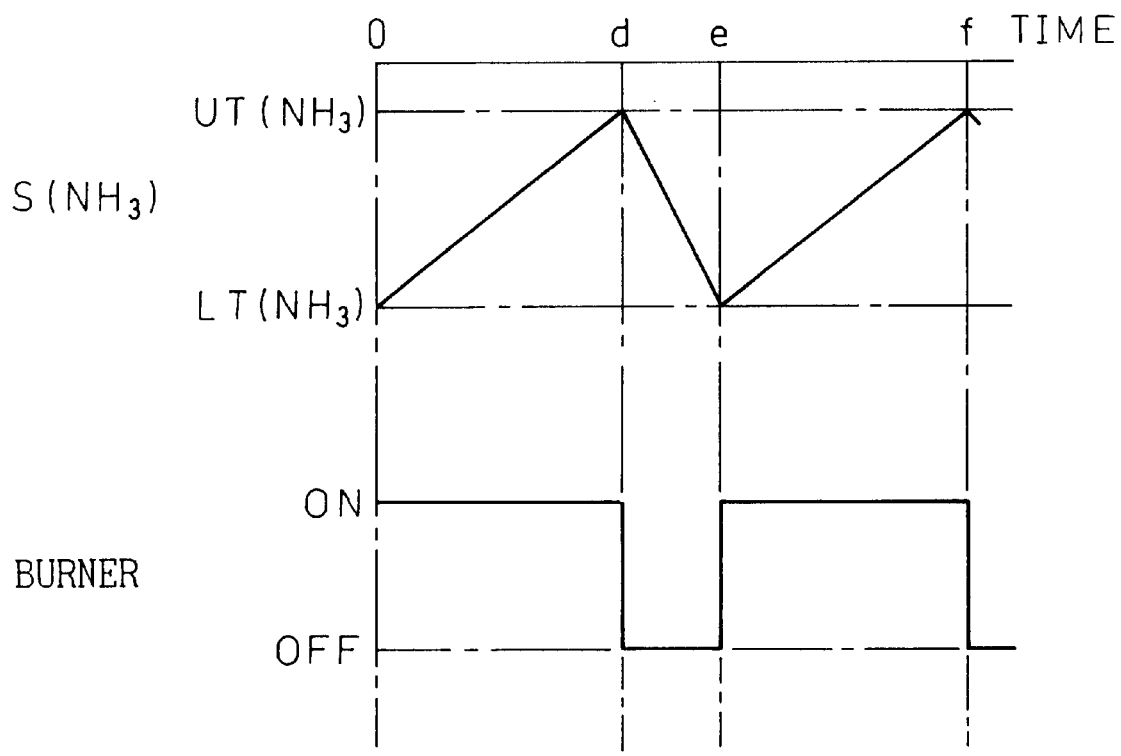
FIG. 39 is a time chart illustrating an amount of $NH_3$ adsorbed in the $NH_3$—AO catalyst and the operating condition of the burner.

FIG. 39 is a time chart illustrating the adsorbed $NH_3$ amount $S(NH_3)$ of the $NH_3$—AO catalyst 14a and the operation of the burner 110. In FIG. 39, the time zero represents the time at which the burner 110 is turned ON, that is, starts its operation, and the exhaust gas of the burner 110 is fed to the TW catalyst 8a. When the burner 110 is operated, the burner 110 performs the rich operation. Thus, $NH_3$ is synthesized at the TW catalyst 8a, and then flows to the $NH_3$—AO catalyst 14a. Therefore, the adsorbed $NH_3$ amount S(NH$_3$) of the NH$_3$—AO catalyst 14a gradually increases and exceeds the upper threshold UT(NH$_3$) at the time "d". When S(NH$_3$)>UT(NH$_3$), the burner 110 is turned OFF, that is, stops its operation. As a result, NH$_3$ adsorbed in the NH$_3$—AO catalyst 14a is gradually desorbed. Accordingly, the adsorbed NH$_3$ amount S(NH$_3$) is gradually reduced. At the time "e", the adsorbed amount S(NH$_3$) becomes lower than the lower threshold LT(NH$_3$). When S(NH$_3$)<LT(NH$_3$), the burner 110 is turned ON again. On the other hand, the main engine 1 continuously performs the lean operation.

Next, referring to FIG. 40, the control of the burner 110 will be explained in detail. The routine shown in FIG. 40 is executed by interruption every predetermined time.

Figure 40:
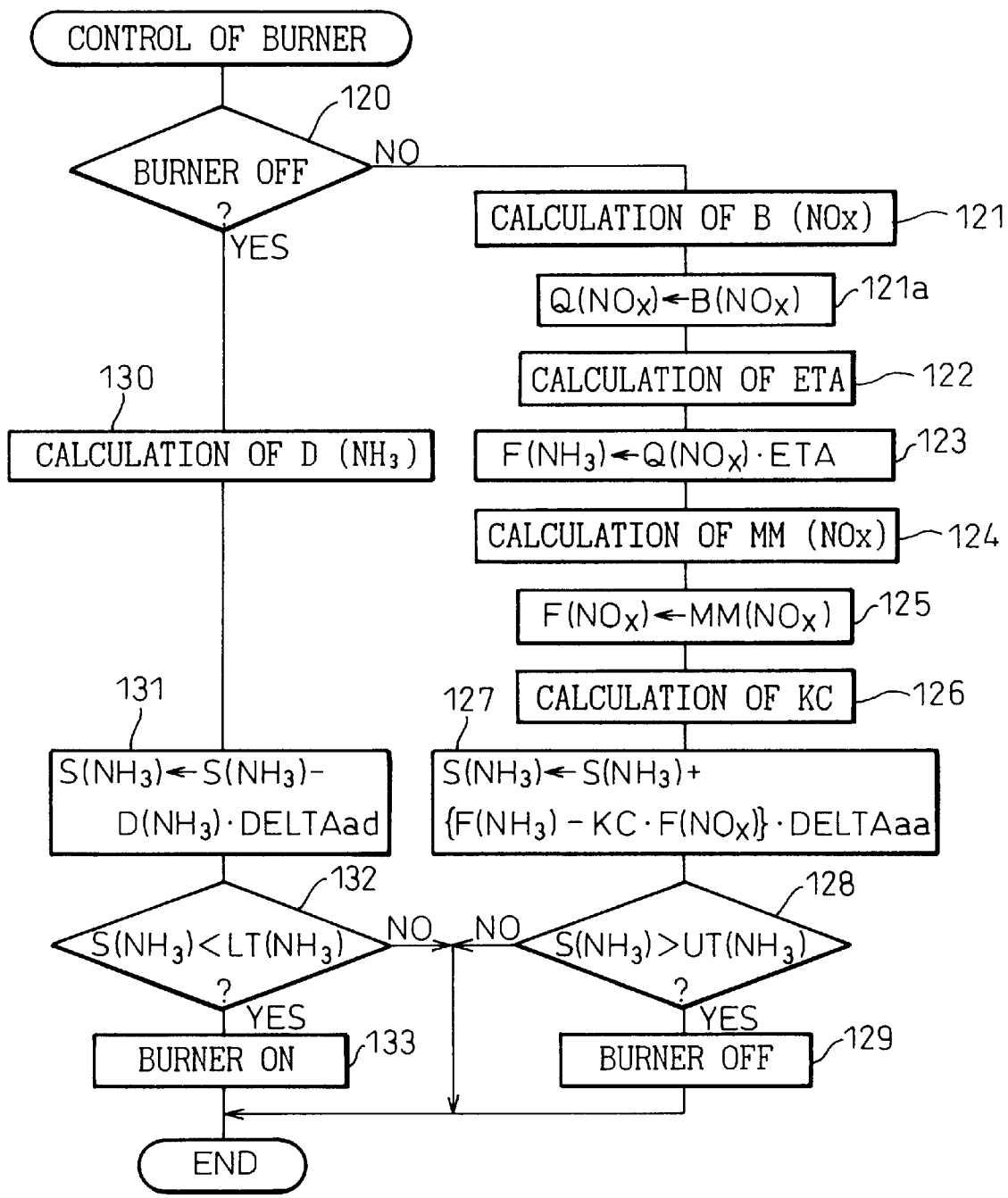
FIG. 40 is a flow chart for controlling the burner in the embodiment shown in FIG. 36.

Referring to FIG. 40, first, in step 120, it is judged whether the burner 110 is turned OFF (stopped). When the burner 110 is turned ON (operated), that is, when NH$_3$ is synthesized at the TW catalyst 8a and this NH$_3$ flows to the NH$_3$—AO catalyst 14a, the processing cycle goes to step 121, where the discharged NO$_X$ amount of the burner 110 per unit time B(NO$_X$) is calculated using the map shown in FIG. 25. In the following step 121a, B(NO$_X$) is memorized as the inflowing NO$_X$ amount Q(NO$_X$) of the TW catalyst 8a.

In this embodiment, the amount of air and the air-fuel ratio of the burner 110 are kept constant. Consequently, Q(NO$_X$) is also kept constant.

In the following step 122, the conversion efficiency ETA of the TW catalyst 8a is calculated using the map shown in FIG. 11. In the following step 123, the inflowing amount F(NH$_3$) of the NH$_3$—AO catalyst 14a is calculated using the following equation:

$$F(NH_3)=Q(NO_X) \cdot ETA$$

In the following step 124, an amount MM(NO$_X$) of NO$_X$ discharged from the main engine 1 per unit time is calculated using the map shown in FIG. 41(B).

Figure 41A:
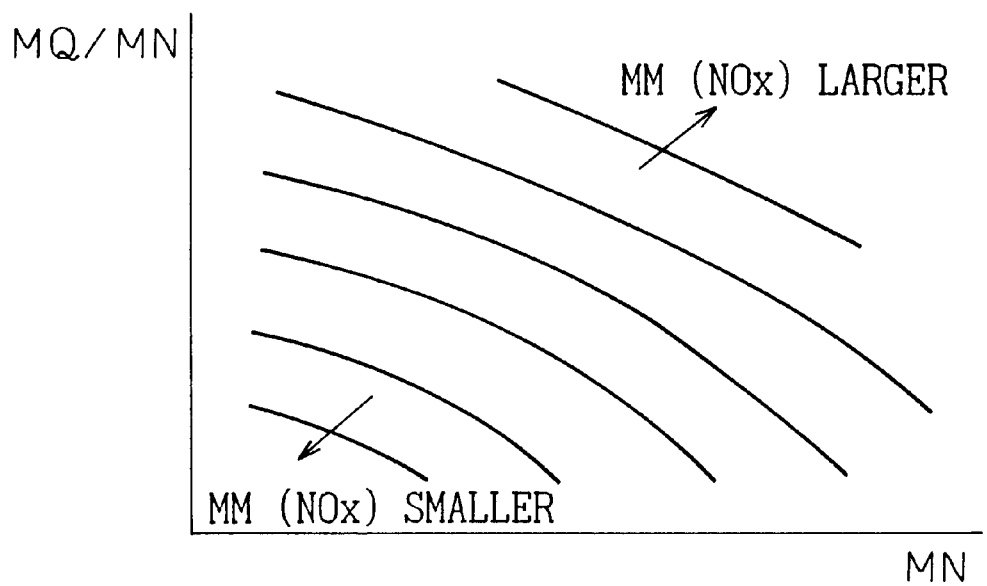
FIGS. 41A and 41B are diagrams illustrating an amount of $NO_X$ discharged from the main engine per unit time.
Figure 41B:
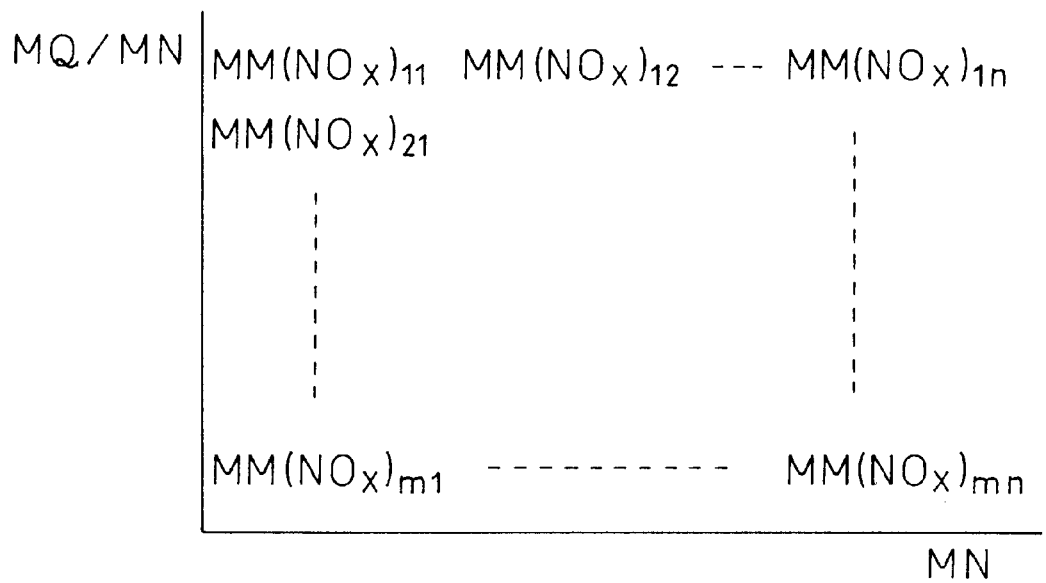

FIG. 41(A) illustrates the relationships, obtained by experiment, between the discharged NO$_X$ amount MM(NO$_X$) of the main engine 1, and the engine load MQ/MN and the engine speed MN, with the constant lean air-fuel ratio. In FIG. 41(A), each curve shows the identical amount of NO$_X$. As shown in FIG. 41(A), the discharged NO$_X$ amount MM(NO$_X$) of the main engine 1 increases as the engine load MQ/MN increases, and also increases as the engine speed MN increases. Note that the discharged NO$_X$ amount MM(NO$_X$) shown in FIG. 41(A) is stored in the ROM 42 in advance in the form of a map shown in FIG. 41(B).

In the following step 125, the discharged NO$_X$ amount MM(NO$_X$) is memorized as the inflowing NO$_X$ amount F(NO$_X$) of the NH$_3$—AO catalyst 14a. In the following step 126, the equivalent coefficient KC is calculated using the map shown in FIG. 13. In the following step 127, the adsorbed NH$_3$ amount S(NH$_3$) of the NH$_3$—AO catalyst 14a is calculated using the following equation:

$$S(NH_3)=S(NH_3)+\{F(NH_3)-KC \cdot F(NO_X)\} \cdot DELTAaa$$

where DELTAaa is a time interval from the previous processing cycle to the present processing cycle. In the following step 128, where it is judged whether the adsorbed NH$_3$ amount S(NH$_3$) is larger than the upper threshold UT(NH$_3$). When S(NH$_3$)≦UT(NH$_3$), the processing cycle is ended. That is, when S(NH$_3$)≦UT(NH$_3$), it is judged that the NH$_3$ adsorbing capacity of the NH$_3$—AO catalyst 14a is still large, and the burner 110 is kept to be turned ON, to thereby continue the NH$_3$ synthesizing operation at the TW catalyst 8a. As a result, NH$_3$ is continuously fed to the NH$_3$—AO catalyst 14a.

Contrarily, when S(NH$_3$)>UT(NH$_3$) in step 128, the routine goes to step 129, where the burner 110 is turned OFF (stopped), and then the processing cycle is ended. That is, when S(NH$_3$)>UT(NH$_3$), it is judged that the NH$_3$ adsorbing capacity of the NH$_3$—AO catalyst 14a is made smaller, and thus the NH$_3$ synthesizing operation at the TW catalyst 8a is stopped. As a result, the feeding of NH$_3$ to the NH$_3$—AO catalyst 14a is stopped.

On the other hand, when the burner 110 is turned OFF in step 120, the routine goes to step 130, where the desorbed NH$_3$ amount D(NH$_3$) of the NH$_3$—AO catalyst 14a is calculated using the map shown in FIG. 14(B). In the following step 131, the adsorbed NH$_3$ amount S(NH$_3$) is calculated using the following equation:

$$S(NH_3)=S(NH_3)-D(NH_3) \cdot DELTAad$$

where DELTA ad is a time interval from the previous processing cycle to the present processing cycle. In the following step 132, it is judged whether the adsorbed NH$_3$ amount S(NH$_3$) is smaller than the lower threshold LT(NH$_3$). When S(NH$_3$)≧LT(NH$_3$), the processing cycle is ended. That is, when S(NH$_3$)≧LT(NH$_3$), it is judged that the NH$_3$ adsorbing capacity of the NH$_3$—AO catalyst 14a is still small, and the burner 110 is kept turned OFF, to thereby stop the NH$_3$ synthesizing operation at the TW catalyst 8a continuously.

Contrarily, when S(NH$_3$)<LT(NH$_3$) in step 132, the routine goes to step 133, where the burner is turned ON, and then the processing cycle is ended. That is, when S(NH$_3$)<LT(NH$_3$), it is judged that the NH$_3$ adsorbing capacity of the NH$_3$—AO catalyst 14a becomes sufficiently large, and the feeding of NH$_3$ to the NH$_3$—AO catalyst 14a is resumed. As a result, the feeding NH$_3$ to the NH$_3$—AO catalyst 14a is resumed. Note that the other constructions and the operation of the exhaust gas purifying device are the same as those in the embodiment shown in FIG. 1, and thus the explanations therefor are omitted.

Figure 42:
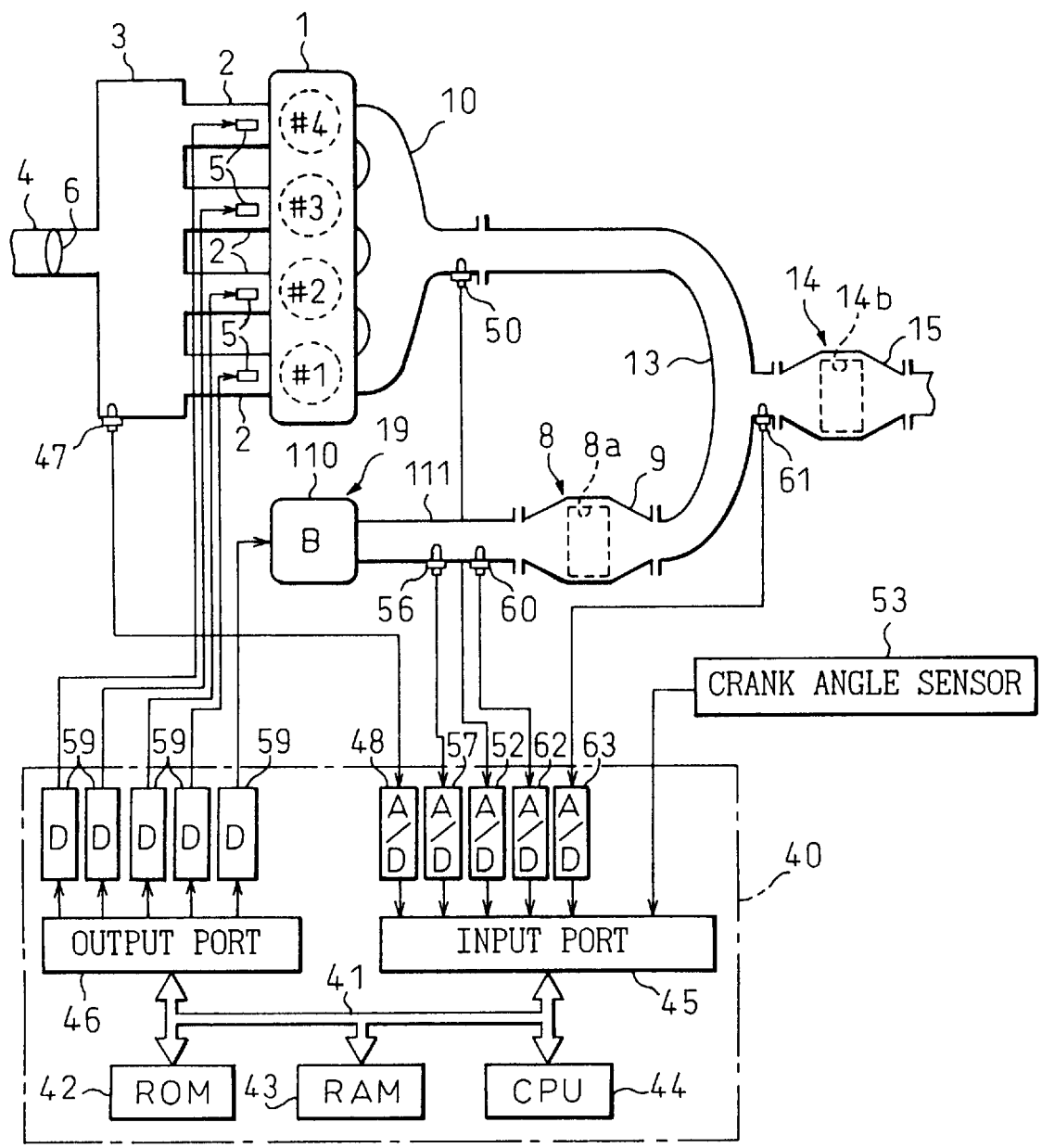
FIG. 42 is a general view of the engine according to further another embodiment.

FIG. 42 illustrates still another embodiment.

Referring to FIG. 42, the engine shown in FIG. 42 is different from that shown in FIG. 36 in that the interconnecting pipe 13 is connected to the NO$_X$—OR catalyst 14b which simultaneously forms the exhaust gas purifying catalyst 14 and the occlusive material.

Also in this embodiment, the main engine 1, that is, the first and the second cylinder groups 1a and 1b, usually performs the lean operation continuously. The target air-fuel ratio of the main engine M(A/F)T is set at the predetermined, constant lean air-fuel ratio (A/F)L, such as 18.5. Contrarily, the air-fuel ratio A(A/F)/T of the burner 110 is set the above-mentioned rich air-fuel ratio (A/F)RR, such as 13.8. As a result, NH$_3$ is synthesized at the TW catalyst 8a, and then flows to the NO$_X$—OR catalyst 14b.

Figure 43:
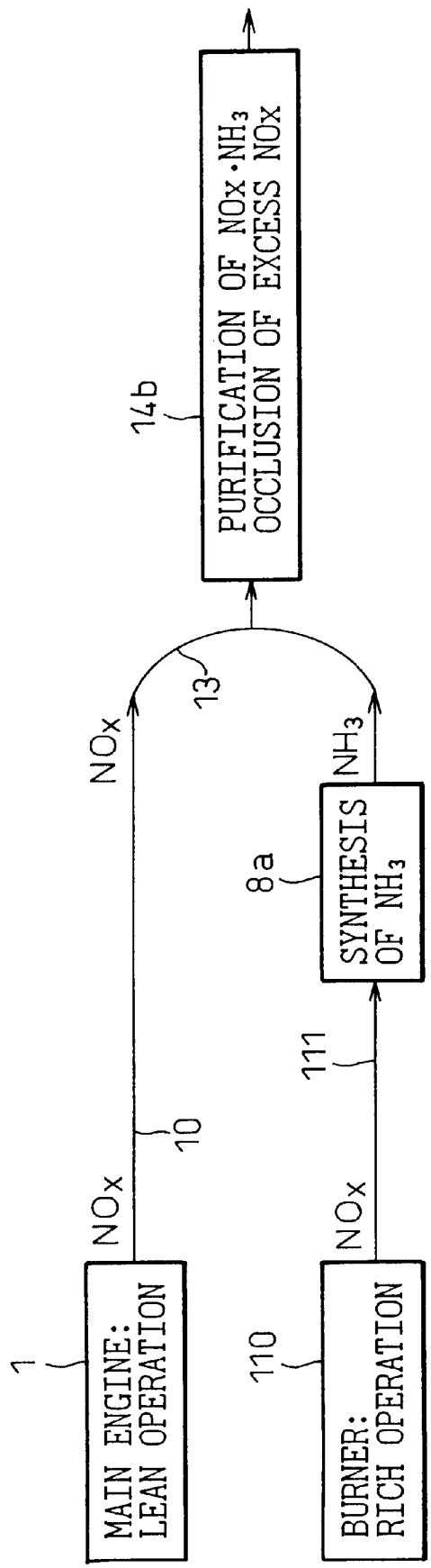
FIGS. 43 and 44 schematically illustrate the exhaust gas purifying method of the exhaust gas purifying device shown in FIG. 42.

The NH$_3$ from the TW catalyst 8a and the NO$_X$ from the main engine 1 flow to the NO$_X$—OR catalyst 14b. At this time, the exhaust gas air-fuel ratio of the exhaust gas mixture flowing to the NO$_X$—OR catalyst 14b is lean. Thus, the NH$_3$ and the NO$_X$ are purified at the NO$_X$—OR catalyst 14b simultaneously. In the present embodiment, the rich air-fuel ratio (A/F)RR, which is the exhaust gas air-fuel ratio of the exhaust gas flowing to the TW catalyst 8a, is selected to make the NH$_3$ amount flowing to the NO$_X$—OR catalyst 14b being equal to or smaller than that required to reduce the NO$_X$ amount flowing to the NO$_X$—OR catalyst 14b. In this condition, the excess NO$_X$ with respect to the NH$_3$ at the NO$_X$—OR catalyst 14b is occluded in the NO$_X$—OR catalyst 14b, and thus, both NO$_X$ and NH$_3$ are prevented from being discharged from the NO$_X$—OR catalyst 14b. The exhaust gas purifying method in this case is schematically illustrated in FIG. 43.

When the occluded $NO_X$ amount $S(NO_X)$ increases and the $NO_X$—OR catalyst 14b saturates, the $NO_X$ will be discharged from the $NO_X$—OR catalyst 14b without being purified. Therefore, the occluded $NO_X$ amount $S(NO_X)$ is first obtained, and when the occluded $NO_X$ amount $S(NO_X)$ exceeds an upper threshold $UT(NO_X)$, the exhaust gas air-fuel ratio of the exhaust gas mixture flowing to the $NO_X$—OR catalyst 14b is made rich, to thereby release the occluded $NO_X$ from the $NO_X$—OR catalyst 14b. In this condition, the exhaust gas air-fuel ratio of the exhaust gas flowing to the TW catalyst 8a is kept at the rich air-fuel ratio, that is, the $NH_3$ synthesizing is continued. Thus, the $NO_X$ released from the $NO_X$—OR catalyst 14b is purified by the $NH_3$ in the inflowing exhaust gas. Accordingly, both $NO_X$ and $NH_3$ are prevented from being discharged from the $NO_X$—OR catalyst 14b, even during the $NO_X$ releasing operation.

Figure 44:
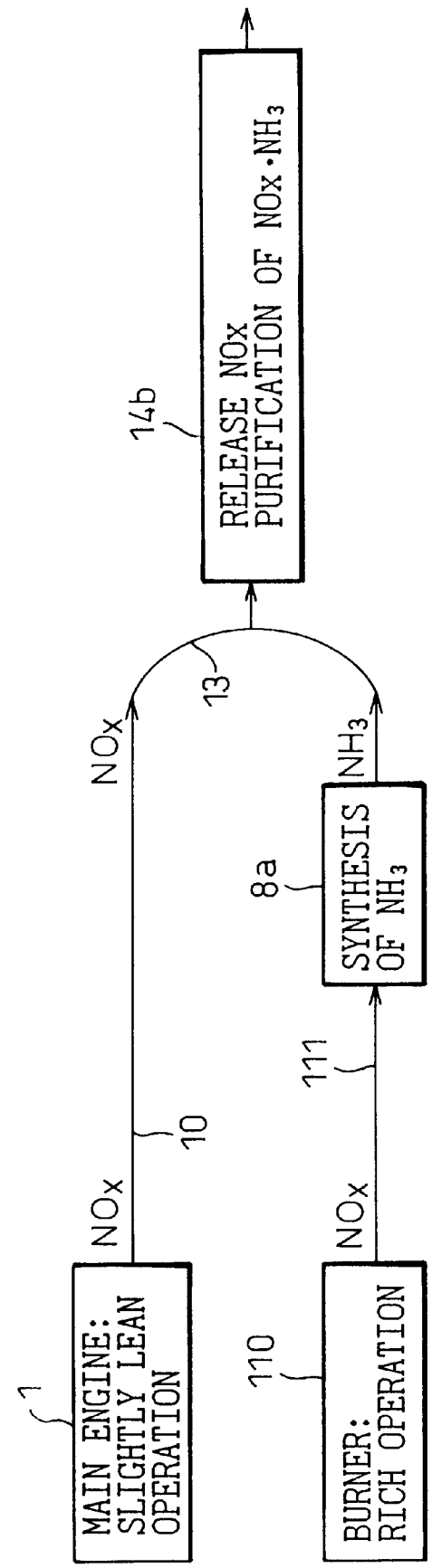

To make the exhaust gas air-fuel ratio of the exhaust gas mixture flowing to the $NO_X$—OR catalyst 14b, the target air-fuel ratio of the main engine M(A/F)T is changed toward the rich side, while the burner 110 continuously performs the rich operation, in this embodiment. The target air-fuel ratio M(A/F)T may be selected to any air-fuel ratio as long as the exhaust gas air-fuel ratio of the exhaust gas mixture flowing to the $NO_X$—OR catalyst 14b is kept rich. However, the target air-fuel ratio M(A/F)T is made equal to (A/F)P, which is slightly lean, such as 15.0, that is, the main engine 1 performs the slightly lean operation. On the other hand, the burner 110 continuously performs the rich operation with the constant rich air-fuel ratio (A/F)R. The exhaust gas purifying method in this case is schematically illustrated in FIG. 44.

Alternatively, the main engine 1 may perform the stoichiometric or the rich operation, when the exhaust gas air-fuel ratio of the exhaust gas flowing to the $NO_X$—OR catalyst 14b is to be made rich. Or, the target air-fuel ratio A(A/F)T of the burner 110 may be smaller or richer.

A continuous $NO_X$ releasing operation decreases the occluded $NO_X$ amount $S(NO_X)$. When the occluded $NO_X$ amount $S(NO_X)$ becomes lower than the lower threshold $LT(NO_X)$, the main engine 1 resumes the lean operation, while the burner 110 continuously performs the rich operation.

Figure 45:
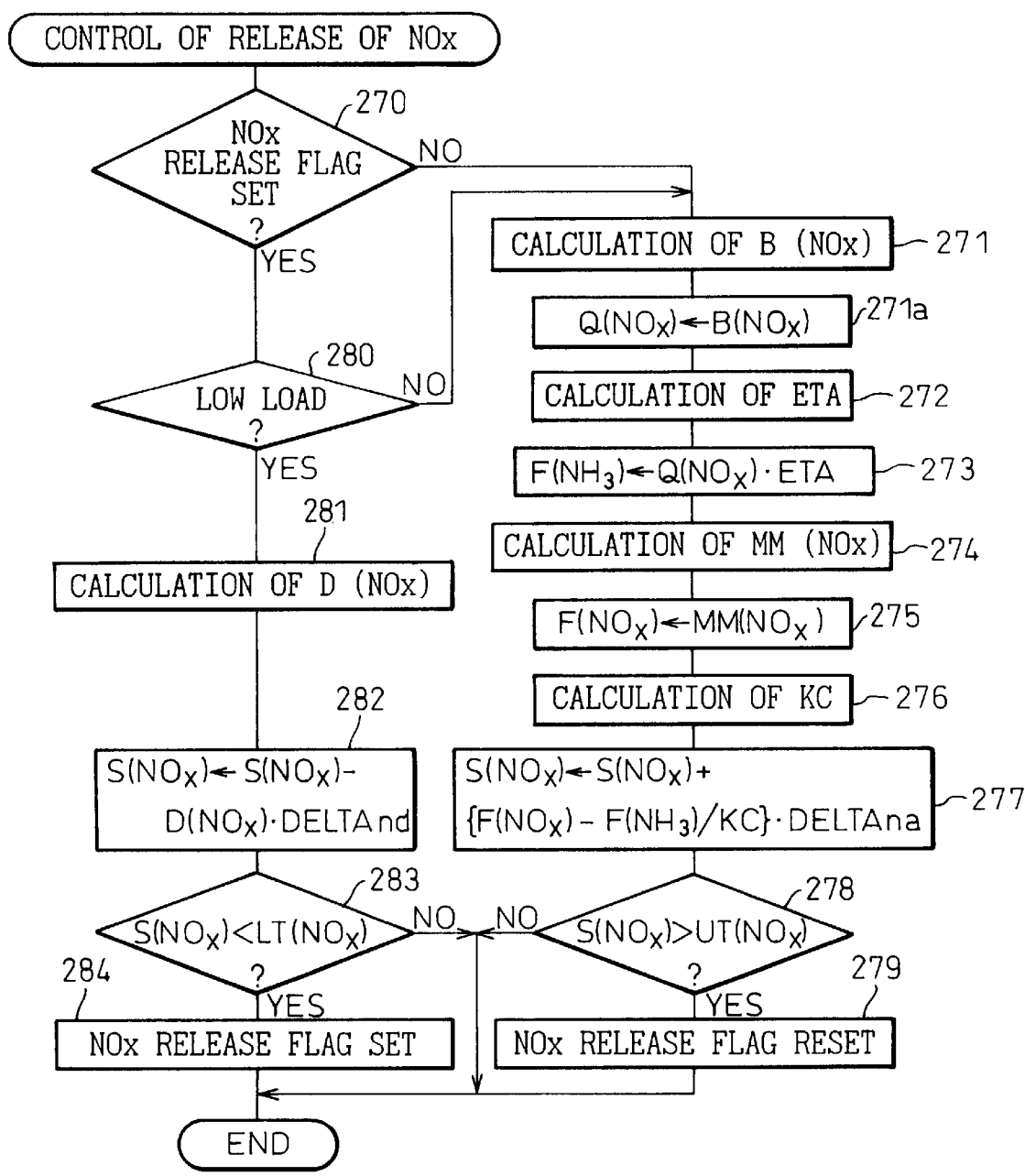
FIG. 45 is a flow chart for controlling the $NO_X$ release operation in the embodiment shown in FIG. 42.

FIG. 45 shows a routine for executing the above-mentioned $NO_X$ release control. The routine is executed by interruption every predetermined time.

Referring to FIG. 45, first, in step 270, it is judged whether the $NO_X$ release flag is set. The $NO_X$ release flag is set when the exhaust gas air-fuel ratio of the exhaust gas mixture flowing to the $NO_X$—OR catalyst 14b is to be made rich, and is reset when that exhaust gas air-fuel ratio is to be made lean. When the $NO_X$ release flag is reset, the routine goes to step 271, where the discharged $NO_X$ amount $B(NO_X)$ of the burner 110 is calculated using the map shown in FIG. 25. In the following step 271a, $B(NO_X)$ is memorized as the inflowing $NO_X$ amount $Q(NO_X)$ of the TW catalyst 8a. In the following step 272, the synthesizing efficiency ETA is calculated using the map shown in FIG. 11. In the following step 273, the inflowing $NH_3$ amount $F(NH_3)$ of the $NO_X$—OR catalyst 14b is calculated using the following equation:

$$F(NH_3)=Q(NO_X) \cdot ETA$$

In the following step 274, the discharged $NO_X$ amount $MM(NO_X)$ of the main engine 1 is calculated using the map shown in FIG. 41(B). In the following step 275, $MM(NO_X)$ is memorized as the inflowing $NO_X$ amount $F(NO_X)$ of the $NO_X$—OR catalyst 14b. In the following step 276, the equivalent coefficient KC is calculated using the map shown in FIG. 13. In the following step 277, the occluded $NO_X$ amount $S(NO_X)$ of the $NO_X$—OR catalyst 14b is calculated using the following equation:

$$S(NO_X)=S(NO_X)+\{F(NO_X)-F(NH_3)/KC\} \cdot DELTAna$$

where DELTAna represents a time interval from the previous processing cycle to the present processing cycle. In the following step 278, it is judged whether the occluded $NO_X$ amount $S(NO_X)$ is larger than the upper threshold $UT(NO_X)$. If $S(NO_X) \leq UT(NO_X)$, the processing cycle is ended. That is, if $S(NO_X) \leq UT(NO_X)$, it is judged that the $NO_X$ occluding capacity of the $NO_X$—OR catalyst 14b is still large, and the exhaust gas air-fuel ratio of the exhaust gas flowing to the $NO_X$—OR catalyst 14b is kept lean, to thereby continue the $NO_X$ occluding operation of the $NO_X$—OR catalyst 14b.

Contrarily, if $S(NO_X)>UT(NO_X)$ in step 278, the routine goes to step 279, where the $NO_X$ release flag is set, and then the processing cycle is ended. That is, when $S(NO_X)>UT(NO_X)$, it is judged that the $NO_X$ occluding capacity of $NO_X$—OR catalyst 14b becomes smaller, and the exhaust gas air-fuel ratio of the exhaust gas flowing to the $NO_X$—OR catalyst 14b is changed to rich, to thereby release the occluded $NO_X$.

On the other hand, when the $NO_X$ release flag is set in step 270, the routine goes to step 280, where it is judged whether the main engine 1 is under the low load operation, namely, whether the exhaust gas amount is small. When the main engine 1 is in the middle or the high load operation, the routine goes to step 271. Namely, when the main engine 1 is in the middle or the high load operation, the $NO_X$ releasing operation is not performed, but the excess $NO_X$ occluding operation is performed, even though the $NO_X$ release flag is set. Contrarily, when the main engine 1 is in the low load engine, the $NO_X$ occluding operation is performed, and the routine goes from step 280 to step 281, where the released $NO_X$ amount $D(NO_X)$ of the $NO_X$—OR catalyst 14b is calculated using the map shown in FIG. 33(B). In the following step 282, the occluded $NO_X$ amount $S(NO_X)$ is calculated using the following equation:

$$S(NO_X)=S(NO_X)-D(NO_X) \cdot DELTAnd$$

where DELTAnd represents a time interval from the previous processing cycle to the present processing cycle. In the following step 283, it is judged whether the occluded $NO_X$ amount $S(NO_X)$ is smaller than the lower threshold $LT(NO_X)$. When $S(NO_X) \geq LT(NO_X)$, the processing cycle is ended. Namely, when $S(NO_X) \geq LT(NO_X)$, it is judged that the $NO_X$ occluding capacity of the $NO_X$—OR catalyst 14b is still small, and thus the exhaust gas air-fuel ratio of the exhaust gas flowing to the $NO_X$—OR catalyst 14b is kept rich. As a result, the $NO_X$ releasing operation is continued.

When $S(NO_X)<LT(NO_X)$ in step 283, the routine goes to step 284, where the $NO_X$ release flag is reset, and then the processing cycle is ended. Namely, when $S(NO_X)<LT(NO_X)$, it is judged that the $NO_X$ occluding capacity of the $NO_X$—OR catalyst 14b is sufficiently large, and the exhaust gas air-fuel ratio of the exhaust gas flowing to the $NO_X$—OR catalyst 14b is made lean. As a result, the excess $NO_X$ is occluded in the $NO_X$—OR catalyst 14b.

Figure 46:
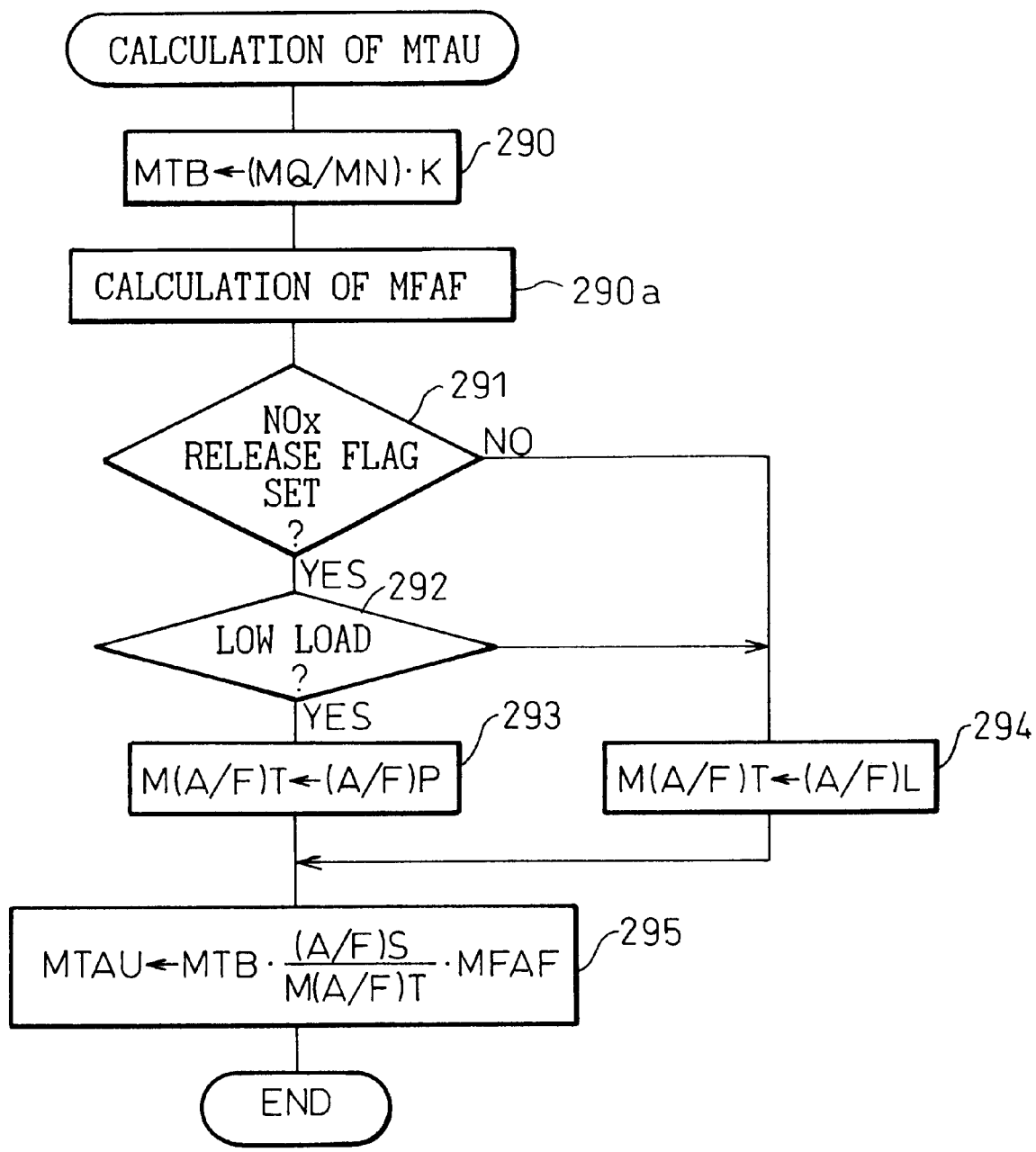
FIG. 46 is a flow chart for calculating the fuel injection time of the main engine in the embodiment shown in FIG. 42.

FIG. 46 illustrates the routine for calculating the fuel injection time MTAU for the main engine 1. The routine is executed by interruption every predetermined crank angle.

Referring to FIG. 46, first, in step 290, the basic fuel injection time MTB is calculated using the following equation:

$$MTB=(MQ/MN) \cdot K$$

In the following step 290a, the feedback correction coefficient MFAFA for the main engine 1 is calculated on the basis of the output signal of the air-fuel ratio sensor 50.

In the following step 291, it is judged whether the $NO_X$ release flag, which is set or reset in the routine shown in FIG. 45, is set. If the $NO_X$ release flag is set, the routine goes to step 292, it is judged whether the main engine 1 is under the low load operation. When the main engine 1 is under the low load operation, the routine goes to step 293, where (A/F)P is memorized as the target air-fuel ratio M(A/F)T of the main engine 1. Therefore, when the $NO_X$ release flag is set and the main engine 1 is under the low load operation, the main engine 1 performs the slightly lean operation, to make the exhaust gas air-fuel ratio of the exhaust gas flowing to the $NO_X$—OR catalyst 14b rich. Accordingly, the $NO_X$ releasing operation of the $NO_X$—OR catalyst 14b is performed. Then, the routine goes to step 295.

Contrarily, when the $NO_X$ release flag is reset in step 291 or when the main engine 1 is in the middle or the high load operation in step 292, the routine goes to step 294, where the target air-fuel ratio M(A/F)T for the main engine 1 is made equal to the lean air-fuel ratio (A/F)L, and the main engine 1 performs the lean operation. Therefore, the exhaust gas air-fuel ratio of the exhaust gas flowing to the $NO_X$—OR catalyst 14b is made lean, and the excess $NO_X$ is occluded in the $NO_X$—OR catalyst 14b. Then, the routine goes to step 295.

In step 295, the fuel injection time MTAU is calculated using the following equation:

$$MTAU=MTB \cdot ((A/F)S/M(A/F)T) \cdot MFAF$$

Each fuel injector 5 injects the fuel for the fuel injection time MTAU. Note that the other constructions and the operation of the exhaust gas purifying device are the same as those in the embodiment shown in FIG. 1, and thus the explanations therefor are omitted.

In the embodiments mentioned above, the exhaust gas air-fuel ratio of the exhaust gas flowing to the TW catalyst 8a is made rich by the exhaust gas discharged from the auxiliary engine 20 or the burner 20 performing the rich operation. Alternatively, the exhaust gas air-fuel ratio of the exhaust gas flowing to the TW catalyst 8a may be made rich by injecting fuel into the exhaust pipe 7. Or, the exhaust gas air-fuel ratio of the exhaust gas flowing to the TW catalyst 8a may be made rich by providing the burner in the exhaust gas passage upstream of the TW catalyst 8a to consume oxygen in the exhaust gas flowing therethrough.

We claim:

1. A device for purifying an exhaust gas of an engine having a plurality of cylinders divided into first and second cylinder groups, the first and the second cylinder groups being connected to first and second exhaust passage, respectively, and performing a lean operation, the device comprising:

an $NH_3$ synthesizing catalyst arranged in the first exhaust passage, the $NH_3$ synthesizing catalyst synthesizing $NH_3$ from at least a part of $NO_X$ in the inflowing exhaust gas when the exhaust gas air-fuel ratio of the inflowing exhaust gas is rich, and passing through $NO_X$ in the inflowing exhaust gas when the exhaust gas air-fuel ratio of the inflowing exhaust gas is lean;

an interconnecting exhaust passage interconnecting the first passage downstream of the $NH_3$ synthesizing catalyst and the second exhaust passage;

an exhaust gas purifying catalyst arranged in the interconnecting passage for purifying the inflowing $NO_X$ and $NH_3$;

rich gas forming means, which is different from the engine, for supplying a reducing agent to the first exhaust gas passage upstream of the $NH_3$ synthesizing catalyst to make the exhaust gas air-fuel ratio of the exhaust gas flowing into the $NH_3$ synthesizing catalyst rich; and reducing agent amount control means for obtaining an amount of $NH_3$ or $NO_X$ flowing into the exhaust gas purifying catalyst, and controlling the rich gas forming means in accordance with the obtained $NH_3$ or $NO_X$ amount to control the amount of the reducing agent supplied into the first exhaust passage to control the amount of the reducing agent flowing to the exhaust gas purifying catalyst.

2. A device according to claim 1, wherein the exhaust gas purifying catalyst comprises an adsorbent, the adsorbent adsorbing $NH_3$ in the inflowing exhaust gas therein, and desorbing the adsorbed $NH_3$ therefrom when the $NH_3$ concentration in the inflowing exhaust gas becomes lower, wherein the reducing agent amount control means obtains the amount of $NH_3$ adsorbed in the adsorbent and controls the rich gas forming means in accordance with the adsorbed $NH_3$ amount to control the amount of the reducing agent supplied into the first exhaust passage.

3. A device according to claim 2, wherein the exhaust gas air-fuel ratio of the exhaust gas flowing to the $NH_3$ synthesizing catalyst is made lean to stop feeding the $NH_3$ to the adsorbent to desorb the adsorbed $NH_3$ from the adsorbent when the adsorbed $NH_3$ amount becomes larger than a predetermined upper threshold, and is made rich when the adsorbed $NH_3$ amount becomes smaller than a predetermined lower threshold.

4. A device according to claim 3 wherein the feeding of the reducing agent to the $NH_3$ synthesizing catalyst is stopped to make the exhaust gas air-fuel ratio of the exhaust gas flowing to the $NH_3$ synthesizing catalyst lean.

5. A device according to claim 2, wherein the reducing agent amount control means comprises $NH_3$ amount estimating means for estimating the amount of $NH_3$ adsorbed in the adsorbent on the basis of the amounts of $NH_3$ and $NO_X$ flowing to the adsorbent.

6. A device according to claim 2, wherein the adsorbent comprises an $NH_3$ adsorbing and oxidizing catalyst ($NH_3$—AO) catalyst, the $NH_3$—AO catalyst adsorbing $NH_3$ in the inflowing exhaust gas therein, and desorbing the adsorbed $NH_3$ therefrom and oxidizing the $NH_3$ when the $NH_3$ concentration in the inflowing exhaust gas becomes lower.

7. A device according to claim 6, wherein the $NH_3$—AO catalyst comprises solid acid such as zeolite, silica, silica-alumina, and titania, carrying the transition metals such as copper, chrome, vanadium, titanium, iron, nickel, and cobalt or precious metals such as platinum, palladium, rhodium and iridium.

8. A device according to claim 2, wherein the amount of $NH_3$ flowing to the adsorbent is larger than that of $NO_X$ flowing to the adsorbent.

9. A device according to claim 1, wherein the exhaust gas purifying catalyst comprises an occlusive material, the occlusive material occluding $NO_X$ in the inflowing exhaust gas therein when the exhaust gas air-fuel ratio of the inflowing exhaust gas is lean, and releasing the occluded $NO_X$ when the exhaust gas air-fuel ratio of the inflowing exhaust gas becomes rich, wherein the reducing agent amount control means obtains the amount of $NO_X$ occluded in the occlusive material and controls the rich gas forming means in accordance with the obtained $NO_X$ amount to control the amount of the reducing agent supplied into the first exhaust passage.

10. A device according to claim 9, wherein the exhaust gas air-fuel ratio of the exhaust gas flowing to the occlusive material is made rich to release the occluded $NO_X$ from the occlusive material when the occluded $NO_X$ amount is larger than a predetermined upper threshold, and is made lean when the occluded $NO_X$ amount is smaller than a predetermined lower threshold.

11. A device according to claim 10, wherein the engine performs a slightly lean operation to make the exhaust gas air-fuel ratio of the exhaust gas flowing to the occlusive material rich.

12. A device according to claim 10, wherein the $NO_X$ releasing operation is carried out when the engine is under the low load operation.

13. A device according to claim 9, wherein the reducing agent amount control means comprises $NO_X$ amount estimating means for estimating the amount of $NO_X$ occluded in the occlusive material on the basis of the amounts of $NH_3$ and $NO_X$ flowing to the occlusive material.

14. A device according to claim 9, wherein the occlusive material comprises a $NO_X$ occluding and reducing ($NO_X$— OR) catalyst, the $NO_X$—OR catalyst occluding $NO_X$ in the inflowing exhaust gas therein when the exhaust gas air-fuel ratio of the inflowing exhaust gas is lean, and releasing the occluded $NO_X$ therefrom and reducing the $NO_X$ when the exhaust gas air-fuel ratio of the inflowing exhaust gas is rich.

15. A device according to claim 14, wherein the $NO_X$— OR catalyst includes: at least one substance selected from alkali metals such as potassium, sodium, lithium, and cesium, alkali earth metals such as barium and calcium, rare earth metals such as lanthanum and yttrium, and transition metals such as iron and copper; and precious metals such as palladium, platinum, iridium, and rhodium.

16. A device according to claim 9, wherein the amount of $NH_3$ flowing the occlusive material is smaller than that of $NO_X$ flowing the occlusive material.

17. A device according to claim 1, wherein the rich gas forming means comprises a combustor having an exhaust passage and performing a rich operation, the exhaust passage of the combustor being connected to the first exhaust passage upstream of the $NH_3$ synthesizing catalyst, and wherein the exhaust gas of the combustor serves as the reducing agent.

18. A device according to claim 17, wherein the combustor is an additional engine having a crank shaft different from that of the engine, the output torque of the additional engine being adapted to drive an auxiliary device.

19. A device according to claim 17, wherein the combustor is a burner.

20. A device according to claim 1, further comprising engine air-fuel ratio control means for obtaining an amount of $NH_3$ or $NO_X$ flowing to the exhaust gas purifying catalyst and controlling the engine air-fuel ratio of at least one of the cylinders of the engine, in accordance with the obtained $NH_3$ or $NO_X$ amount.

21. A device according to claim 20, wherein the engine air-fuel ratio control means comprises an intake air control valve for controlling the intake air amount of the cylinder of which the engine air-fuel ratio is to be controlled by the engine air-fuel ratio control means, and wherein the intake air control valve is controlled to control the engine air-fuel ratio of that cylinder.

22. A device according to claim 1, wherein the $NH_3$ synthesizing catalyst is a three-way catalyst including at least one precious metal such as palladium, platinum, iridium, and rhodium.

23. A device for purifying an exhaust gas of an engine performing a lean operation, the device comprising:

rich gas forming means, which is different from the engine, for forming the exhaust gas of which the exhaust gas air-fuel ratio is rich;

an $NH_3$ synthesizing catalyst connected to the rich gas forming means, the $NH_3$ synthesizing catalyst synthesizing $NH_3$ from at least a part of $NO_X$ in the inflowing exhaust gas when the exhaust gas air-fuel ratio of the inflowing exhaust gas is rich, and passing through $NO_X$ in the inflowing exhaust gas when the exhaust gas air-fuel ratio of the inflowing exhaust gas is lean;

an interconnecting exhaust passage interconnecting the exhaust gas of the engine and that discharged from the $NH_3$ synthesizing catalyst;

an exhaust gas purifying catalyst arranged in the interconnecting passage for purifying the inflowing $NO_X$ and the inflowing $NH_3$; and reducing agent amount control means for obtaining an amount of $NH_3$ or $NO_X$ flowing into the exhaust gas purifying catalyst, and controlling the rich gas forming means in accordance with the obtained $NH_3$ or $NO_X$ amount to control the amount of the reducing agent supplied into the interconnecting passage upstream of the exhaust gas purifying catalyst.

24. A device according to claim 23, wherein the exhaust gas purifying catalyst comprises an adsorbent, the adsorbent adsorbing $NH_3$ in the inflowing exhaust gas therein, and desorbing the adsorbed $NH_3$ therefrom when the $NH_3$ concentration in the inflowing exhaust gas becomes lower, wherein the reducing agent amount control means obtains the amount of $NH_3$ adsorbed in the adsorbent and controls the rich gas forming means in accordance with the adsorbed $NH_3$ amount to control the amount of the reducing agent supplied into the interconnecting passage.

25. A device according to claim 24, wherein the forming of the exhaust gas of which the exhaust gas air-fuel ratio is rich is stopped to stop feeding the $NH_3$ to the adsorbent to desorb the adsorbed $NH_3$ from the adsorbent when the adsorbed $NH_3$ amount becomes larger than a predetermined upper threshold, and is resumed when the adsorbed $NH_3$ amount becomes smaller than a predetermined lower threshold.

26. A device according to claim 24, wherein the reducing agent amount control means comprises $NH_3$ amount estimating means for estimating the amount of $NH_3$ adsorbed in the adsorbent on the basis of the amounts of $NH_3$ and $NO_X$ flowing to the adsorbent.

27. A device according to claim 24, wherein the adsorbent comprises an $NH_3$ adsorbing and oxidizing catalyst ($NH_3$— AO) catalyst, the $NH_3$—AO catalyst adsorbing $NH_3$ in the inflowing exhaust gas therein, and desorbing the adsorbed $NH_3$ therefrom and oxidizing the $NH_3$ when the $NH_3$ concentration in the inflowing exhaust gas becomes lower.

28. A device according to claim 27, wherein the $NH_3$— AO catalyst comprises solid acid such as zeolite, silica, silica-alumina, and titania, carrying the transition metals such as copper, chrome, vanadium, titanium, iron, nickel, and cobalt or precious metals such as platinum, palladium, rhodium and iridium.

29. A device according to claim 24, wherein the amount of $NH_3$ flowing the adsorbent is larger than that of $NO_X$ flowing the adsorbent.

30. A device according to claim 23, wherein the exhaust gas purifying catalyst comprises an occlusive material, the occlusive material occluding $NO_X$ in the inflowing exhaust gas therein when the exhaust air-fuel ratio of the inflowing exhaust gas is lean, and releasing the occluded $NO_X$ when the exhaust gas air-fuel ratio of the inflowing exhaust gas becomes rich, wherein the reducing agent amount control means obtains the amount of $NO_X$ occluded in the occlusive material and controls the rich gas forming means in accordance with the obtained $NO_X$ amount to control the amount of the reducing agent supplied into the interconnecting passage.

31. A device according to claim 30, wherein the exhaust gas air-fuel ratio of the exhaust gas flowing to the occlusive material is made rich to release the occluded $NO_X$ from the occlusive material when the occluded $NO_X$ amount becomes larger than a predetermined upper threshold, and is made lean when the occluded $NO_X$ amount becomes smaller than a predetermined lower threshold.

32. A device according to claim 31, wherein the engine performs a slightly lean operation to make the exhaust gas air-fuel ratio of the exhaust gas flowing to the occlusive material rich.

33. A device according to claim 31, wherein the $NO_X$ releasing operation is carried out when the engine is under the low load operation.

34. A device according to claim 30, wherein the reducing agent amount control means comprises $NO_X$ amount estimating means for estimating the amount of $NO_X$ occluded in the occlusive material on the basis of the amounts of $NH_3$ and $NO_X$ flowing to the occlusive material.

35. A device according to claim 30, wherein the occlusive material comprises a $NO_X$ occluding and reducing ($NO_X$—OR) catalyst, the $NO_X$—OR catalyst occluding $NO_X$ in the inflowing exhaust gas therein when the exhaust gas air-fuel ratio of the inflowing exhaust gas is lean, and releasing the occluded $NO_X$ therefrom and reducing the $NO_X$ when the exhaust gas air-fuel ratio of the inflowing exhaust gas is rich.

36. A device according to claim 35, wherein the $NO_X$—OR catalyst includes: at least one substance selected from alkali metals such as potassium, sodium, lithium, and cesium, alkali earth metals such as barium and calcium, rare earth metals such as lanthanum and yttrium, and transition metals such as iron and copper; and precious metals such as palladium, platinum, iridium, and rhodium.

37. A device according to claim 30, wherein the amount of $NH_3$ flowing the occlusive material is smaller than that of $NO_X$ flowing the occlusive material.

38. A device according to claim 23, wherein the rich gas forming means comprises a combustor having an exhaust passage and performing a rich operation, the exhaust passage of the combustor being connected to the interconnecting passage upstream of the exhaust gas purifying catalyst, and wherein the exhaust gas of the combustor serves as the reducing agent.

39. A device according to claim 38, wherein the combustor is an additional engine having a crank shaft different from that of the engine, the output torque of the additional engine being adapted to drive an auxiliary device.

40. A device according to claim 38, wherein the combustor is a burner.

41. A device according to claim 23, further comprising engine air-fuel ratio control means for obtaining an amount of $NH_3$ or $NO_X$ flowing to the exhaust gas purifying catalyst and controlling the engine air-fuel ratio of at least one of the cylinders of the engine, in accordance with the obtained $NH_3$ or $NO_X$ amount.

42. A device according to claim 41, wherein the engine air-fuel ratio control means comprises an intake air control valve for controlling the intake air amount of the cylinder of which the engine air-fuel ratio is to be controlled by the engine air-fuel ratio control means, and wherein the intake air control valve is controlled to control the engine air-fuel ratio of that cylinder.

43. A device according to claim 23, wherein the $NH_3$ synthesizing catalyst is a three-way catalyst including at least one precious metal such as palladium, platinum, iridium, and rhodium.

* * * * *